United States Patent [19]

Porter et al.

[11] 4,110,822
[45] Aug. 29, 1978

[54] INSTRUCTION LOOK AHEAD HAVING PREFETCH CONCURRENCY AND PIPELINE FEATURES

[75] Inventors: Marion G. Porter, Phoenix; Garvin Wesley Patterson, Glendale, both of Ariz.

[73] Assignee: Honeywell Information Systems, Inc., Waltham, Mass.

[21] Appl. No.: 814,599

[22] Filed: Jul. 11, 1977

Related U.S. Application Data

[63] Continuation of Ser. No. 562,272, Mar. 26, 1975, abandoned.

[51] Int. Cl.² ............................................. G06F 9/18
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,401,376 | 9/1968 | Barnes | 364/200 |
| 3,573,854 | 4/1971 | Watson | 364/200 |
| 3,609,700 | 9/1971 | Wollum | 364/200 |
| 3,689,895 | 9/1972 | Kitamura | 364/200 |
| 3,764,988 | 10/1972 | Onishi | 364/200 |
| 3,766,527 | 10/1972 | Briley | 364/200 |
| 3,811,114 | 5/1974 | Lemay | 364/200 |
| 3,840,861 | 10/1974 | Amdahl | 364/200 |
| 3,875,391 | 1/1975 | Shapiro | 364/200 |
| 3,886,523 | 5/1975 | Ferguson | 364/200 |
| 3,947,822 | 3/1976 | Watanabe | 364/200 |
| 3,956,738 | 5/1976 | Tessera | 364/200 |
| 3,983,541 | 9/1976 | Faber | 364/200 |

*Primary Examiner*—James D. Thomas
*Attorney, Agent, or Firm*—Faith F. Driscoll; Nicholas Prasinos; Ronald T. Reiling

[57] ABSTRACT

A central processing unit wherein instruction fetch and execution is performed by a mechanism featuring an instruction look ahead mechanism whereby fetching and processing of the next software instruction is commenced as a last step of the currently executing software instruction, and the currently executing software instruction is terminated by the first portion of the next software instruction.

7 Claims, 19 Drawing Figures

CONVENTIONAL METHOD
*PRIOR ART*

LOOK AHEAD METHOD

FIG. 2A

| PSR | STEERING | P | R | A | CC | C | PROCESS TIMER | 0 |
| IC | L/R | S | | ADDRESS | | | | 1 |
| | | | | | | | | 2 |
| | | | | GR's | | | | 3 |
| | | | | | | | | |
| PTBR | L/R | S | PROG # | PAGE TABLE BASE | | | KEY | n |

FIG. 2B

BIT 0 ... 7 8 9 10 11 12 13 14 ... 35

| PSR | STEERING | P | R | A | CC | C | PROCESS TIMER |

FIG. 2C

BIT 0 1 3 4 8 9 ... 35

| IC | L/R | S | RFU | IC |

FIG. 2D

BIT 0 1 3 4 8 9 ... 29 30 35

| PTBR | L/R | S | PROG # | PAGE TABLE BASE | KEY |

FIG. 2E

BIT 0 1 3 4 ... 10 11 12 14 15 19 20 ... 35

| CBBR | L/R | S | CBB2 | L/R | S | RFU | CBB1 |

⎧ SECONDARY CBB ⎫ ⎧ PRIMARY CBB ⎫

FIG. 2F

BIT 0 1 3 4 8 9 ... 24 25 35

| PRIMARY CBB | L/R | S | RFU | CBB1 | 000 00000000 |

FIG. 2G

BIT 0 1 3 4 8 9 ... 17 18 24 25 35

| SECONDARY CBB | L/R | S | RFU | 000 0000 00 | CBB2 | 0000000 0000 |

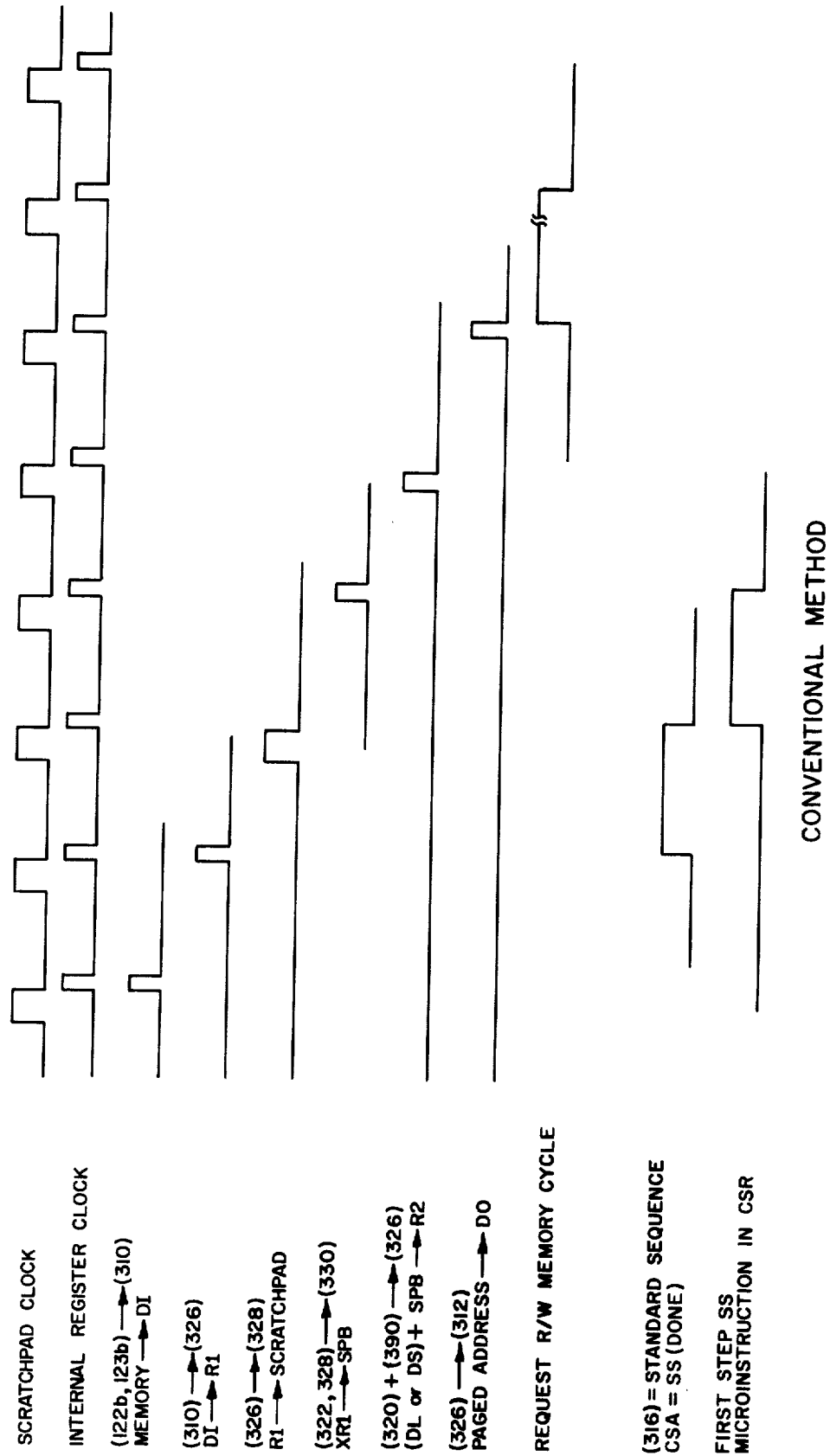

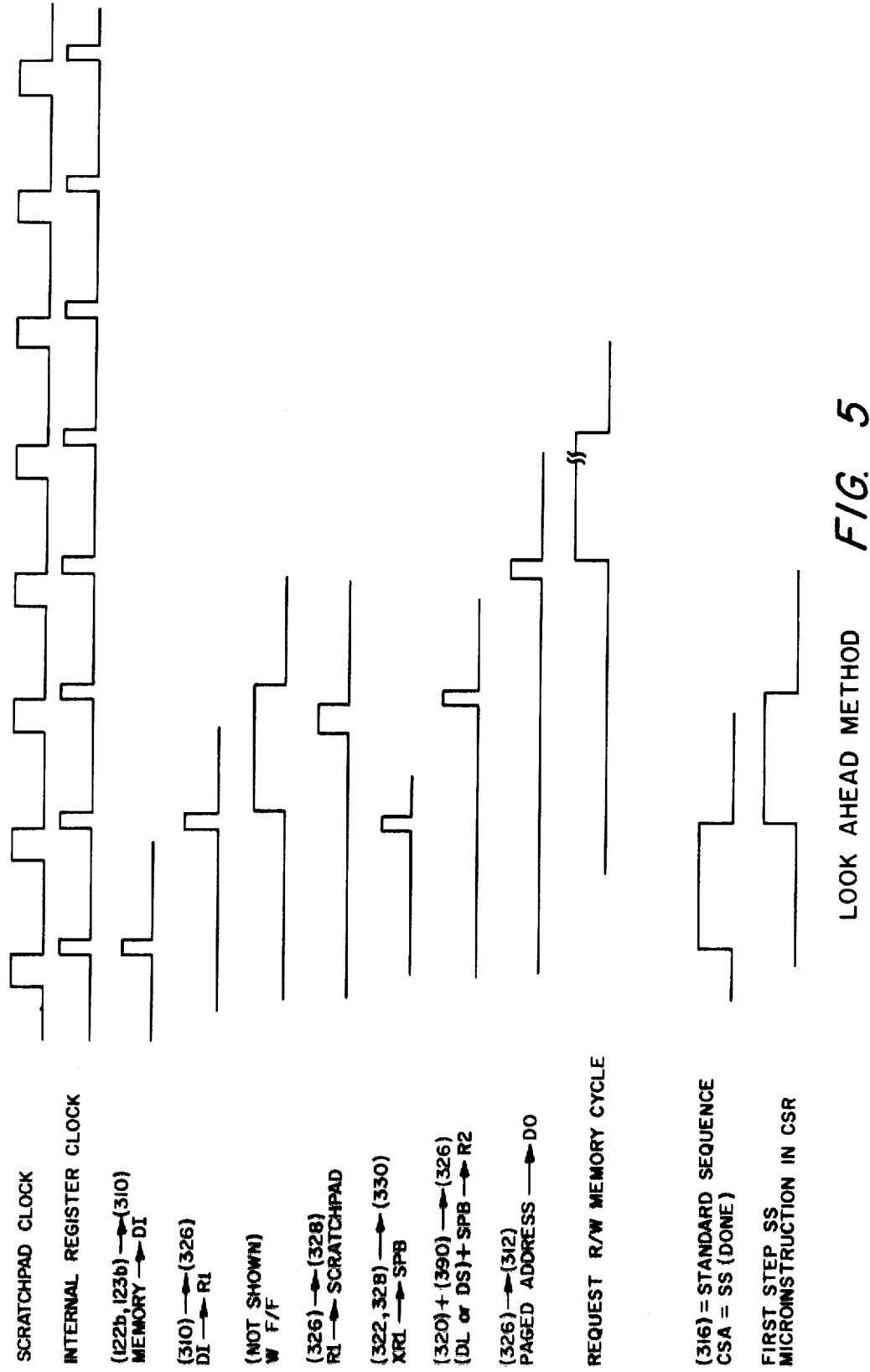

4,110,822

INSTRUCTION LOOK AHEAD HAVING PREFETCH CONCURRENCY AND PIPELINE FEATURES

This is a continuation of application Ser. No. 562,272, filed Mar. 26, 1975, now abandoned.

The following patent applications filed in the U.S. Patent Office on an even date with the instant application and assigned to the same assignee as the instant application are hereby incorporated by reference to this application:

A. Processor for Input-Output Processing System, invented by Marion G. Porter, et al., having U.S. Ser. No. 562,317, 3/26/75 and which issued as U.S. Pat. No. 3,976,977 on Aug. 24, 1976.

B. Priority Interrupt Mechanism, invented by Michael Monohan, G. Wesley Patterson and Jamie Calle, having U.S. Ser. No. 562,315, 3/26/75 and which issued as U.S. Pat. No. 4,011,783 on Jan. 4, 1977.

C. Dispatcher Mechanism, invented by Michael Monahan and G. Wesley Patterson, having U.S. Ser. No. 562,314 and filed in the U.S. Patent Office on 3/26/75.

BACKGROUND OF THE INVENTION

1. Field of the Invention

This invention relates to data processing systems and more particularly to a general purpose computer system having an instruction fetch and execute mechanism having a look ahead feature employing prefetch, concurrency and pipe line computer concepts of instruction fetch and execution.

2. Description of the Prior Art

There are many computer systems employing look ahead features in instruction fetch and execution. They have variously been described in the prior art as instruction prefetch, instruction overlap, instruction concurrency, assembly-line processing and pipe line processing. Some typical examples are listed below.

In U.S. Pat. No. 3,254,329, issued May 31, 1966, an arrangement is disclosed for permitting a plurality of different steps associated with a plurality of different instructions to be carried out simultaneously. In this particular system, there is provided at least two advanced instruction registers, a plurality of addressable accumulator registers and an arithmetic unit. The instruction format contains a signal address of an addressable accumulator register which contains an operand to be manipulated by the arithmetic unit and also the address of the accumulator register which is to store the result of the computation. Additional bits of the instruction indicate the address in main memory of an operand to be processed or alternatively indicates an address to which control is to be transferred. Further additional bits represent the address of another addressable register which stores a value used to modify the main memory address of the operand to be processed by the instruction. In that arrangement, during the extraction of the operand associated with the instruction to be executed, the contents of the program counter is transferred to the arithmetic unit to be incremented by one. This address output is decoded, and in the next instruction is abstracted and deposited in one of the two stage registers. In the same minor cycle but during different time periods, the adder adds the operand address of the instruction to be executed to the contents of the specified addressable accumulator register to obtain the operand from memory to be manipulated in accordance with the operation specified by the instruction to be executed and also the modification of the program counter. When the above operations have been completed, the modified instruction to be executed is stored in the second instruction register and the succeeding instruction is extracted and stored in the first storage register. Subsequently, in the same manner, a new instruction is extracted after the incrementing of the program counter and stored in the first instruction register when the previous instruction has been transferred to the second instruction storage register and the instruction to be executed is almost completely executed. Thus, the extraction of other instructions and the processing thereof may occur during the execution of a previous instruction. This patent also discloses means for comparing the address of the result stored against the addresses of the operands specified in the two instructions stored in the storage registers for determining whether or not the above overlap operation should continue without interruption. If the comparison shows equality between the addresses of the result and either of the operand addresses in the next two instructions, then the overlap operation is modified. If the result is the same as the address of the addressable accumulator register to supply an operand for the instruction to be next executed, the overlap operation is not modified and the results being computed are transferred directly back to the arithmetic unit for further processing.

This reference shows an overlap operation wherein an instruction fetch of a succeeding instruction precedes the completed execution of a previously extracted instruction. The address of the instruction which designates the contents of the addressable accumulator register storing an operand for processing by the arithmetic unit is stored in the register until such time as the arithmetic unit has computed a result based on this instruction for comparison with either of the operand addresses and the next two instructions. Although instructions are immediately available to the processor after completion of the currently executing instruction, there may still be loss of time in instruction execution due to the fact that an arithmetic unit may be performing an arithmetic operation in accordance with an instruction taken from main memory while the next instruction although taken out of main memory and available, remains idle even though it does not involve an arithmetic operation being performed by the currently executing instruction. U.S. Pat. No. 3,202,969 takes note of the above problem in loss of time and provides for the extraction of an instruction from memory and its execution initiated while the arithmetic operation of a currently executing instruction is taking place.

A further prior art reference along these lines is an article entitled, "System Design of a Small Fast Digital Computer", IEEE, December, 1963 which discloses an advanced control or look ahead computer arrangement for processing more than one instruction at a time. The arrangement includes a control unit which comprises an instruction control for fetching instructions from a memory well in advance of their execution, operand control which modifies the addresses of operands and calls for the operands and an arithmetic control which executes the function specified by the instructions on the operands.

Still another prior art reference along these lines is U.S. Pat. No. 3,162,841, issued Dec. 22, 1964 which provides storage registers for storing instruction addresses and operand levels prior to execution and an advanced adder operative to compute the address of the next instruction such that when the instruction contained in one of the look ahead registers is transferred to the arithmetic unit for execution, the instruction address in an associated look-ahead instruction counter, which represents the address of the next instruction, is transferred to an instruction counter buffer wherein the buffer contains the address of the next instruction to be executed during the execution of any given instruction.

Perhaps the best example of a computer system utilizing the pipe line computer principle is to be found in an article entitled, "The IBM System/360 Model 91: Machine Philosophy and Instruction Handling" IMB Journal, January, 1967, pages 8-24. The subject article mentions that the primary organizational objective for high performance is concurrency and to overlay the separate instruction functions to the greatest degree possible. A diagram on page 9 of the reference illustrates the concurrency among successive instructions. It can be seen that a second instruction may be accessed prior to the decoding and generating of the operand address and fetching of the operand associated with a first instruction. This pipe line processing technique sometimes referred to as assembly line processing can increase the internal computational performance of a computer machine by one or two orders of magnitude over conventional processing. However, the techniques suffer mainly in such processing applications as list processing, branching and interrupts and is due primarily to the fact that simple communication between adjacent assembly line stations is inadequate. (See second paragraph of second column of page 12, of the January, 1967, IBM Journal).

Since it has been demonstrated that approximately 33 percent of all executed instructions are branch instructions, improvement in look ahead features which provides better communication from the last step of one instruction to the first step of another instruction is desirable.

OBJECTS OF THE INVENTION

It is an object of the invention to provide an improved look ahead feature during instruction fetching and execution.

It is another object of the invention to provide better communications between the last step of a currently executing instruction and the first step of the next instruction to be executed.

It is still another object of the invention to concurrently execute the last step of the currently executing instruction and the first step of the next instruction whereby the last step of the currently executing instruction provides processing for the next instruction to be executed and the first step of the next instruction to be executed provides processing to terminate the currently executing instruction.

SUMMARY OF THE INVENTION

In accordance with the above and other objects of the invention, an instruction look ahead mechanism is provided whereby in the last step of the currently executing software instruction the processing of the next software instruction to be executed is commenced. Simultaneously with this last step the first step of the next software instruction to be executed is terminating the currently executing instruction. Hence the currently executing software instruction does not require an additional cycle to terminate itself since that cycle is utilized to initiate processing of the next software instruction. Since the processing of the next software instruction to be executed commences one cycle before the end of the currently executing software instruction, and since during this same cycle the next instruction to be executed is taking the steps to terminate the currently executing software instruction, two clock cycles have been saved. This is particularly advantageous during branching operations where the next instruction to be executed may not already be in the instruction look ahead register.

BRIEF DESCRIPTION OF THE DRAWINGS

FIGS. 2A-2M are data structure diagrams of various registers utilized by the invention.

FIG. 4 is a timing diagram of the conventional method of instruction fetch and execution.

FIG. 5 is a timing diagram of instruction fetch and execution of the invention.

DESCRIPTION OF THE PREFERRED EMBODIMENT

Figure 1:
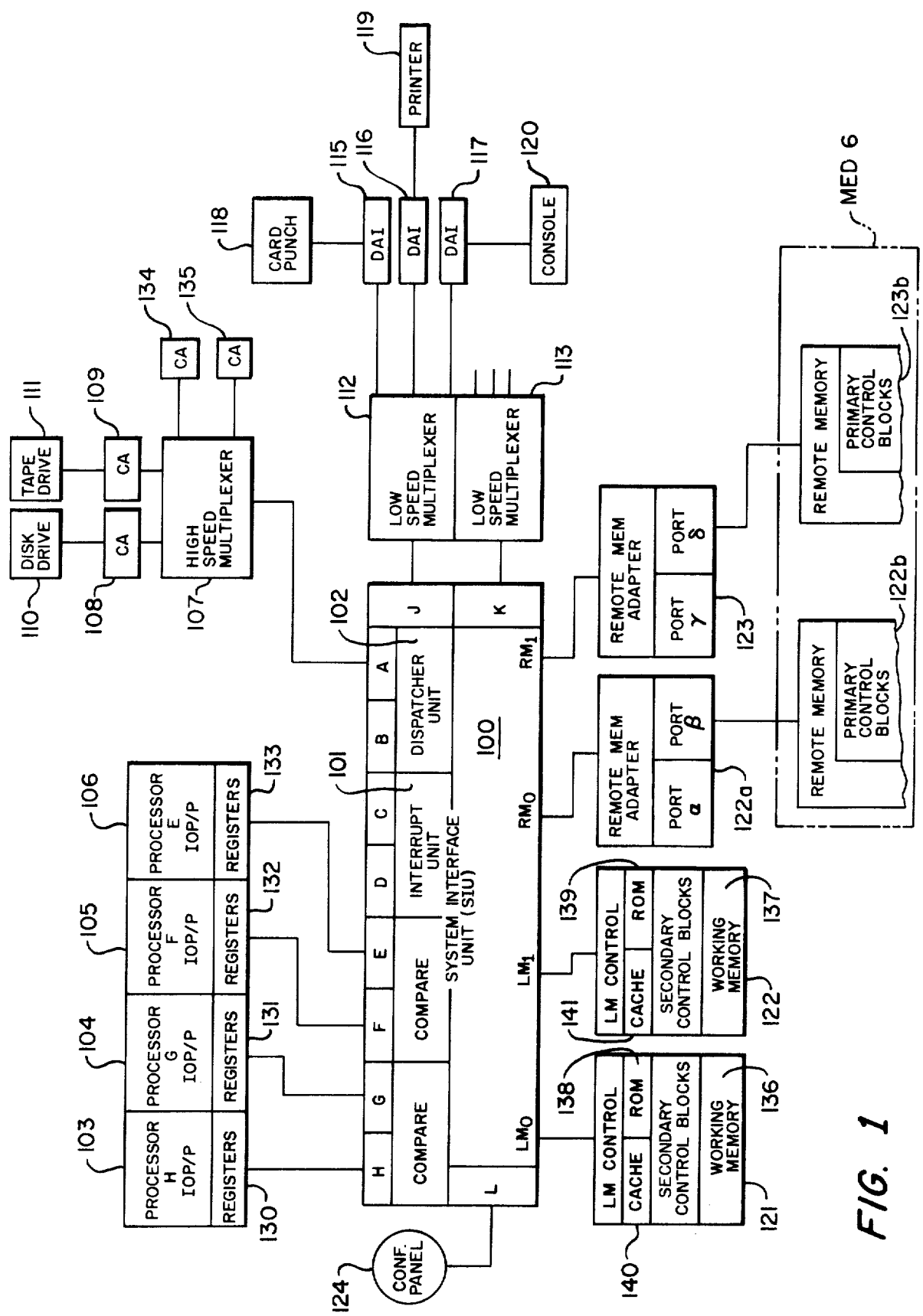
FIG. 1 is a schematic block diagram of a typical computer system utilizing the invention.

Referring now to FIG. 1 there is shown a typical computer system utilizing the invention. The System Interface Unit (SIU) 100, containing the priority interrupt and dispatcher unit mechanisms 101 and 102 respectively, provides connections between the elements of the computer processing system. In addition to providing for access of local or remote memory 121, 122 and 122a, 123 respectively by the active module processors 103-106, configuration panel 124 etc., the SIU 100 provides for direct addressing of the high and low speed multiplexors 107 and 112, 113 respectively and control adapters 108, 109, 134, and 135 by the processors 103-106.

The interrupt unit 101 and the dispatcher unit 102, are more fully described in references B and C above; they control the interrupt discipline and perform processor dispatching as required.

Each processor designated IOP/P 103-106 typically contains 16 registers 130-133 for each level of priority assigned to a process or a total of 128 registers per processor capable of storing 128 words. These registers 130-133 are sometimes referred to in this specification as the scratchpad memory and are more fully described infra. Each processor IOP/P is a general purpose computer processor with a conventional complement of register-register, register-memory, immediate, branch, bit field and shift instructions. These processors may be used as input/output processors (IOP) whose functions include initiation and termination of I/O command sequences, fetching, checking and translating channel programs, and direct control of low speed peripheral devices such as unit record and data communications equipment. Processors 103-106 are attached to and communicate with the SIU 100 via ports H, G, F, and E respectively.

The processor local memory 121, 122 interfaces with the SIU and the processors 103-106 via ports $L_{M0}$ and $L_{M1}$ and H-E respectively. Each of the local memories 121, 122 is organized as a read-write store 136, 137 respectively, plus read only memory ROM 138, 139 with an optional cache memory 140, 141. Width of the local memory interface $LM_0$, $LM_1$ is 36 bits plus 4 bits for parity. Local memory size is typically 256K or 512K bytes wherein each K is equal to 1024 bytes.

The remote memory adapters 122a, 123 are utilized when the SIU with its processors and peripherals is part of a larger general purpose computer system. The Remote Memory Adapters (REMA) 122a, 123 then provide a means of exchanging control and data transfers between the processors 103–106 and remote memories 122b and 123b, of another general purpose computer system designated Med 6 (not shown herein). Up to 2 ports $\alpha$, $\beta$ and $\gamma$, $\delta$ for each of the REMA units 122a, 123 respectively are provided, each port having a 40-bit data path for input and for output between the computer system shown and described herein and a large computer system not shown herein. The REMA units 122a, 123 are connected and communicate with the SIU 100 via ports $RM_0$ and $RM_1$. Note that primary and secondary control blocks (to be more fully described infra) are stored in the remote memories 122b, 123b, and local memories 121, 122 respectively.

A high speed multiplexor 107 provides direct control of data transfers between high speed peripheral devices (disk drive 110, tape drive 111) and central or local memory 121, 122. The high speed multiplexor 107 interfaces between the SIU and the peripherals via port A.

Each low speed multiplexor 112, 113 permits direct control by a processor 103–106 of a low-speed device such as card punch 118, printer 119 and console 120, via ports J and K and device adapter interface unit DAI 115, 116 and 117 respectively.

Referring now to FIGS. 2A–2L the general visible registers 2A are those processor registers which can be accessed with processor software instructions. The following constitute the visible registers of each processor IOP/P:

| | | |
|---|---|---|
| a. | Process State Register | (PSR) |
| b. | Instruction Counter | (IC) |
| c. | Page Table Base Register | (PTBR) |
| d. | General Registers | (GR's) |
| e. | Control Block Base Register | (CBBR) |
| f. | Process Control Register | (PCR) |

The PSR, IC, PTBR and GR's are held in scratchpad 326 of sixteen 36-bit registers and are assigned as shown in FIG. 2A.

Process State Register (PSR) FIG. 2B — The Process State Register holds information essential to the control of the current process. It has the format of FIG. 2B:

| | |
|---|---|
| P (Bit 8) | Privilege. Master (0) or Slave (1) Mode. |
| R (Bit 9) | External Register. Certain predetermined non-IOP/P registers cannot be altered if this bit is set. |
| A (Bit 10) | Address Mode. Absolute (0) or Paged (1) Mode. |
| CC (Bits 11–12) | Condition Code. Meaning of the condition code is given for each IOP/P instruction. In general, correspondence is:<br>Result = 0   CC 0<br>Result   0        1<br>Result   0        2<br>Overflow        3 |
| C (Bit 13) | Carry bit out of adder. Carry (1) or No Carry (0) resulting from execution of instructions using arithmetic functions of the adder. (Adds, substracts, multiply, divide, compare and negate.) |
| Process Timer (Bit 14–35) | A timer which is decremented periodically while this process is active. |

-continued

| | |
|---|---|
| | A process timer runout exception occurs when the timer value reaches zero. The timer is decremented once every 512 processor cycles. For a cycle time of 80 nonoseconds, this results in a minimum value of about 40 microseconds, and a maximum value of 2.67 minutes. |

Due to the frequency of access to the PSR, either for modification or reference, the actual value for the current process is held in a special register outside the general register scratchpad (not shown). For performance reasons, changes in the register are not reflected in general register 0 $GR_0$. This scratchpad location assigned to the PSR is used only to safestore the current PSR value in the event of an interrupt.

All instructions which specify $GR_0$ as a destination operand will cause the result to be stored in the special register used to hold the PSR, and $GR_0$ will not be changed. References to $GR_0$, and not the current PSR. A special instruction copies the PSR to a GR so that it may be used as an operand.

Instruction Counter (IC) FIG. 2C — The Instruction Counter holds the address of the current instruction. Since instructions must be half-word aligned, the least significant bit is always zero. The IC is held in general register 1 $GR_1$, and it has the format of FIG. 2C:

| | |
|---|---|
| L/R (Bit 0) | Local/Remote (0) Specifies Local memory 121, 122; (1) Specifies Remote memory 122b, 123b. |
| S (Bits 1–3) | Steering. Specifies which remote memory for remote memory references. |
| RFU (Bits 4–8) | Reserved for Future Use. |
| IC (Bits 9–35) | The (byte) address of the current instruction. |

Page Table Base Register (PTBR) FIG. 2D — The Page Table Base Register points to the page table used to provide paged address relocation for the current process. It may be loaded only in master mode. The PTBR is held in GR15, and it has the format of FIG. 2D:

| | |
|---|---|
| L/R (Bit 0) | Local/Remote. |
| S (Bits 1–3) | Steering. |
| Prog. # (Bits 4–8) | Program Number. A field which may be used by software to carry additional program identification. This field is ignored by the processor hardware. |
| Page Table Base (Bits 9–29) | This is the absolute address of the base of the table of Page Table Words for this process. Since the address is filled to 27 bits by adding six zeros at the right, page table addresses must be congruent to 0 mod 64 (bytes). |
| Key (Bits 30–35) | The key is a process identifier used to associate Page Table Words with processes. |

General Registers (GR) — The remaining 13 registers $GR_2$–$GR_{14}$ of visible registers FIG. 2A are general registers. These may be used as source or destination operands, or as first or second-level address modifiers.

Figure 2H:
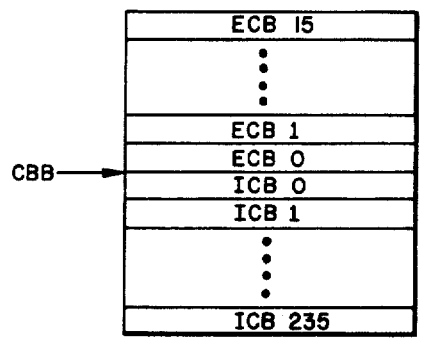
Figure 2I:
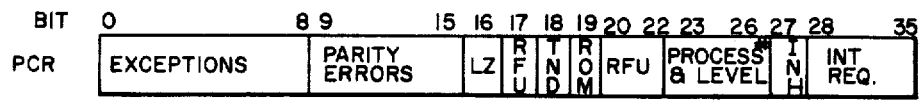
Figure 2J:
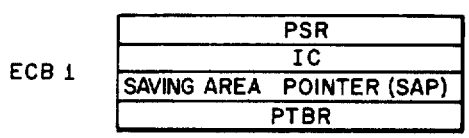

Control Block Base Register (CBBR) FIG. 2E — The Control Block Base (CBB) FIGS. 2F-2G is an absolute address which points to the base address in memory of the Exception Control Block (ECB) FIG. 2J and Interrupt Control Block (ICB) FIG. 2J tables.

The Control Block Base Register is actually held in the scratchpad location assigned to $GR_0$ for the highest priority process level. Two CBB values, a primary and a secondary are held in the register, which has the format of FIG. 2E.

The Primary CBB FIG. 2F is used for all exceptions, and for all interrupts except those associated with local memory errors. When used, the primary CBB is aligned as shown on FIG. 2F.

This alignment permits the location of bases of the ECB and ICB tables on any 512-word boundary in any memory.

Referring to FIG. 2F:

| | |
|---|---|
| L/R (Bit 0) | Local or Remote memory (Same as FIG. 2C). |
| S (Bits 1-3) | Same as FIG. 2C. |
| RFU (Bits 4-8) | Same as FIG. 2C. |
| CBB1 (Bits 9-24) | Address of primary Exception Control Block or primary Interrupt Control Block. |
| Bits 25-35 | Fill with zeros. |

The secondary CBB FIG. 2G is invoked for interrupts due to local memory errors. When used, the secondary CBB is aligned as shown on FIG. 2G.

This alignment permits the location of the bases of the alternate ECB and ICB tables on a 512-word boundary within the first 64K of any memory.

Referring to FIG. 2G:

| | |
|---|---|
| L/R (Bit 0) | Local or Remote memory (Same as FIG. 2C). |
| S (Bits 1-3) | Steering. Same as FIG. 2C. |
| RFU (Bits 4-8) | Reserved for future use. |
| Bits 9-17 | Fill with zeros. |
| CBB2 (Bits 18-24) | Address of secondary Exception Control Block or secondary Interrupt Control Block. |

The Exception Control Blocks and Interrup-Control Blocks are stored as shown on FIG. 2H with respect to the CBB. Note for the address of Interrupt Control Blocks ICB's relative to the CBB, the relative address of the ICB's is added to the CBB; whereas for the address of exception control blocks ECB's, their relative address is substituted from the CBB.

Process Control Register (PCR) — There is one Process Control Register (PCR) common to all levels. It has the format of FIG. 2I.

| | |
|---|---|
| Exceptions (Bits 0-8) | Each bit indicates a non-main memory MME exception of a particular type. |
| Parity Errors (Bits 9-15) | Identifies the point in the processor at which a parity error was detected. |
| LZ (Bit 16) | No response to level zero interrupt present. |
| RFU (Bit 17) | Reserved for future hardware use. |
| T&D (Bit 18) | T&D Mode. Halt instruction stops processor. All interrupts are ignored. |
| ROM (Bit 19) | ROM bit. Controls access to Read Only Memory. |
| RFU (Bits 20-22) | Reserved for future hardware use. |
| PROC # & LEVEL (Bits 23-26) | Processor number and priority Level of Process. |
| INH (Bit 27) | Interrupt inhibit bit. |
| INT. REQ. (Bits 28-35) | Interrupt request bits. Each bit set indicates a software set interrupt at a level corresponding to the bit position. Request level 7 (Bit 35) is always set. Processor set interrupts at levels 0-7 use ICR's 8-15 respectively. |

Exceptions

Exceptions are processor-detected conditions which cause automatic entry to an exception processing routine. Exception conditions may be created deliberately, or they may be the result of a programming error or a hardware error outside the processor. Exception conditions are defined as shown below. For non-MME exceptions, correspondence is shown between type and bit positions of the PCR FIG. 2I.

| PCR Bit of FIG. 2I | Exception Type |
|---|---|
| 0 | Operation not complete (ONC). No response on ARA or ARDA from SIU. |
| 1 | Page address bounds fault (Key check). |
| 2 | Page access fault. |
| 3 | Page not resident in memory. |
| 4 | Illegal operation (invalid instruction, illegal slave instruction, or illegal slave operation). |
| 5 | Process Timer run out. |
| 6 | Overflow if PSR CC = 11, Divide Check if PSR CC = 00. |
| 7 | Lockup fault (inhibit interrupts for more than 40 μs). |
| 8 | Address misalignment. |

Exception conditions are identified by a four-bit exception number. For master mode entry exceptions, this number is taken from bits 10-14 of an instruction (not shown). In all other cases, the exception number is zero. The exception number is used as an Exception Control Block Number (ECB #) to identify a four-word Exception Control Block (ECB) which points to the exception processing routine. The byte address of an ECB is given by ECG address = Control Block Base − 16 (ECB # + 1).

The format of the ECB is shown on FIG. 2J. Referring to FIG. 2J, a PSR word FIG. 2B is held in the first word; an IC word FIG. 2C is held in the second word; a Saving Area Pointer (SAP) for processor pair 0 is held in the third word of ECB 0, and a SAP for processor pair 1 is held in the third word of ECB 1 FIG. 2H.

Before an exception processing routine can be entered, essential information about the current process must be safe-stored. This is performed as a part of the processor response to an exception. Since occurrences of exceptions may be nested (i.e., a second exception may occur before completion of processing for the first), a stack is used to provide space for process safestore. The stack pointer is called the Saving Area Pointer (SAP), and it is held in the third word of ECB 0. Multiprocessor systems require a second stack, and the SAP for the second processor is held in the third word of ECB 1.

Figure 2K:
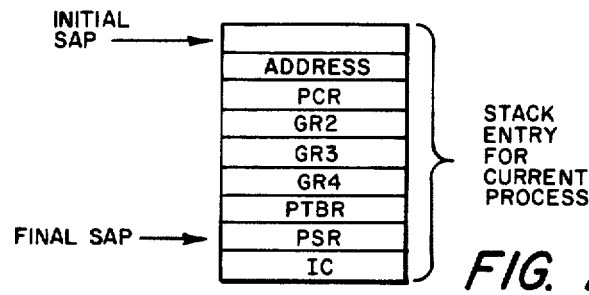
Figure 2L:
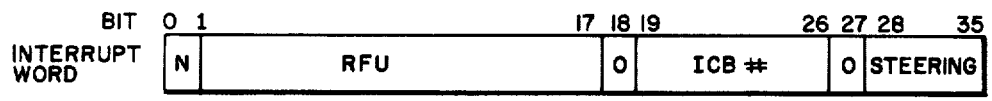
Figure 2M:
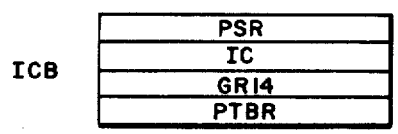

When an exception is detected, the appropriate Saving Area Pointer is retrieved, and information about the current process is safestored in the stack in the order shown on FIG. 2K where ADDRESS, IC, GR2-GR4, PCR, PTBR, PSR are defined supra. The Saving Area Pointer is updated accordingly.

The IC stored in the stack FIG. 2K points to the instruction following the one in process at the time the exception was detected. The address stored in the last stack location is the last address of interest generated before the exception was detected. It is primarily for exceptions involving addresses, including operation not complete, bounds, access and missing page exceptions.

After this information about the current process has been safestored in the stack 2K, the PSR, IC, and PTBR are loaded from the appropriate Exception Control Block, and the address of the Saving Area Pointer used by this processor is loaded into GR$_2$. This completes the entry to the exception processing routine.

Upon completion, the exception processing routine issues a special instruction (RMM) (not shown) to return to the process in which the exception was encountered. This instruction loads the PSR, IC, GR2, GR3, GR4, and PCR and the PTBR from the stack, and decrements the Saving Area Pointer. If exceptions and RMM instructions do not occur in pairs, the exception processing software must ensure that the stack is properly maintained. There are no checks for errors in software manipulation of the stack pointer, or for stack overflow or underflow.

INTERRUPTS

Interrupts are events detected outside the processor which require a processor response. Interrupts in the IOP/P may be assigned to one of eight priority levels. Level 0 is the highest priority level, and level 7, the lowest. In order to minimize the time required to answer an interrupt request, the IOP/P provides a complete set of registers for each of the eight levels. When an interrupt causes the initiation of a new process, the current process is left intact in the registers assigned to the current level. Control may be returned to the interrupted process simply by reactivating that process level. The need to safestore and restore interrupted processes is eliminated, along with the accompanying overhead.

The 16 registers for each level are held in successive 16-register block in the 128-word IOP/P scratchpad 328. Registers for level 0 are held in scratchpad locations 0–15. Since the PSR for level 0 is never transferred to the scratchpad (level 0 cannot be interrupted), scratchpad location 0 is used to hold the Control Block Base although other registers at level 0 would be used. Communication between registers at different levels is possible only via the master mode copy instructions (not shown) which address the scratchpad.

The IOP System Interface Unit (SIU) constantly monitors both the current process level of the processor and requests for interrupts from I/O system modules. Each interrupt request specifies the number of the processor to be interrupted, the priority (level number) of the request, and steering to identify the interrupt requestor (see Interrupt word FIG. 2). This information is held in each module which may request interrupts, and for most modules it is set using programmable interface commands.

Whenever an interrupt request is present at a level higher than the current processor level, the SIU raises a higher level interrupt present line to the processor by providing an interrupt signal (see reference B supra). If several interrupt requests are present at the same level, the SIU determines which request is passed on to the processor on the basis of priorities established by port number.

If the current process is not interrupt inhibited, an interrupt request causes the IOP/P to suspend the current process and to accept an interrupt word from the SIU. The interrupt word has the format of FIG. 2L. Referring now to FIG. 2I:

| | |
|---|---|
| N (Bit 0) | New. This bit if set indicates that the interrupt is a new one. If not set, the interrupt word is that of a previously interrupted request that is to resume. |
| M (Bit 1) | Not used. |
| RFU (Bits 2–17) | Reserved for future use. This field must be 0 but will not be checked to ascertain that the field is 0. |
| Bit 18 | Set to 0. |
| ICB # (Bits 19–26) | Interrupt Control Block Number. |
| STEERING (Bits 28–35) | Steering. This field identifies the interrupt requestor. Bits 28 to 35 are generated by the SIU and identify the source module (STU port number) of the interrupt. |

To initiate the interrupt processing routine, four registers are loaded from the interrupt control block FIG. 2J. When the PSR is loaded, the steering field from the interrupt word is inserted into the steering field of the PSR. The other registers, the IC, GR14, and PTBR, are loaded directly from successive words in the ICB FIG. 2J.

A release instruction (not shown) (REL) is used to exit processes entered as the result of an interrupt. After a REL the SIU selects for execution the highest priority process waiting for the processor.

This process may be one that was previously interrupted, or a new process to be initiated as the result of an interrupt request. At the same priority level, previously interrupted processes have priority over new interrupt requests. Through hardware (see reference B supra) and software loading of the PCR, a processor may present to the SIU an interrupt at any level, 0–7. However, in order to provide a well-defined response to a REL executed at any level, the PCR bit requesting a level-seven interrupt is always set.

If a new process is to be entered as a result of a REL, the processor response is similar to that triggered by a normal interrupt, including acceptance of an interrupt word from the SIU and access to an ICB. If a previously interrupted process is to be re-entered, the SIU supplies only the level number and the fact that an old process is to be re-entered. Since the process state at the time of its interruption is intact in the register scratchpad, this is the only information required to restart the process.

Figure 2N:
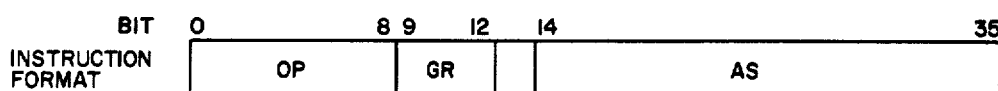
FIGS. 2N and 2O show the format of a typical instruction utilized by the invention.

Referring now to FIG. 2N there is shown a typical scratchpad register instruction. This instruction causes the transfer of information between the IOPP scratchpad memories 328, 334, 326 and the general registers. The first 8 bits of the instruction comprise the field for the operation code. GR is a 4 bit field at bit positions 9–12 which specifies one of the general registers in the scratchpad memory 328. AS is an address syllable occupying bits 4, 14–35 of the instruction used to calculate the effective address Y. This address is interpreted as the address of a register outside the IOPP/P.

Figure 2O:
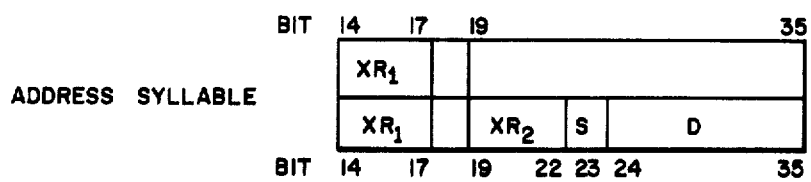

Referring now to FIG. 2O there are shown two formats that the address syllable AS of GRX instruction shown on FIG. 2N can take. The top format shows an address syllable having a long displacement D whereas the bottom format of FIG. 2O shows an address syllable having a short displcement D. Referring now to the long displacement format, XR1 at bit positions 14–17 is the address of an index register $XR_1$. Bit position 18 specifies whether a long or short displacement is to be utilized. When this bit is set to zero, it indicates a long displacement D whereas when it is set to one, it indicates a short displacement D. At bit positions 19 there is shown a sign bit S whereas bit positions 20–35 are reserved for the long displacement address B. Referring to the bottom format of address syllable AS in FIG. 20 $XR_1$ at bit positions 14–17 again is the address of an index register 1. As previously noted, bit 18 indicates whether a long or short displacement D is utilized. XR2 occupying bit positions 19–22 is the address of a second index register R2. S occuying bit position 23 is the address syllable AS in a sign bit; whereas D occupying bit positions 24–35 is the short displacement address.

General Description of Processor IOP/P

Figure 3:
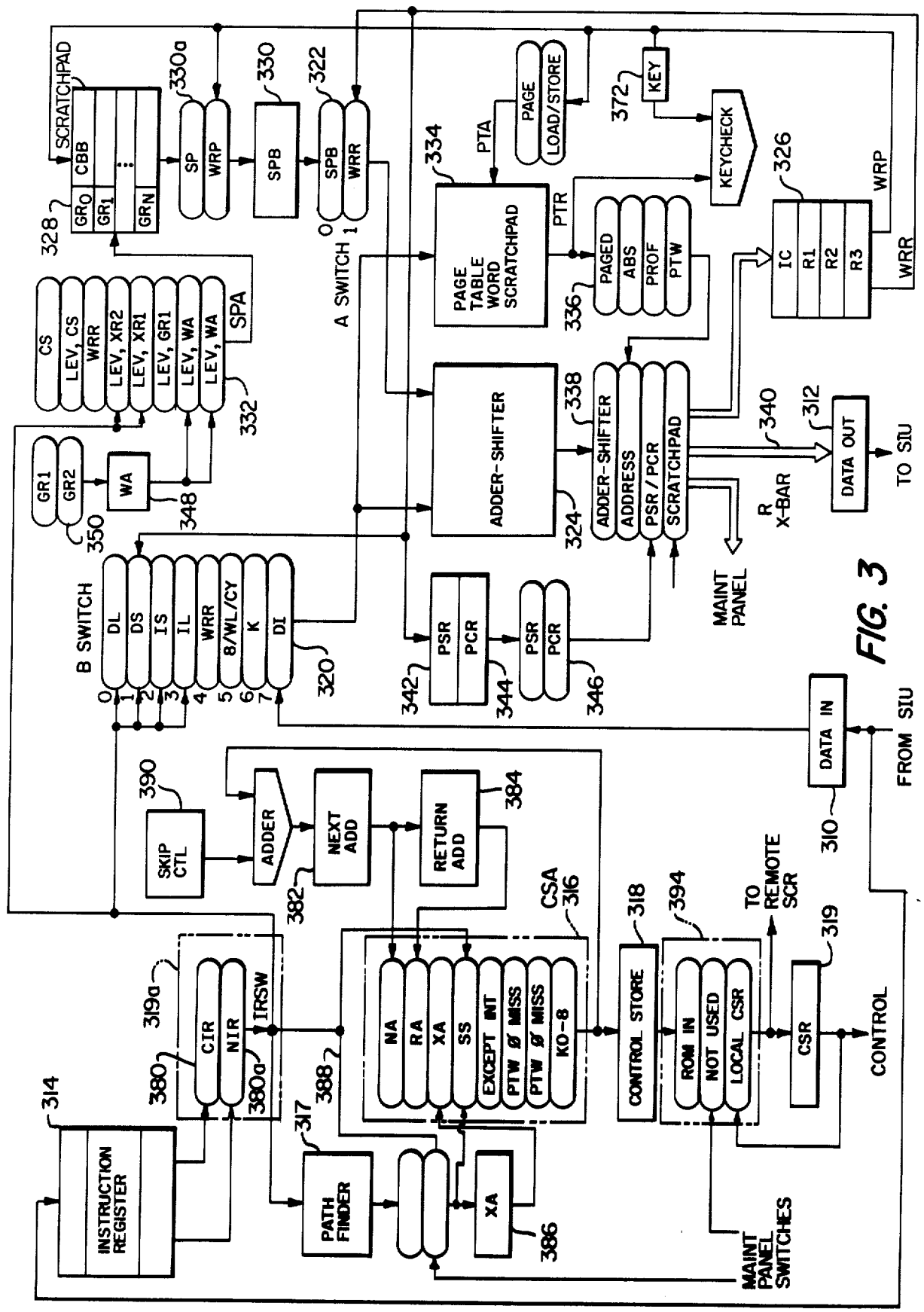
FIG. 3 is a block diagram of a processor in accordance with the invention.

FIG. 3 is a block diagram of a processor in accordance with the present invention. Data and instructions from the system interface unit (SIU) are provided at register 310 and processed data is provided to the SIU at data out register 312. As data and instructions are clocked into register 310 a parity check is made and parity errors are noted.

Instructions are placed in a "look ahead" dual readout register 314 which provides four words of buffering for instructions. An 8-level control store address switch 316 (which may typically be a multiplexor) provides an address to control store 318. (Data Selectors, typically are multiplexors and are well known in the art and commercially available. See The Integrated Circuit Catalog for Design Engineers published by Texas Instruments, pages 9-339 to 9-364.) One level of the CSA switch 316 is provided by the instruction register 314 via pathfinder unit 317. The control store 318 contains the microinstructions which control data manipulations, and an addressed microinstruction is stored in control store register 319.

Data from input register 310 is loaded into one level of the eight-level "B" switch 320 (also commercially available) which, along with two-level "A" switch 322 (commercially available), provides operands for the adder/shifter network 324. The "B" switch 320 is controlled by a field in the control store register 319. "A" switch 322 provides inputs from the dual read-out working registers 326 or from general registers scratch pad 328 via SPB register 330. The dual read-out register 326 contains 3 working registers and an image of the instruction count-(IC) contained in the general register scratchpad 328. The WRR output from working register 326 is supplied to "A" switch 322, and the WRP output from general register 326 is supplied to the general register scratch pad 328. A seven-bit address for the general register scratchpad is generated in a one of eight switch (SPA) 322 (commercially available).

The adder/shifter network 324 which receives operands from "B" switch 320 and "A" switch 322 performs all of the arithmetic, logical, and shift operations required for address development and instruction execution.

A page table word (PTW) scratchpad 334 provides storage of 16 page table words for each of the 8 levels of "B" switch 320. The four-level address switch 336 (commercially available) concatenates addresses for either programmable interface-commands or read-/write memory cycles (either paged or absolute).

Output from the adder/shifter network 329 may be supplied through a four-level output switch 338 (commercially available) to result crossbar (R-XBAR) 340 and to data output register 312. The R-XBAR provides simultaneous transfer of its input to both the data output register 312 and the working registers 326. Switch 338 also receives inputs from a process state register (PSR) 342, from a process control register (PCR) 344 through switch 346, and from the general register scratchpad 328.

General Register Scratchpad 3

The General Register (GR) scratchpad 328 contains 128 forty bit registers. Each register consists of 4 nine bit bytes with a parity bit per byte. Data written into the scratchpad comes from one of the four working registers on the WRP output of the dual readout register bank used to implement the working registers. Registers included in the scratchpad are a process state register (PSR), an instruction counter (IC), a page table base register (PTBR), thirteen general registers (GR), and a process control register (PCR). The seven bit address for the scratchpad is generated in one of eight switch (SPA) 332. The switch control inputs are wired directly to the Control Store Output register (CSR) 319. The most significant three bits of the address define one of eight levels and the least significant four bits define one of sixteen registers within the level. The level is supplied by Active Interrupt Level (AIL) lines (not shown) from the SIU for six of the eight positions. The eight address sources are as follows:

(0) Seven bits of the constant field (2–8) of the CSR which allows addressing any register in any level.
(1) The AIL lines and four bits of the CSR constant field (5–8) which allows addressing any register in the current level.
(2) The WRR output of the dual readout working registers bits 29–35. This allows a working register to provide the address for either initialization or software addressing (CSPG or CGSP).
(3) The AIL lines and bits 19–22 of the current instruction. This provides the XR2 read address for second level indexing.
(4) The AIL lines and bits 14–17 of the current instruction. This provides the XR1 read address for first level indexing or the GR/GR2 read address for operand access.
(5) The AIl lines and bits 9–12 of the current instruction. This provides the GR1/GR read address for operand-access.
(6) the AIl lines and bits 0–2 of the Write Address (WA) register 48 with the least significant bit wired to logical one. This provides the odd address of an even odd pair read or write instruction.
(7) The AIl lines and bits 0–3 of the WA register. This provides the address for all softwre writes into a GR at the current level. This includes GR loads and returning execution results to the destination GR.

The output of the scratchpad goes to the one of two switch 330A into the SPB register 330 which is also an input to the Result Crossbar (R-XBAR) 340 through adder shifter network. The switch into SPB allows operations on a GR and a working register or on two working registers by loading one into SPB. The switch 330A into SPB 330 is controlled by the SP control field in the CSR 319.

The Write Address (WA) register 348 can be loaded from either bits 9–12 or 14–17 of the current instruction (see reference A supr). This provides the address for loading a General Register (GR) or returning a result to a GR. This is necessary since the GR address in the instruction being executed is no longer available out of the dual readout Instruction register once the IC is updated. The GR address is therefore saved in WA and used for the write operation by setting a Write (W) flip/flop (see ref. A supra) associated with WA. W resets on the first clock after it is set unless the WA control field in the CSR once again sets it (two word load of GR). A GR scratchpad write clock pulse is generated on all clocks occurring while W is set unless WA=0 in any mode or WA=15 is slave mode.

SPB register 330 is a 40 bit register (4 bytes with parity per byte). It provides buffering for words read out of the scratchpad and eliminates the scratchpad access time from the time required for an Adder/Shifter operation. Parity is checked on the data in the SPB register 330. The SPB load clock is controlled by the SCR SP control field 319.

A and B Operand Switches.

The A and B operand switches provide the two operands for the Adder/Shifter network. A switch 322 selects either SPB or the WRR output of the dual readout working registers. The selection is controlled by a bit in CSR 319. However, the control is forced to select WRR if W is set and the address in WA is equal to XR1. This causes the new value of XR1 or GR2 to be used if the previous instruction modified them. The switch output is forced to logical zeros if the DL position is selected in B switch 20 and no indexing is called for (XR 1=0).

B switch 320 selection is controlled by a three bit field in CSR 319. However, the least significant bit is forced to logical one if the DL position is selected and second level indexing is required (bit 18 of the Instruction = 1. See reference A). The eight B switch positions are formatted as follows:

(0) Bits 0–19 are equal to IRSW 319a bit 19. Bits 20–35 are wired to IRSW bits 20–35. This is the displacement field for either first level or no indexing.
(1) Bits 0–23 are equal to IRSW bit 23. Bits 24–35 are wired to IRSW bits 24–35. This is the displacement field for second level indexing.
(2) Bits 0–30 are equal to IRSW bit 8. Bits 31–35 are wired to IRSW bits 9–13. This is the short immediate value.
(3) bits 0–17 are equal to IRSW bit 8. Bits 18–35 are wired to IRSW bits 18–35. This is the long immediate value.
(4) This position selects the WRR output of the dual readout working registers 322.
(5) Bits 0–31 are equal to logical zero. Bit 32 is equal to the most significant bit of the CSR constant field. This provides the number 8 for incrementing the instruction counter IC to point to the next even/odd Instruction pair (8 bytes) in memory. Bits 33 and 34 are equal to the word length in bytes of the current instruction if the two most significant bits of the CSR constant field are zero (10 for word and 01 for half word). Bit 35 is equal to the carry bit in the process state register PSR if the next to most significant bit of the control store register CSR constant field is one.
(6) Bits 0–26 are equal to zero. Bits 27–35 are wired to the CSR constant field.
(7) This position selects the SIU Data In (DI) register.

Adder/Shifter Network

A detailed block diagram of the Adder/Shifter network is shown in FIG. 4 in the application of reference A supra. The Adder-Logical Unit (ALU) executes 36 bit arithmetic and logical operations. It also provides the transfer path for either the A or B operands to the R-XBAR at 340/ The ALU operations are controlled by the ALU/Shift input bits in the CSR 319. The AlU mode is controlled by the least significant bit of the PSR/PCR control bits in the CSR.

PTW Scratchpad

The Page Table Word (PTW) scratchpad 334 provides storage for 16 PTW's for each of the eight levels (128 PTW's). The output of the B operand switch 320 provides the write data into the scratchpad and the write clock is controlled by a bit in the CSR.

The PTW scratchpad address is generated from either the least significant 7 bits of the WRP output of the working register 326, or the level and bits 21–24 of the WRP output. The first position is for initialization and generl register GR to base table and PTW transfer. The second position is for reading/loading PTW's while paging addresses and loading missing PTW's. The address selection is controlled by a bit in the CSR.

Each byte of the PTW output is parity checked. The PTW scratchpad output provides input data to two of the four address switch positions. If the PTW output is selected by the Paged position of the Address switch the following checks are made to determine if the PTW is valid (the priority of the checks for declaring faults is in the order shown):

(1) Bits 30–35 of the PTW are compared to a Key register 372. (The Key register identifies the process with which the PTW is associated and is loaded with bits 30–35 of WRP each time GR 15 is loaded.)
(2) Bits 27–29 of the PTW are compared with bits 18–20 of WRP. This is to verify that the correct PTW is resident in this PTW Scratchpad location. (0, 16, 32, etc. all reside in the same scratchpad location.)
(3) The next check is to see if the page is resident in read/write R/W memory 122b, 123b. A zero in PTW bit 6 indicates that the page is not resident in memory.
(4) If the first three checks pass, bits 4–5 of the PTW are compared with the type of operation being initiated. A data read is always legal. An Instruction fetch requires bit 4 while a write requires bit 5.

If the PTW in the scratchpad fails any of the above checks, it will be accessed from the Page Table in R/W memory and checked again prior to causing an exception.

The address word for either R/W memory or the Programmable Interface is generated in the Address switch 336. The switch is controlled by the Address switch control bits in the CSR. If the paged position is selected and the PSR reflects the absolute address mode, the absolute position of the switch will be forced so that paging is bypassed. The four positions are as follows:

(0) This position generates the paged address to R/W memory. Bit 0 equal to zero defines a R/W address. Bits 1–3 are provided by the ZAC bits in CSR. Bit-4 is equal to zero. Bits 5–8 are the zone bits and are generated as a function of the R/W memory operation. Reads cause zeros, word or double word writes cause ones, and byte writes cause a one in the byte position to be written. Bits 9-24 are equal to PTW scratchpad 9-24 which is the page base address. Bits 25-35 are equal to WRP 25-35 which is the page relative address. When this position is selected, the WRP output of the working registers must refluect the unpaged address.

(1) This position generates the R/W memory address when no paging is required. It can be selected by the CSR or will be forced if position 0 is selected and the PSR reflects the absolute address mode. Bits 0-8 are the same as position 0. Bits 9-35 are equal to WRP 9-35 which must be equal to the absolute memory address when this position is selected.

(2) This position generates a Programmable Interface (PI) command word. Bit 0 equal to one defines a PI command word. Bit 1 is supplied by the CSR ZAC field. Bit- 2 is equal to bit 9 of the PSR and defines whether the current program can alter certain external registers. Bit 3 is equal to the processor number supplied by the SIU. Bit 4 is equal to zero. Bits 5-8 are equal to PSR bits 4-7 and define the port within the multiplex. Bits 9-35 are equal to WRP 9-35 and must be equal to the absolute address generated for either RDEX or WREX.

(3) This position provides the path for reading a PTW from the scratchpad.

Bits 0-2 of the address switch 336 are modified to reflect the R/W memory steering during loading of absolute addresses into GR. This requires bits 0-2 to reflect PTW scratchpad 0-2 if paged and WRP 0-2 if absolute address mode. This would be enabled due to position 0 of the address switch being selected and no R/W memory cycle being initiated by the CSR SIU request type control bits.

The steering switch provides the SIU steering for either a R/W memory cycle or a Programmable Interface command. It is controlled by the Address switch control bits in the CSR. The steering is generated for R/W memory as follows:

Bit 0 — This bit equals 0 for R/W memory
Bit 1 — This bit defines local or remote memory. It is equal to PTW bit 0 if paged or WRP bit 0 if absolute.
Bits 2-4 — These bits are the memory steering bits. The initial value is equal to PTW bits 1-3 if paged or WRP bits 1-3 if absolute. This is also the final value if bit 1 defines remote memory. When bit 1 defines local memory, bits 2 and 3 define the local memory port and steer addresses to the ROM in the local memory controller. Bit 2 is equal to the Exclusive OR of the initial value and the Local Memory Port Specifier (LMPS) line from the SIU. Bit 3 is equal to the Exclusive Or of the PCR ROM bit if the initial value is zero.
Bit 5 — This bit defines a single or double word memory cycle. It is equal to bit 1 of the CSR ZAC field.
Bit 6 — This bit defines a read or write cycle. It is equal to bit 0 of the CSR ZAC field.

The steering is generated for a PI command as follows:

Bit 0 — This bit equals 1 for a PI command
Bits 1-4 — These bits define the SIU port to which the PI command is directed and equal bits 0-3 of PSR.

Bits 5-6 — These bits are the same as for a R/W memory cycle and are generated in the same way.

The outputs of the steering switch are clocked into the steering register at the SIU interface each time a memory cycle or PI command is initiated.

Result-XBAR

The Result Crossbar (R-XBAR) 340 provides simultaneous transfer of its inputs to both the Data Out and Working registers 312 and 326 respectively. A third output is wired to a display panel (not shown) and provides the path to display most of the IOPP registers. The output to the working registers is controlled by the WR Write Address bits in the CSR and can select any of the four inputs. The output to the DO register 312 is controlled by the DO Write Address bit in the CSR and can select either the ALU/Shifter Output switch 338 or the Address switch 336. However, this position is forced to select the PSR/PCR input if the DPCR line (not shown) from the SIU is activated.

(0) ALU/Shifter Output switch
(1) Address Switch
(2) PSR/PCR Switch
(3) SPB Input Switch

Working Registers

The four working registers are contained in the dual readout register bank 326. Register 0 contains the current Instruction Counter (IC). (The IC is also maintained in the current level's GR1 of the GR scratchpad). Registers 1, 2 and 3 are working registers for instruction execution. They are labeled R1, R2 and R3.

The two Working register outputs are labeled WRP and WRR. WRP is used to access PTW's from the PTW scratchpad, R/W memory address generation and supplies the Working register input to both the GR scratchpad 328 and the SPB register 330. The register enabled out of WRP is controlled by the WRP bits in the CSR 314. WRR is used to provide operands to the A and B operand switches 322 and 320 respectively and the input to both the PSR and PCR registers. The register enabled out of WRR is controlled by the WRR bits in the CSR.

The Working registers can be loaded from any of the XBAR inputs. The register to be loaded and the write clock is controlled by the WR write address and Write WR bits in the CSR.

There is no restriction on the reqisters selected for the read and write operations. It can be three different registers or they can all be the same one.

PSR/PCR

The Process State register (PSR) 342 is kept outside the GR scratchpad since it is continuously monitored and updated. It is loaded from the WRR output of the Working regiters 326. A write clock is generated for the PSR each time a master mode program loads GR0 (GR0 written using the WA address) or the PSR/PCR control bits in the CSR define a write PSR operation.

The entire PSR is loaded during a master mode load of GR0, execution of an Exception fro the ECB, or the execution of a DSIP, MME, RMM or REL instruction (see Appliction of Ref. A). When an interrupt is executed, the steering from the Interrupt data word is inserted into the PSR data from the ICB prior to loading.

A condition code (*cc*), carry (*c*) and process timer are continuously updated. The *cc* is loaded each time an instruction is executed requiring a *cc* update. C is loaded with the carry out of the arithmetic and logic unit ALU each time the *cc* is loaded and the ALu is in the arithmetic mode. The process timer is decremented each time a Timer Ticker (not shown) rolls over. The Timer Ticker is an eight bit counter which counts on all system clocks (controlled clocks in step mode). The Timer Ticker is also used to detect an operation not complete or lock up exception as described in the section on exceptions.

The Process Control register (PCR) 344 is common to all levels. It is loaded from the WRR output of the working registers (not all bits are loadable). A write clock is generated for the loadable bits when the PSR/PCR control bits in the CSR define a write PCR operation.

Bits 18–19 and 28–34 are loadable. Bits 0–16 set when the defined condition occurs and are reset by the set/reset bit control in the CSR. Bits 23–26 are provided for software to read.

The PSR/PCR switch into the R-XBAR selects the corresponding register to be loaded into one of the working registers. This switch is controlled by the PSR/PCR control bits in the CSR but is forced to select PCR if the DPCR line (not shown) from the SIU is activated.

The dual readout register bank 314 provides four words of buffering for instructions. The current instruction read output (CIR) 380 and next instruction read output (NIR) 380a provide access to the entire instruction independent of the instruction length and address. This is provided through the Instruction register switch (IRSW) 319a. The CIR address is equal to the current Instruction Counter (IC) bits 32 and 33 which points to one of the four words. The NIR address is generated to point to the following word. IRSW 319a is controlled by the current bit 34 of the instruction counter IOC which defines whether the instruction starts on a word or half word address. The two IRSW positions are therefore (0) CIR bits 0–35 and (1) CIR its 18–35, NIR bits 0–17. IRSW bits 0–17 will reflect a half word instruction and IRSW bits 0–35 will reflect a full word instruction. The CIR and NIR addresses are updated each time the working register instruction counter IC is updated. All fields of the Instruction word must therefore be used prior to updating the IC.

The IR 314 is loaded each time a new value is loaded into the IC due to an interrupt, exception, branch, etc. or each time CIR address crosses over a two word boundary when the IC is updated by the current instruction length. The instruction access control is described below for the two conditions 1) enter new procedure and 2) incrementing through current procedure. In both cases the instruction fetches are double precision memory cycles and the addresses are paged unless the PSR defines absolute mode.

(1) The double word instruction fetch is initiated and the IR write address loaded on the clock that pages (if requied) the new value of IC. The IR write address is loaded with 00 if IC bit 32=0 or 10 if IC bit 32=1. (The CIR and NIR addresses are loaded when the new IC value is loaded). When the first word is available from memory, it is written into IR and the least significant bit of the write address is set. This causes the next memory word to be written into the second word of the pair (01 or 11). The IC value plus eight (bytes) is then used to initiate another double precision memory read using the paged (if required) address. The IR write address is updated to the next two words (10 if IC bit 32=0 or 00 if IC bit 32=1 and a test is made to see if instruction execution can begin or if execution must wait for the memory cycle to complete. The test is on bit 33 of the IC. If the test indicates the new procedure is being entered at the last half word of a two word pair (33, 34=1, 1), the instruction execution must be delayed until the data is available from the second double precision cycle to guarantee IR contains a full instruction word.

(2) The execution of each instruction includes an update of the IC by that instruction's length. If this update causes the IC to pass over a two word boundary (old IC 32 = new IC 32), the two word area of the IR that was just finished (old IC 32 value) can be loaded with new instructions. The new IC value plus eight (bytes) is then used to initiate a double presicion memory read using the paged (if required) address. The IR write address is updated to point to the IR area available. When the two words are received, they are written into the two word area as described above.

Control Store Addressing and Sequencing

The Control Store Address is generated in the CSA switch 316. The first four positions of the CSA switch are controlled by the CSA switch control field in the CSR 319. The CSA switch control 316 can select the Next address register (NA) 382, the Return address register (RA) 384, the Execution address register (XA) 386, or the output of the Standard Sequence decode network (SS) 388. The Exception/Interrupt position is forced when either of these two conditions exist. The Exception address is reflected unless an Interrupt is being executed. The two PTW miss is detected. The constant position is selected when the Branch control field in the CSR calls for a branch to the constant address.

NA 382 is loaded on each execution clock by the sum of the CSA switch 316 output pluss one plus a condition skip constant 390. If no skip is called for by the CSR skip control field, NA is loaded with the address of the microinstruction immediately following the one being accessed (i.e., the clock that loads the microinstruction at address M into the CSR loads the address M+1 into NA). If a number of microinstructions are to be conditionally skipped, the CSR skip field can specify that a skip be executed with the CSR constant field defining the condition to be tested and the number (1 through 7) of microinstructions to be skipped. The sequence for a skip is as follows: microinstruction at M calls for a conditional skip, the execution of this microinstruction loads M+1 into the CSR and load the address of M+1+1+SKP into NA.

SKP=0 if the skip is not satisfied and equals the skip count defined in the least significant three bits of the CSR constant field if satisfied. The skip is inhibited if any of the last four positions are selected in the CSA switch.

The conditions that can be tested for skip execution are defined by bits 3–5 of the CSR constant field. WRR 35, WRR 0, WRR 33 and the carry bit in PSR need to be tested for zero or one. The PSR *cc* field will be tested for zero, one, two or three. Bits 1–2 of the constant field are used to define the test. The conditions to be tested are as follows:

0) WRR 35=K2 if K1=1
   WRR 0=K2 if K1=0
1) Carry bit in PSR=K2
2) WRR 33-34=K1-2
3) Address syllable (AS) with IRSW 18=0
4) PSR cc field has corresponding bit in IRSW CF field
5) PSR cc field=K1-2
6) IRSW 7=WRR0 if K1=0
   IRSW 7=K2 if K1=1
7) Higher Level Interrupt or Level Zero Present line from SIU if K2=0. Level Zero Interrupt Present line from SIU if K2=1.

The RA register 384 is loaded from the NA register 382 whenever the Load RA bit is on in the CSR.

The XA register 386 is loaded with the Pathfinder 317 output each time the SS position is selected in the CSA switch. The use of the Pathfinder will be described below. Its output is one control bit and eight adress bits. The address is used to address the upper 256 words of Control Store (address bit zero is forced to 1 in the XA position of the CSA switch).

The execution of a software instruction is in two phases. The first phase is a microinstruction sequence common to a group of instructions. The second phase is a microinstruction sequence (which is only one microinstruction in most cases) unique to the specific software instruction being executed. After completing the second phase, the common phase of the next instruction would be entered (in some cases, the second phase may return to the first phase via RA register 384 for a few additional common steps prior to entering the next instructions common phase).

The operation code of IRSW 219a provides the Pathfinder address and an input to the Standard Sequence Decode network 388. The Standard Sequence Decode network generates the Control Store address of the start of the microinstruction sequence common to the group of instructions containing this one. (This sequence is referred to as a standard sequence). The location in the Pathfinder addressed by the operation code contains the address in Control Store where the unique sequence for this instruction starts. The instruction is then executed by branching to the Standard Sequence address, executing the common steps, branching to the unique sequence address in XA register 386, executing the unique steps, updating the Instruction Count (IC) so that the next instructions operation code is enabled out of IRSW and repeating the above sequence by branching to the new Standard Sequence.

The interrupt answering, exception processing the PTW missing sequences are entered by forcing the corresponding position to be selected in the CSA switch 316. Interrupts are executed at the completion of software instructions. If the Higher Level Interrupt Present (not inhibited) or the Level Zero Present lines from the SIU are active when the SS position of the CSA switch is selected by the SCA switch control bits in CSR, the CSA switch control logic is forced to select the Exception/Interrupt position. This causes the interrupt answering sequence to be entered rather than the next instructions standard sequence. (The Exception/Interrupt position reflects the address of the interrupt answering sequence at this time).

Missing Page Table Words (PTW) cause immediate entry into the PTW missing sequences. Either the operand or instruction missing position is forced by the CSA switch 316 control logic during the clock period immediately following the paging step. The return from either sequence is to the standard sequence decoded from IRSW 319a. This causes the instruction that was being executed to be started over again. Therefore, the microprogram will not do anything prior to the PTW missing detection that can't be done again. A flip/flop (not shown) is set when the PTW miss is detected that stays set until the address is once again paged. A miss the second time through causes an exception as defined below.

The exceptions fall into two categories. The first type causes an immediate entry into the exception processing sequence. The second type does not affect the CSA switch 316 control logic until the next instructions standard sequence is entered. Both types cause the Exception/Interrupt position in the CSA switch 316 to be selected and set the corresponding bit in the PCR register 344.

The first category of exceptions are operations not complete, Page faults, Page not resident, and illegal instructions. They all must be serviced as soon as they are detected since continuation of instruction execution is impossible. The second category is process timer run out, overflow, lockup fault and address misalignment. Divide check is handled by a test and branch if divisor is zero. They all indicate faults but do not need to be immediately serviced and can wait until the start of the next instruction.

Control Store Output Register

The Control Store Output register (CSR) 319 contains the microinstruction being executed. Provision is made for a remote CSR register, as indicated.

There is a one of four position switch 394 supplying the input to CSR. The four positions on the CSR input switch are as follows:

(0) This position is the input from the ROM chips on the Control Store substrates.
(1) This position is not used.
(2) This position is the input from the maintenance panel.
(3) This position reflects the local CSR. It is used to reload the remote CSR bits when the maintenance panel switches are used to display data.

Data is displayed in the I/O System by simulating CSR with maintenance panel switches. When the switches are enabled out of the CSR input switch 394, a signal is generated causing the remote CSR bits to be loaded with the microinstruction simulated by the switches. The old contents must be reloaded when the display of the registers is completed. This is accomplished by selecting position 3 for one clock prior to switching back to position 0 and reloading the remote CSR bits during the one clock period. (A block diagram of the input to the local and remote CSR is shown in Application of Reference A supra in FIG. 3 with the timing diagram for reloading the remote CSR after using the maintenance panel switches for display).

The format of CSR is as follows:

| | |
|---|---|
| Bit 0 | Clock NA into RA |
| Bit 1 | Execute SKIP (K1-2=test, K3-5=condition, K6-8=skip count |
| Bit 2 | Branch to K0-8 |
| Bits 3-4 | WR write address |
| | 00=write IC (Load WA if Write WR) |
| | 01=write R1 (set W if Write WR and CSA=SS) |
| | 10=write R2 |

-continued

| | | |
|---|---|---|
| | 11 = write R3 | |
| Bit 5 | Wait for Accept Read Data from SIU | |
| Bits 6-7 | X-BAR address for WRW output | |
| | 00 = Adder/Shifter Output switch | |
| | 01 = Address switch | |
| | 10 = PSR/PCR switch | |
| | 11 = SP Output switch | |
| Bits 8-9 | Condition Code (CC) Control | |
| | 00 = NOP | |
| | 01 = Load Arithmetic | |
| | 10 = Load Logic | |
| | 11 = Load Parity of SPB Least Significant Byte | |
| Bit 10 | Write POW Scratchpad | |
| Bits 11-13 | ZAC for R/W memory cycle (bits 1-3 of R/W address switch positions 0 and 1) | |
| | OXX = Read | |
| | 1XX = Write | |
| | XOX = Single precision | |
| | X1X = Double precision | |
| Bit 14 | Set/Reset bit defined by CSR41-44 | |
| Bits 15-17 | SIU Request Type | |
| | 000 = NOP | |
| | 001 = Interrupt Data | |
| | 010 = Release and Interrupt Data | |
| | 011 = Memory or Programmable Interface Data (PI if 19-20 = 10) | |
| | 100 = Byte Read to Write (Byte address, R/W Zone if write) | |
| | 101 = Instruction Fetch* | |
| | 110 = Instruction Fetch if CIRO = IRWO* | |
| | 111 = Instruction Fetch if SKIP test satisfied test satisfied or if CSR1 = 0** | |
| Bit 18 | PTW Scratchpad address | |
| | 0 = Extended Read/Write from WRP | |
| | 1 = Current level PTW Read/Write from Effective Address. | |
| Bits 19-20 | Address Switch Control | |
| | 00 = Paged address (control logic forces 01 if PSR 10 = 1) | |
| | 01 = Absolute address | |
| | 10 = PI address | |
| | 11 = PTW scratchpad 0-35 | |
| Bit 21 | Write WR | |
| Bits 22-23 | CSA switch control (first four positions) | |
| | 00 = Next Address register (NA) | |
| | 01 = Return Address register (RA) | |
| | 10 = Execution Address register (XA) | |
| | 11 = Standard Sequence Address | |
| Bits 24-25 | WRR read address | |
| Bits 26-27 | WRP read address | |
| | 00 = IC | |
| | 01 = R1 | |
| | 10 = R2 | |
| | 11 = R3 | |
| Bit 28 | A operand Switch | |
| | 0 = SPB | |
| | 1 = WRR | |
| Bits 29-30 | PSR/PCR control & ALU Mode | |
| | 00 = Read PSR or Logical Mode | |
| | 01 X Read PCR or Arithmetic Mode | |
| | 10 = Write PSR | |
| | 11 = Write PCR | |
| Bits 31-32 | Adder/Shifter Output switch | |
| | 00 = Shifter | |
| | 01 = ALU | |
| | 10 = Store 32 | |
| | 11 = Load 32 | |
| Bits 33-35 | B Operand switch | |
| | 000 = DL | |
| | 001 = DS | |
| | 010 = IS | |
| | 011 = IL | |
| | 100 = WRR | |
| | 101 = 8, Word length, or Carry | |
| | 110 = Constant K0-8 | |
| | 111 = DI | |
| Bits 36-44 | Constant K0-8 This field is also used for mutually exclusive control. | |
| Bits 36-37 | 8/WL/CY control | |
| | 00, 8/WL/CY = I RSW Instruction word length | |
| | 01, 8/WL/CY = PSR Carry Bit | |
| | 10, 8/WL/CY = 8 | |
| Bits 36-38 | Shift Count Switch control | |
| | 000 Left shift | |
| | 001 Right shift | |
| | 010 CSR Shift Count (39-44) | |
| | 011 Instruction F1 field | |
| | 100 Instruction F2 field | |
| | 101 Instruction F3 field | |
| | 110 Byte load | |
| | 111 Byte Store | |
| Bits 39-44 | CSR Shift Count | |
| Bits 36-44 | CSA switch branch address | |
| Bits 37-38 | SKIP test value for conditions tested for multiple values | |
| Bits 38 | WA input switch Control (0 = GR1 1 = GR2) | |
| Bits 39-41 | SKIP test condition | |
| | 000 WRR35 = CSR38 if CSR 37 = 1 WRRO = CSR38 if CSR 37 = 0 | |
| | 001 PSR 13 (carry) = CSR38 | |
| | 010 WRR33 = CSR 38 | |
| | 011 IRSW 14-35 Contains Address syllable and bit 18-0 | |
| | 100 BRAC CF field has bit corresponding to PSR CC if CSR 38 = 1 BRAC CR field does not have bit corresponding PSR CC if CSR38 = 0 | |
| | 101 PSR CC field = CSR37 = 38 | |
| | 110 IRSW7 = WRR0 if CSR37 = 0 IRSW7 = CSR38 if CSR37 = 1 | |
| | 111 SIU HLIP line active and not inhibited or LZP active. | |
| Bits 42-44 | SKIP count | |
| Bits 38-44 | GR scratchpad total address | |
| Bits 41-44 | GR scratchpad address per level | |
| Bits 45-48 | ALU Control Shift Input switches Control | |
| | 45-48 = ALU operation (CSR 7 = mode) | |
| | 45-46 = Left Shift Input switch | |
| | 00 A Operand switch | |
| | 01 Sign of Right Shift Input Switch | |
| | 10 Zeros | |
| | 11 Ones | |
| | 47-48 = Right Shift Input switch | |
| | 0X Zeros | |
| | 10 B Operand switch | |
| | 11 A Operand switch | |
| Bits 49-50 | GR Scratchpad Control | |
| | 00 = NOP | |
| | 01 = Write GR scratchpad | |
| | 11 = Load SPB from WRP | |
| Bits 51-53 | GR Scratchpad Address | |
| | 000 = CSR scratchpad total address (CSR 38-44) | |
| | 001 = CSR scratchpad address per level (AIL, CSR41-44) | |
| | 010 = Extended Read/Write address from WRR | |
| | 011 = Current level XR2 | |
| | 100 = Current level XR1 | |
| | 101 = Current level GR1 | |
| | 110 = Odd register of pair addressed by WA in current level | |
| | 111 = WA address in current level | |
| Bit 54 | A Operand Switch | |
| | 0 = SPB | |
| | 1 = WRR | |
| Bits 51-53 | GR Scratchpad Address | |
| | 000 = CSR scratchpad total address (SCR 38-44) | |
| | 001 = CSR scratchpad address per level (AIL, CSR41-44) | |
| | 010 = Extended Read/Write address from WRR | |
| | 011 = Current level XR2 | |
| | 100 = Current level XRL | |
| | 101 = Current level GR1 | |
| | 110 = Odd register of pair addressed by WA in current level | |
| | 111 = WA address in current level | |

*These codes cause an instruction PTW missing sequence if a page fault is detected.
**This code causes an operand PTW missing sequence if a page fault is detected.

Control Store

The control store 318 is a typical prior art read only memory ROM well known in the art. The theory, construction and use of ROM's is detailed in a book by Samir S. Husson entitled, "Microprogramming Principles and Practices" published by Prentice Hall in 1970. The microprogram which resides in the control store 318 and controls the operations of the invention is included in the Appendix of this specification. When the control store 318 is microprogrammed as shown in the Appendix, it is termed the firmware of the invention. The firmware differs from a software program in that an actual physical operation is performed on the ROM chip, and removal from the computer or loss of power does not alter the microprogram; this is akin to hardwiring the program in the computer. However, with software programming there is no physical alteration of memory — merely electrical, hence loss of power or removal of the memory from the computer destroys the program; there is no kinship to hardware logic.

OPERATION OF THE INVENTION

The instant invention utilizes many prior art look-ahead features in prior art computers wherein an instruction fetch of a succeeding instruction precedes the completed execution of a previously extracted instruction such as disclosed in previously referenced U.S. Pat. No. 3,254,329 issued May 31, 1966. It also utilizes features similar to prior mentioned U.S. Pat. No. 3,202,969 issued Aug. 24, 1965 which suggests the fetching of this instruction from memory and the initiation of its execution while the arithmetic operation is going on. Moreover, some of the principles of a pipe-line or assembly-line concept of instruction fetch and execution as previously reference herein in conjunction with the IBM 360 model 91 machine are also utilized. Accordingly the instruction register 314 holds up to 4 instructions to be executed which have been fetched from main memory during the execution of prior instructions. Moreover, execution of the next instruction in instruction register 314 awaiting execution is commenced during the execution of a current instruction by placing bits 0–17 (see FIGS. 2M-2N) into bit 0–17 of the instruction register switch 319a. The index bits 14–17 of FIG. 2N of the next instruction are then used to address a general register in scratchpad memory 328 via path 319a multiplexor switch 332 (LEV, XR1). This operation is performed as part of the DONE statement which is the last microinstruction in the currently executing software instruction. The DONE statement is defined on page 7 of the Appendix which constitutes a part of this specification and is a listing of the microinstructions of the control store. Referring to page 7, line 20, the DONE statement is defined. The contents of the scratchpad SP 328 are read out to the scratchpad buffer SPB 330; the addrress of the index register XR1 is supplied also to the scratchpad 328 via switch 332 and path SPA. Bit 18 of the address syllable of the instruction (FIG. 2N) is set to a one if second level indexing is required. The DONE microinstruction also calls for a skip test to determine whether or not second level indexing is required. Finally, it requires the standard sequence SS to be utilized for the control store address CSA. The standard sequence SS is the common routine for executing the next software instruction. An example of the use of the DONE statement is on page 65 of the Appendix. Referring to page 65 of the Appendix on the second paragraph, there is shown the firmware of the last step of an LDBG (Load Byte Into a General Register) instruction.

Referring to Location 505 in Appendix

READ-BYTE, PAGED-AD=R2 — Starts a word read memory cycle. The address is enabled out of R2 in the working registers 326; addressing the PTW scratchpad 334 and building the paged (or absolute) address in the address switch 336. The address is transferred through the X-BAR 338 into Data Out 312. CALL, TO-ICMPW1 — Save NA in RA and branch to 136.

Location 506

R SHIFT-DI, SHCNT=BL, BYTE-LOC=R2, SHFTR=R1 — Data In 310 transfers through B switch 320; through shifter 324, shifts right using BL position of shift count switch and R2 as byte address to define shift count, through X-BAR 338 and into working register R2 326.

Location 507

R1 & 511-OR1, LOGIC→CC COND-I-FETCH — R1 & 511 (111111111)→ R1 zeroes all of R1 except bits 27–35 & CC is loaded with logical test (no overflow). COND-I-FETCH — Start Instruction Fetch if room in IR 314.

Location 510

R1-R1 — This loads R1 on last step which causes W F/F to be set and will write R-1 → SP on next clock. DONE — as explained on -1-.

With the registers and buffers thus conditioned, the conventional method of executing a software instruction is for the new software instruction to read out the index register from a general register XR1 in scratchpad memory 328 and place the contents of the index register in the scratchpad buffer SPB 330. The second step of the software instruction then is to obtain the address of the operand by adding the contents of the index register in SPB 330 to the displacement DL of the instruction (FIGS. 2M—2N) contained in IRSW 319a. Accordingly, the displacement DL or DS is placed in adder shifter 324 via position 0 or position 1 of B switch 320. The contents of SPB register 330 are likewise routed through A switch 322 into adder shifter 324 and added to the displacement DL or DS, depending on whether it was a long displacement or a short displacement. The next step is to place the modified address into register R2 of working register 326 via path 338 and 338a. This address is used to address a R/W memory location via PTW scratchpad 334 (if paged) through address switch 336, through the X-BAR into Data Out register. The memory location is read into Data In 310, through the B switch 320, through the adder shifter 324, through the X-BAR 338, into the working register R1 336. Finally, the contents of the working register R1 326 are written into a general register of scratchpad memory 328 via path WRP.

With the look ahead feature of the current invention, it is not necessary for any step of the new software instruction to cause a reading out of the scratchpad memory 328 into scratchpad buffer 330 since as previously described this is performed as the last microinstruction of the currently executing software instruction via the DONE statement. Also it is not necessary for the new instruction to write the contents of the working register 326 into the scratchpad as it will be executed by the first step of the next instruction. When the new software instruction is accessed through the standard sequence SS used for the control store address CSA (which as previously described is also a part of the DONE statement), the first step of the new software instruction is the second step of the conventional method of fetching and executing a software instruction i.e. the first step of the new software instruction modifies the address by adding the displacement DL of the instruction to the index register contained in the scratchpad buffer SPD 330 as previously described in step 2 of the conventional method of executing a software instruction. Note also that in the conventional method of executing a software instruction, the data loaded into the working register 326 from R/W memory has to be transferred into the scratchpad 328 on the last step. With the look ahead (or overlap) feature, the transfer of the working register 326 into the scratchpad 328 is executed by the first step of the new instruction. Since the old software instruction and the new software instruction perform their execution concurrently, two clock cycles have been saved. Also, since it is not necessary for the old software instruction to complete itself, leaving this operation for the first portion of the new software instruction, the old software instruction can utilize this time not only in accessing the old instruction but accessing information that is required for the new instruction so that the new instruction can immediately begin to concurrently execute as its first step, in addition to completing the old instruction, what would have normally been the second step of the new instruction. Accordingly, there is a greater efficiency in fetching and executing instructions, particulaly in branch and interrupt, since the concepts of prefetch, overlap and pipe line execution are combined herein in this novel way.

A better appreciation may be obtained of the invention by referring to FIGS. 3, 4 and 5 and comparing the conventional method of instruction fetch and execution with that of the invention. FIGS. 4 and 5 show minor cycles during which microoperations of an instruction are executed and a major cycle comprised of the minor cycles for executing macro-operations.

Referring to FIG. 4:

| | CONVENTIONAL METHOD |
|---|---|
| Last step minus 1: | Load contents of Data-In DI register into R1 position of working registers 326 via path 310-320-324-338-326. Alternatively the R1 could be loaded by contents of SPB 330 added to contents of DI 310. |
| Last step: | Write contents of R1 into scratchpad 328 via WRP path 326-328. |
| First step: | Read contents of XR1 in scratchpad 328 into SPB 330. (A general register GR in scratchpad 328 stores XR1. It is addressed via address of XR1 in instruction utilizing following path: 319a-332 LEVEL 328-330A-330. |
| Second step: | Add either long displacement DL (position 0 of switch 320) or short displacement DS (position 1 of switch 320) to contents of SPB 330 and place in R2 326. |

Referring to FIG. 3:

| | LOOK AHEAD METHOD OF INVENTION |
|---|---|
| Last step: | Load contents of DI 310 into R1 326 (W Flip-Flop F/F sets if R1 loaded) and read contents of XR1 in scratchpad 328 into SPB 330. |
| First step: | Add DL or DS to contents of SPB 330 and place result in R2 and write contents of R1 326 into scratchpad 328 if W flip-flop (not shown) is set. |

```
                    .ETAIL OFF.
                    .DECK.
                    LIST.U.
             *
             *      IDPP FIRMWARE TABLE OF CONTENTS
             *
             *      LOC     ROUTINE            LENGTH
             *                             OCTAL   DECIMAL
             *
             *      000     INIT               005        5
             *      005     STANDARD SFO       073       59
             *      100     GFTSAP             021       17
             *      121     GFTPT.             011        9
             *      132     SECX               001        1
             *      133     ICIP               006        6
             *      141     CVR1               017       15
             *      160     CPR1               017       15
             *      177     SPARE          001        1
             *      200     EXCEPT             001        1
             *      201     IPE2               016       14
             *      217     RMR1               011        9
             *      230     NLINT3             020       16
             *      250     SPARE          030       24
             *      300     ZLINT              020       16
             *      320     NLINT              016       14
             *      336     SPARE          002        2
             *      340     O-MISS             002        2
             *      342     SPARE          016       14
             *      360     I-MISS             002        2
             *      362     SPARE          016       14
             *      400     EXEC SEQ           231      153
             *      631     SPARE          145      101
             *      776     PULS               001        1
             *      777     RESET              001        1

EJECT.
             *      IDPP MICROPROGRAM
             *
             *      BASIC ICHO=OPS
             *
 300 000 000 000 000 000    NOP        DEF MC(0011=00).
 400 000 000 000 000 000    NA->EA     DEF MC(001I=01).

100 000 000 000 000 000    BRANCH     DEF MC(0112=00).
 200 000 000 000 000 000    SKIP       DEF MC(0112=02).

000 000 000 000 000 000    ARA=1C     DEF MC(0312=00).
 020 000 000 000 000 000    ARA=R1     DEF MC(0312=01).
 040 000 000 000 000 000    ARA=2      DEF MC(0312=02).
 060 000 000 000 000 000    ARA=R3     DEF MC(0312=03).

013 000 000 000 000 000    WAIT       DEF MC(0511=01).

000 000 000 000 000 000    XB=ASC     DEF MC(0612=00).
 002 000 000 000 000 000    XB=ADRS.   DEF MC(0612=01).
 004 000 000 000 000 000    XB=PSR/PCR DEF MC(0612=02).
 006 000 000 000 000 000    XB=SP      DEF MC(0612=03).

000 000 000 000 000 000    ARITH->CC  DEF MC(0812=01).
 001 000 000 000 000 000    LOGIC->CC  DEF MC(0812=02).
 001 000 000 000 000 000    PARITY->CC DEF MC(0812=03).
```

```
000 200 000 000 000 000      A=>PTW         DEF MC(1011=01).            00010440
                                                                        00010450
                                                                        00010460
000 000 000 000 000 000      ZAC=READ       DEF MC(1111=00).            00010470
000 100 000 000 000 000      ZAC=WRITE      DEF MC(1111=01).            00010480
000 000 000 000 000 000      SINGLE         DEF MC(1211=00).            00010490
000 040 000 000 000 000      DOUBLE         DEF MC(1211=01).            00010700
000 020 000 000 000 000      CLEAR          DEF MC(1311=01).            00010710
000 060 000 000 000 000      REMOTE         DEF MC(1212=03).            00010720
                                                                        00010730
000 010 000 000 000 000      SET/RESET      DEF MC(1411=01).            00010740
                                                                        00010750
000 001 000 000 000 000      SIU-REQ1       DEF MC(1513=01).            00010760
000 002 000 000 000 000      SIU-REQ2       DEF MC(1513=02).            00010770
000 003 000 000 000 000      SIU-REQ3       DEF MC(1513=03).            00010780
000 004 000 000 000 000      SIU-REQ4       DEF MC(1513=04).            00010790
000 005 000 000 000 000      SIU-REQ5       DEF MC(1513=05).            00010800
000 006 000 000 000 000      SIU-REQ6       DEF MC(1513=06).            00010810
000 007 000 000 000 000      SIU-REQ7       DEF MC(1513=07).            00010820
                                                                        00010830
000 000 000 000 000 000      PTWA=WPP       DEF MC(1811=00).            00010840
000 000 400 000 000 000      PTWA=PAGE      DEF MC(1811=01).            00010850
                                                                        00010860
000 000 000 000 000 000      ADRSK=PAGED    DEF MC(1912=00).            00010870
000 000 100 000 000 000      ADRS=...       DEF MC(1912=01).            00010880
000 000 200 000 000 000      ADRS=PT        DEF MC(1912=02).            00010890
000 000 300 000 000 000      ADRS=PT.       DEF MC(1912=03).            00010900
                                                                        00010910
000 000 040 000 000 000      PA=>.          DEF MC(2111=01).            00010920
                                                                        00010930
000 000 000 000 000 000      CS4=P          DEF MC(2212=00).            00010940
000 000 010 000 000 000      CS4=A          DEF MC(2212=01).            00010950
000 000 020 000 000 000      CS4=X4         DEF MC(2212=02).            00010960
000 000 030 000 000 000      CS4=SS         DEF MC(2212=03).            00010970
                                                                        00010980
000 000 000 000 000 000      WR=IC          DEF MC(2412=00).            00010990
000 000 002 000 000 000      WR=R1          DEF MC(2412=01).            00011000
000 000 004 000 000 000      WR=R2          DEF MC(2412=02).            00011010
000 000 006 000 000 000      WR=R3          DEF MC(2412=03).            00011020
                                                                        00011030
000 000 000 000 000 000      WRP=IC         DEF MC(2612=00).            00011040
000 000 000 400 000 000      WRP=R1         DEF MC(2612=01).            00011050
000 000 001 000 000 000      WRP=R2         DEF MC(2612=02).            00011060
000 000 001 400 000 000      WRP=R3         DEF MC(2612=03).            00011070
                                                                        00011080
000 000 000 000 000 000      A=SPR          DEF MC(2811=00).            00011090
000 000 000 200 000 000      A=WRR          DEF MC(2811=01).            00011100
                                                                        00011110
000 000 000 100 000 000      WR->PSR        DEF MC(2912=02).            00011120
000 000 000 140 000 000      WRR->PCR       DEF MC(2912=03).            00011130
                                                                        00011140
000 000 000 000 000 000      PSR/PCR=PSI    DEF MC(3011=00).            00011150
000 000 000 040 000 000      PSR/PCR=PCR    DEF MC(3011=01).            00011160
                                                                        00011170
000 000 000 000 000 000      LOGICN         DEF MC(3011=00).            00011180
000 000 000 040 000 000      ARITHN         DEF MC(3011=01).            00011190
                                                                        00011200
000 000 000 000 000 000      ASO=SHFTR      DEF MC(3112=00).            00011210
000 000 000 010 000 000      ASO=ALU        DEF MC(3112=01).            00011220
000 000 000 020 000 000      ASO=ST32       DEF MC(3112=02).            00011230
000 000 000 030 000 000      ASO=LD32       DEF MC(3112=03).            00011240
                                                                        00011250
000 000 000 000 000 000      B=DL           DEF MC(3313=00).            00011260
000 000 000 001 000 000      B=DS           DEF MC(3313=01).            00011270
000 000 000 002 000 000      B=IS           DEF MC(3313=02).            00011280
000 000 000 003 000 000      B=IL           DEF MC(3313=03).            00011290
000 000 000 004 000 000      B=WRR          DEF MC(3313=04).            00011300
000 000 000 005 000 000      B=WL           DEF MC(3315=24).            00011310
000 000 000 005 200 000      B=C            DEF MC(3315=25).            00011320
000 000 000 005 400 000      B=B            DEF MC(3315=26).            00011330
000 000 000 006 000 000      B=K            DEF MC(3313=06).            00011340
000 000 000 007 000 000      B=DI           DEF MC(3313=07).            00011350
                                                                        00011360
000 000 000 000 000 000      K=0            DEF MC(3619=000).           00011370
000 000 000 000 001 000      K=1            DEF MC(3619=001).           00011380
000 000 000 000 002 000      K=2            DEF MC(3619=002).           00011390
000 000 000 000 004 000      K=4            DEF MC(3619=004).           00011400
000 000 000 000 014 000      K=12           DEF MC(3619=014).           00011410
000 000 000 000 020 000      K=16           DEF MC(3619=020).           00011420
000 000 000 000 030 000      K=24           DEF MC(3619=030).           00011430
000 000 000 000 034 000      K=28           DEF MC(3619=034).           00011440
000 000 000 000 044 000      K=36           DEF MC(3619=044).           00011450
000 000 000 000 177 000      K=127          DEF MC(3619=177).           00011460
000 000 000 000 360 000      K=240          DEF MC(3619=360).           00011470
000 000 000 000 774 000      K=508          DEF MC(3619=774).           00011480
000 000 000 000 777 000      K=511          DEF MC(3619=777).           00011490
                                                                        00011500
000 000 000 000 000 000      SHCNT=36=WWP   DEF MC(3619=00).            00011510
000 000 000 000 100 000      SHCNT=SP       DEF MC(3619=01).            00011520
000 000 000 000 201 000      SHCNT=1        DEF MC(3619=201).           00011530
000 000 000 000 206 000      SHCNT=6        DEF MC(3619=206).           00011540
000 000 000 000 210 000      SHCNT=8        DEF MC(3619=210).           00011550
000 000 000 000 211 000      SHCNT=9        DEF MC(3619=211).           00011560
000 000 000 000 214 000      SHCNT=12       DEF MC(3619=214).           00011570
000 000 000 000 222 000      SHCNT=18       DEF MC(3619=222).           00011580
000 000 000 000 235 000      SHCNT=29       DEF MC(3619=235).           00011590
000 000 000 000 243 000      LSHCNT=1       DEF MC(3619=243).           00011600
000 000 000 000 240 000      LSHCNT=4       DEF MC(3619=240).           00011610
000 000 000 000 236 000      LSHCNT=6       DEF MC(3619=236).           00011620
000 000 000 000 235 000      LSHCNT=7       DEF MC(3619=235).           00011630
000 000 000 000 234 000      LSHCNT=8       DEF MC(3619=234).           00011640
000 000 000 000 231 000      LSHCNT=11      DEF MC(3619=231).           00011650
000 000 000 000 230 000      LSHCNT=12      DEF MC(3619=230).           00011660
000 000 000 000 226 000      LSHCNT=14      DEF MC(3619=226).           00011670
000 000 000 000 204 000      LSHCNT=32      DEF MC(3619=204).           00011680
```

| | | | |
|---|---|---|---|
| 000 000 000 000 300 000 | SHCNT=F1 | DEF MC(3613=03). | 00011690 |
| 000 000 000 000 400 000 | SHCNT=F2 | DEF MC(3613=04). | 00011700 |
| 000 000 000 000 500 000 | SHCNT=F3 | DEF MC(3613=05). | 00011710 |
| 000 000 000 000 600 000 | SHCNT=6L | DEF MC(3613=06). | 00011720 |
| 000 000 000 000 700 000 | SHCNT=GS | DEF MC(3613=07). | 00011730 |
| | | | 00011740 |
| 000 000 000 000 000 000 | K1=0 | DEF MC(3711=00). | 00011750 |
| 000 000 000 000 200 000 | K1=1 | DEF MC(3711=01). | 00011760 |
| 000 000 000 000 000 000 | K2=0 | DEF MC(3811=00). | 00011770 |
| 000 000 000 000 100 000 | K2=1 | DEF MC(3811=01). | 00011780 |
| | | | 00011790 |
| 000 000 000 000 000 000 | GR1->WA | DEF MC(3811=00). | 00011800 |
| 000 000 000 000 100 000 | GR2->WA | DEF MC(3811=01). | 00011810 |
| | | | 00011820 |
| 000 000 000 000 000 000 | SKIPTEST0 | DEF MC(3913=00). | 00011830 |
| 000 000 000 000 010 000 | SKIPTEST1 | DEF MC(3913=01). | 00011840 |
| 000 000 000 000 020 000 | SKIPTEST2 | DEF MC(3913=02). | 00011850 |
| 000 000 000 000 030 000 | SKIPTEST3 | DEF MC(3913=03). | 00011860 |
| 000 000 000 000 040 000 | SKIPTEST4 | DEF MC(3913=04). | 00011870 |
| 000 000 000 000 050 000 | SKIPTEST5 | DEF MC(3913=05). | 00011880 |
| 000 000 000 000 060 000 | SKIPTEST6 | DEF MC(3913=06). | 00011890 |
| 000 000 000 000 070 000 | SKIPTEST7 | DEF MC(3913=07). | 00011900 |
| | | | 00011910 |
| 000 000 000 000 000 000 | BIT-AD=0 | DEF MC(4114=00). | 00011920 |
| 000 000 000 000 001 000 | BIT-AD=1 | DEF MC(4114=01). | 00011930 |
| 000 000 000 000 002 000 | BIT-AD=2 | DEF MC(4114=02). | 00011940 |
| 000 000 000 000 003 000 | BIT-AD=3 | DEF MC(4114=03). | 00011950 |
| 000 000 000 000 004 000 | BIT-AD=4 | DEF MC(4114=04). | 00011960 |
| 000 000 000 000 010 000 | BIT-AD=8 | DEF MC(4114=10). | 00011970 |
| 000 000 000 000 012 000 | BIT-AD=10 | DEF MC(4114=12). | 00011980 |
| 000 000 000 000 013 000 | BIT-AD=11 | DEF MC(4114=13). | 00011990 |
| 000 000 000 000 014 000 | BIT-AD=12 | DEF MC(4114=14). | 00012000 |
| 000 000 000 000 015 000 | BIT-AD=13 | DEF MC(4114=15). | 00012010 |
| 000 000 000 000 016 000 | BIT-AD=14 | DEF MC(4114=16). | 00012020 |
| | | | 00012030 |
| 000 000 000 000 000 000 | AD-PER-L=0 | DEF MC(4114=00). | 00012040 |
| 000 000 000 000 001 000 | AD-PER-L=1 | DEF MC(4114=01). | 00012050 |
| 000 000 000 000 002 000 | AD-PER-L=2 | DEF MC(4114=02). | 00012060 |
| 000 000 000 000 003 000 | AD-PER-L=3 | DEF MC(4114=03). | 00012070 |
| 000 000 000 000 004 000 | AD-PER-L=4 | DEF MC(4114=04). | 00012080 |
| 000 000 000 000 016 000 | AD-PER-L=14 | DEF MC(4114=16). | 00012090 |
| 000 000 000 000 017 000 | AD-PER-L=15 | DEF MC(4114=17). | 00012100 |
| | | | 00012110 |
| 000 000 000 000 000 000 | TOTAL-AD=0 | DEF MC(3817=000). | 00012120 |
| 000 000 000 000 044 000 | TOTAL-AD=36 | DEF MC(3817=044). | 00012130 |
| | | | 00012140 |
| 000 000 000 000 001 000 | SKIP=1 | DEF MC(4213=01). | 00012150 |
| 000 000 000 000 002 000 | SKIP=2 | DEF MC(4213=02). | 00012160 |
| 000 000 000 000 003 000 | SKIP=3 | DEF MC(4213=03). | 00012170 |
| 000 000 000 000 004 000 | SKIP=4 | DEF MC(4213=04). | 00012180 |
| 000 000 000 000 005 000 | SKIP=5 | DEF MC(4213=05). | 00012190 |
| 000 000 000 000 006 000 | SKIP=6 | DEF MC(4213=06). | 00012200 |
| 000 000 000 000 007 000 | SKIP=7 | DEF MC(4213=07). | 00012210 |
| | | | 00012220 |
| 000 000 000 000 000 000 | ALU-FUNC0 | DEF MC(4514=00). | 00012230 |
| 000 000 000 000 000 040 | ALU-FUNC1 | DEF MC(4514=01). | 00012240 |
| 000 000 000 000 000 140 | ALU-FUNC3 | DEF MC(4514=03). | 00012250 |
| 000 000 000 000 000 200 | ALU-FUNC4 | DEF MC(4514=04). | 00012260 |
| 000 000 000 000 000 240 | ALU-FUNC5 | DEF MC(4514=05). | 00012270 |
| 000 000 000 000 000 300 | ALU-FUNC6 | DEF MC(4514=06). | 00012280 |
| 000 000 000 000 000 440 | ALU-FUNC9 | DEF MC(4514=11). | 00012290 |
| 000 000 000 000 000 600 | ALU-FUNC12 | DEF MC(4514=14). | 00012300 |
| 000 000 000 000 000 740 | ALU-FUNC15 | DEF MC(4514=17). | 00012310 |
| | | | 00012320 |
| 000 000 000 000 000 000 | LEFT=A | DEF MC(4512=00). | 00012330 |
| 000 000 000 000 000 200 | LEFT=SIGN | DEF MC(4512=01). | 00012340 |
| 000 000 000 000 000 400 | LEFT=ZEROS | DEF MC(4512=02). | 00012350 |
| 000 000 000 000 000 600 | LEFT=ONES | DEF MC(4512=03). | 00012360 |
| 000 000 000 000 000 000 | RIGHT=ZEROS | DEF MC(4711=00). | 00012370 |
| 000 000 000 000 000 100 | RIGHT=B | DEF MC(4712=02). | 00012380 |
| 000 000 000 000 000 140 | RIGHT=A | DEF MC(4712=03). | 00012390 |
| | | | 00012400 |
| 000 000 000 000 000 000 | WRP->SP=IF-W | DEF MC(4912=00). | 00012410 |
| 000 000 000 000 000 010 | WRP->SP | DEF MC(4912=01). | 00012420 |
| 000 000 000 000 000 020 | SP->SPH | DEF MC(4912=02). | 00012430 |
| 000 000 000 000 000 030 | ARP->SPH | DEF MC(4912=03). | 00012440 |
| | | | 00012450 |
| 000 000 000 000 000 000 | SPA=TOTAL-AD | DEF MC(5113=00). | 00012460 |
| 000 000 000 000 000 001 | SPA=AD-PER-L | DEF MC(5113=01). | 00012470 |
| 000 000 000 000 000 002 | SPA=FF | DEF MC(5113=02). | 00012480 |
| 000 000 000 000 000 003 | SPA=XR2 | DEF MC(5113=03). | 00012490 |
| 000 000 000 000 000 004 | SPA=XR1 | DEF MC(5113=04). | 00012500 |
| 000 000 000 000 000 005 | SPA=GR1 | DEF MC(5113=05). | 00012510 |
| 000 000 000 000 000 006 | SPA=WA-ODD | DEF MC(5113=06). | 00012520 |
| 000 000 000 000 000 007 | SPA=A | DEF MC(5113=07). | 00012530 |
| | EJECT. | | 00012540 |
| | | | 00012550 |
| | * | SKIP TESTS | 00012560 |
| | * | | 00012570 |
| | IF-ARLSE | DEF SKIPTEST0,K1=0,K2=0,SKIP. | 00012580 |
| | IF-ARR0=1 | DEF SKIPTEST0,K1=0,K2=0,SKIP. | 00012590 |
| | IF-GR3=0 | DEF SKIPTEST0,K1=1,K2=0,SKIP. | 00012600 |
| | IF-C=0 | DEF SKIPTEST1,K2=0,SKIP. | 00012610 |
| | IF-C=1 | DEF SKIPTEST1,K2=1,SKIP. | 00012620 |
| | IF-WRR3=0 | DEF SKIPTEST2,K2=0,SKIP. | 00012630 |
| | IF-ASSR1=0 | DEF SKIPTEST3,SKIP. | 00012640 |
| | IF-GO | DEF SKIPTEST4,K2=1,SKIP. | 00012650 |
| | IF-NOGO | DEF SKIPTEST4,K2=0,SKIP. | 00012660 |
| | IF-CC=0 | DEF SKIPTEST5,K1=0,K2=0,SKIP. | 00012670 |
| | IF-CC=1 | DEF SKIPTEST5,K1=0,K2=1,SKIP. | 00012680 |
| | IF-OPC7=WRD | DEF SKIPTEST6,K1=0,SKIP. | 00012690 |
| | IF-OPC7=0 | DEF SKIPTEST6,K1=1,K2=0,SKIP. | 00012700 |
| | | | 00012710 |
| | * | SEQUENCE CONTROL | 00012720 |
| | | | 00012730 |

| | | |
|---|---|---|
| STANDARD-SEQ | DEF WRP->SP,IF=W,WRP=R1,SPA=A,WRR=R1. | 00012740 |
| BEGIN-LOOP | DEF NA->RA. | 00012750 |
| END-LOOP | DEF CSA=RA. | 00012760 |
| RETURN | DEF CSA=RA. | 00012770 |
| EXECUTE | DEF NA->RA,CSA=XA. | 00012780 |
| CALL | DEF BRANCH=,NA->RA. | 00012790 |
| DONE | DEF SP->SPB,SPA=XR1,IF=ASGB10=0,SKIP=1,CSA=SS. | 00012800 |
| | | 00012810 |
| * | REGISTER TRANSFER | 00012820 |
| * | | 00012830 |
| R1->PTW | DEF B=R1,B->PTW. | 00012840 |
| R1->PCR | DEF WRR=R1,WRR->PCR. | 00012850 |
| R1->PSR | DEF WRR=R1,WRR->PSR. | 00012860 |
| R1->R1 | DEF ALU=A,A=R1,ALU->R1. | 00012870 |
| R1->SP | DEF WRP=R1,WRP->SP. | 00012880 |
| R1->SPB | DEF WRP=R1,WRP->SPB. | 00012890 |
| R1->DO | DEF ALU=A,A=R1,ALU->DO. | 00012900 |
| R1-1->R1 | DEF ALU=A-1,A=R1,ALU->R1. | 00012910 |
| R1+1->R3 | DEF A=R1,ALU=A+1,ALU->R3. | 00012920 |
| R1+1->R1 | DEF A=R1,ALU=A+1,ALU->R1. | 00012930 |
| R1+DI->DO | DEF A=R1,B=DI,ALU=A+B,ALU->DO. | 00012940 |
| R1&511->R1 | DEF A=R1,B=511,ALU=A&B,ALU->R1. | 00012950 |
| R1&508->R1 | DEF A=R1,B=508,ALU=A&B,ALU->R1. | 00012960 |
| | | 00012970 |
| R2->R1 | DEF ALU=A,A=R2,ALU->R1. | 00012980 |
| R2->R3 | DEF ALU=A,A=R2,ALU->R3. | 00012990 |
| R2->SP | DEF WRP=R2,WRP->SP. | 00013000 |
| R2->SPB | DEF WRP=R2,WRP->SPB. | 00013010 |
| R2->IC | DEF ALU=A,A=R2,ALU->IC. | 00013020 |
| R2->DO | DEF A=R2,ALU=A,ALU->DO. | 00013030 |
| R2+1->R2 | DEF ALU=A+1,A=R2,ALU->R2. | 00013040 |
| R2+ONE->R1 | DEF A=R2,B=1,ALU=A+B,ALU->R1. | 00013050 |
| R2+C->R1 | DEF A=R2,B=C,ALU=A+B,ALU->R1. | 00013060 |
| R2-127->CC | DEF A=R2,B=127,ALU=A-B,ASO=ALU,LOGIC->CC. | 00013070 |
| R2+8->R2 | DEF A=R2,B=8,ALU=A+B,ALU->R2. | 00013080 |
| R2-8->R2 | DEF A=R2,B=8,ALU=A-B,ALU->R2. | 00013090 |
| R2-16->R2 | DEF A=R2,B=16,ALU=A-B,ALU->R2. | 00013100 |
| R2&511->R2 | DEF A=R2,B=511,ALU=A&B,ALU->R2. | 00013110 |
| | | 00013120 |
| R3->SP | DEF WRP=R3,WRP->SP. | 00013130 |
| R3->SPB | DEF WRP=R3,WRP->SPB. | 00013140 |
| R3->R1 | DEF A=R3,ALU=A,ALU->R1. | 00013150 |
| R3->R2 | DEF A=R3,ALU=A,ALU->R2. | 00013160 |
| R3->DO | DEF A=R3,ALU=A,ALU->DO. | 00013170 |
| R3+8->R3 | DEF A=R3,B=8,ALU=A+B,ALU->R3. | 00013180 |
| R3-24->R3 | DEF A=R3,B=24,ALU=A-B,ALU->R3. | 00013190 |
| R3-28->R3 | DEF A=R3,B=28,ALU=A-B,ALU->R3. | 00013200 |
| R3+4->R3 | DEF A=R3,B=4,ALU=A+B,ALU->R3. | 00013210 |
| R3+4->DO | DEF A=R3,B=4,ALU=A+B,ASO=ALU. | 00013220 |
| R3+12->R3 | DEF A=R3,B=12,ALU=A+B,ALU->R3. | 00013230 |
| R3-1->R3 | DEF A=R3,ALU=A-1,ALU->R3. | 00013240 |
| | | 00013250 |
| IC->R3 | DEF A=IC,ALU=A,ALU->R3. | 00013260 |
| IC->SP | DEF WRP=IC,WRP->SP,SPA=IC-ADD. | 00013270 |
| IC+WL->IC | DEF A=IC,B=WL,ALU=A+B,ALU->IC. | 00013280 |
| IC+8->R3 | DEF A=IC,B=8,ALU=A+B,ALU->R3. | 00013290 |
| IC-16->IC | DEF A=IC,B=16,ALU=A-B,ALU->IC. | 00013300 |
| IC-8->IC | DEF A=IC,B=8,ALU=A-B,ALU->IC. | 00013310 |
| IC&240->IC | DEF A=IC,B=240,ALU=A&B,ALU->IC. | 00013320 |
| IC-2->IC | DEF A=IC,B=2,ALU=A-B,ALU->IC. | 00013330 |
| IC+DL->R2 | DEF A=IC,B=DL,ALU=A+B,ALU->R2. | 00013340 |
| | | 00013350 |
| SPB->IC | DEF A=SPB,ALU=A,ALU->IC. | 00013360 |
| SPB->R1 | DEF A=SPB,ALU=A,ALU->R1. | 00013370 |
| SPB->R2 | DEF A=SPB,ALU=A,ALU->R2. | 00013380 |
| SPB->R3 | DEF A=SPB,ALU=A,ALU->R3. | 00013390 |
| SPB->DO | DEF A=SPB,ALU=A,ASO=ALU. | 00013400 |
| SPB+R1->R1 | DEF A=SPB,B=R1,ALU=A+B,ALU->R1. | 00013410 |
| SPB-R2->CC | DEF A=SPB,B=R2,ALU=A-B,ASO=ALU,LOGIC->CC. | 00013420 |
| SPBXORR1->CC | DEF A=SPB,B=R1,ALU=AXORB,ASO=ALU,LOGIC->CC. | 00013430 |
| SPB&R2->R1 | DEF A=SPB,B=R2,ALU=A&B,ALU->R1. | 00013440 |
| SPB\/R2->R1 | DEF A=SPB,B=R2,ALU=A\/B,ALU->R1. | 00013450 |
| SPBXORR2->R1 | DEF A=SPB,B=R2,ALU=AXORB,ALU->R1. | 00013460 |
| SPB&R2->CC | DEF A=SPB,B=R2,ALU=A&B,ASO=ALU,LOGIC->CC. | 00013470 |
| SPBXORR2->CC | DEF A=SPB,B=R2,ALU=AXORB,ASO=ALU,LOGIC->CC. | 00013480 |
| SPB+R2->R2 | DEF A=SPB,B=R2,ALU=A+B,ALU->R2. | 00013490 |
| SPB+R2->R1 | DEF A=SPB,B=R2,ALU=A+B,ALU->R1. | 00013500 |
| SPB+R2->R2 | DEF A=SPB,B=R2,ALU=A-B,ALU->R2. | 00013510 |
| SPB-R2->R1 | DEF A=SPB,B=R2,ALU=A-B,ALU->R1. | 00013520 |
| SPB+IC->R1 | DEF A=SPB,B=IC,ALU=A+B,ALU->R1. | 00013530 |
| SPB-IC->R3 | DEF A=SPB,B=IC,ALU=A-B,ALU->R3. | 00013540 |
| SPB+DL->R2 | DEF A=SPB,B=DL,ALU=A+B,ALU->R2. | 00013550 |
| SPB+IL->R2 | DEF A=SPB,B=IL,ALU=A+B,ALU->R2. | 00013560 |
| SPB&511->R1 | DEF A=SPB,B=511,ALU=A&B,ALU->R1. | 00013570 |
| SPB&511->R2 | DEF A=SPB,B=511,ALU=A&B,ALU->R2. | 00013580 |
| SPB\/8->CC | DEF A=SPB,B=8,ALU=A\/B,ASO=ALU,LOGIC->CC. | 00013590 |
| SPB+DI->R1 | DEF A=SPB,B=DI,ALU=A+B,ALU->R1. | 00013600 |
| SPB-DI->R1 | DEF A=SPB,B=DI,ALU=A-B,ALU->R1. | 00013610 |
| SPB-DI->CC | DEF A=SPB,B=DI,ALU=A-B,ASO=ALU,LOGIC->CC. | 00013620 |
| SPB&DI->R1 | DEF A=SPB,B=DI,ALU=A&B,ALU->R1. | 00013630 |
| SPB\/DI->R1 | DEF A=SPB,B=DI,ALU=A\/B,ALU->R1. | 00013640 |
| SPBXORDI->R1 | DEF A=SPB,B=DI,ALU=AXORB,ALU->R1. | 00013650 |
| SPBXORDI->CC | DEF A=SPB,B=DI,ALU=AXORB,ASO=ALU,LOGIC->CC. | 00013660 |
| SPB&DI->CC | DEF A=SPB,B=DI,ALU=A&B,ASO=ALU,LOGIC->CC. | 00013670 |
| SPB&DI->DO | DEF A=SPB,B=DI,ALU=A&B,ASO=ALU. | 00013680 |
| SPB\/DI->DO | DEF A=SPB,B=DI,ALU=A\/B,ASO=ALU. | 00013690 |
| SPBXORDI->DO | DEF A=SPB,B=DI,ALU=AXORB,ASO=ALU. | 00013700 |
| NOT-SPB->R2 | DEF A=SPB,ALU=NOT-A,ALU->R2. | 00013710 |
| | | 00013720 |
| IS->R1 | DEF B=IS,ALU=B,ALU->R1. | 00013730 |
| IS->R3 | DEF B=IS,ALU=B,ALU->R3. | 00013740 |
| IS->DO | DEF B=IS,ALU=B,ALU->DO. | 00013750 |
| IS->R2 | DEF B=IS,ALU=B,ALU->R2. | 00013760 |
| IL->R2 | DEF B=IL,ALU=B,ALU->R2. | 00013770 |
| | | 00013780 |

```
 DI->IC           DEF B=DI,ALU=B,ALU->IC.                                00013790
 DI->R1           DEF B=DI,ALU=B,ALU->R1.                                00013800
 DI->R2           DEF B=DI,ALU=B,ALU->R2.                                00013810
 DI->R3           DEF B=DI,ALU=B,ALU->R3.                                00013820
 DI->PTW          DEF B=DI,B->PTW.                                       00013830
                                                                         00013840
 PTW->R2          DEF ADRSW=PTW,XB=ADRSW,XB->R2.                         00013850
 PSR->R1          DEF PSR/PCR=PSR,XB=PSR/PCR,XB->R1.                     00013860
 PCR->R1          DEF PSR/PCR=PCR,XB=PSR/PCR,XB->R1.                     00013870
 PCR->R2          DEF PSR/PCR=PCR,XB=PSR/PCR,XB->R2.                     00013880
 PCR->R3          DEF PSR/PCR=PCR,XB=PSR/PCR,XB->R3.                     00013890
                                                                         00013900
 0->R1            DEF ALU=ZEROS,ALU->R1.                                 00013910
 0->R2            DEF ALU=ZEROS,ALU->R2.                                 00013920
 0->IC            DEF ALU=ZEROS,ALU->IC.                                 00013930
 0->CC            DEF A=R3,B=0,ALU=A+B,ASO=ALU,LOGIC->CC.                00013940
 36->R3           DEF ALU=B,B=36,ALU->R3.                                00013950
 ONES->R3         DEF ALU=ONES,ALU->R3.                                  00013960
                                                                         00013970
*                 MEMORY REFERENCE                                       00013980
*                                                                        00013990
 READ             DEF SIU=REQ3,ZAC=READ,WAIT.                            00014000
 READ-BYTE        DEF SIU=REQ4,ZAC=READ,WAIT.                            00014010
                                                                         00014020
 WRITE            DEF SIU=REQ3,ZAC=WRITE.                                00014030
 WRITE-BYTE       DEF SIU=REQ4,ZAC=WRITE.                                00014040
                                                                         00014050
 I-FETCH          DEF SIU=REQ5,ZAC=READ,DOUBLE,WAIT.                     00014060
 COND-I-FETCH     DEF SIU=REQ6,ZAC=READ,DOUBLE,WAIT,PAGED-ADR3.          00014070
 I-FETCH-GOBB     DEF SIU=REQ7,ZAC=READ,DOUBLE,WAIT.                     00014080
                                                                         00014090
 REQ-INT-DATA     DEF SIU=REQ1,WAIT.                                     00014100
                                                                         00014110
 RELEASE          DEF SIU=REQ2,,WAIT.                                    00014120
                                                                         00014130
 ABSADR1          DEF ADRSW=ABS,WRP=R1.                                  00014140
 ABSADR2          DEF ADRSW=ABS,WRP=R2.                                  00014150
 ABSADR3          DEF ADRSW=ABS,WRP=R3.                                  00014160
                                                                         00014170
 PAGED-AD=IC      DEF ADRSW=PAGED,PTWA=PAGE,WRP=IC.                      00014180
 PAGED-AD=R2      DEF ADRSW=PAGED,PTWA=PAGE,WRP=R2.                      00014190
 PAGED-AD=R3      DEF ADRSW=PAGED,PTWA=PAGE,WRP=R3.                      00014200
                                                                         00014210
 P1=CAD=R2        DEF ADRSW=P1,WRP=R2.                                   00014220
                                                                         00014230
*                 SHIFTER CONTROLS                                       00014240
                                                                         00014250
 ROTATE           DEF LEFT=A,RIGHT=A.                                    00014260
 LSHIFT           DEF LEFT=A,RIGHT=ZEROS.                                00014270
 RSHIFT           DEF LEFT=ZEROS,RIGHT=A.                                00014280
 ASHIFT           DEF LEFT=SIGN,RIGHT=A.                                 00014290
 DSHIFT           DEF LEFT=A,RIGHT=B.                                    00014300
 RSHIFT-DI        DEF LEFT=ZEROS,RIGHT=B,B=DI.                           00014310
                                                                         00014320
 SHCNT=R2         DEF SHCNT=WRP,WRP=R2.                                  00014330
 SHCNT=R3         DEF SHCNT=WRP,WRP=R3.                                  00014340
 LSHCNT=R2        DEF SHCNT=36-WRP,WRP=R2.                               00014350
 LSHCNT=R3        DEF SHCNT=36-WRP,WRP=R3.                               00014360
                                                                         00014370
 BYTE-LOC=R2      DEF WRP=R2.                                            00014380
                                                                         00014390
*                 ALU CONTROLS                                           00014400
                                                                         00014410
 ALU=A            DEF LOGIC=,ALU=FUNC0.                                  00014420
 ALU=A\/B         DEF LOGIC=,ALU=FUNC1.                                  00014430
 ALU=ONES         DEF LOGIC=,ALU=FUNC3.                                  00014440
 ALU=A&B          DEF LOGIC=,ALU=FUNC4.                                  00014450
 ALU=B            DEF LOGIC=,ALU=FUNC5.                                  00014460
 ALU=AXORB        DEF LOGIC=,ALU=FUNC9.                                  00014470
 ALU=ZEROS        DEF LOGIC=,ALU=FUNC12.                                 00014480
 ALU=NOT-A        DEF LOGIC=,ALU=FUNC15.                                 00014490
 ALU=A+1          DEF ARITH=,ALU=FUNC0.                                  00014500
 ALU=A-B          DEF ARITH=,ALU=FUNC6.                                  00014510
 ALU=A+B          DEF ARITH=,ALU=FUNC9.                                  00014520
 ALU=A-1          DEF ARITH=,ALU=FUNC15.                                 00014530
                                                                         00014540
*                 SCRATCHPAD ADDRESSES                                   00014550
                                                                         00014560
 SPA=R1           DEF SPA=WRR,WRR=R1.                                    00014570
 SPA=R2           DEF SPA=WRR,WRR=R2.                                    00014580
 SPA=R3           DEF SPA=WRR,WRR=R3.                                    00014590
 SPA=PSP=ADD      DEF SPA=AD=PER=L,AD=PER=L=0.                           00014600
 SPA=IC=ADD       DEF SPA=AD=PER=L,AD=PER=L=1.                           00014610
 SPA=GR2=ADD      DEF SPA=AD=PER=L,AD=PER=L=2.                           00014620
 SPA=GR3=ADD      DEF SPA=AD=PER=L,AD=PER=L=3.                           00014630
 SPA=GR4=ADD      DEF SPA=AD=PER=L,AD=PER=L=4.                           00014640
 SPA=GR14=ADD     DEF SPA=AD=PER=L,AD=PER=L=14.                          00014650
 SPA=PTW=ADD      DEF SPA=AD=PER=L,AD=PER=L=15.                          00014660
 SPA=CBR=ADD      DEF SPA=TOTAL-AD,TOTAL-AD=0.                           00014670
                                                                         00014680
 PTW=R2           DEF PTWA=RP,WRP=R2.                                    00014690
                                                                         00014700
*                 ADDER/SHIFTER OUTPUT                                   00014710
                                                                         00014720
 SHFTR->IC        DEF ASO=SHFTR,XB=ASO,XB->IC.                           00014730
 SHFTR->R1        DEF ASO=SHFTR,XB=ASO,XB->R1.                           00014740
 SHFTR->R2        DEF ASO=SHFTR,XB=ASO,XB->R2.                           00014750
 SHFTR->R3        DEF ASO=SHFTR,XB=ASO,XB->R3.                           00014760
 SHFTR->DO        DEF ASO=SHFTR.                                         00014770
 SHFTR->CC        DEF ASO=SHFTR,LOGIC->CC.                               00014780
                                                                         00014790
 ALU->IC          DEF ASO=ALU,XB=ASO,XB->IC.                             00014800
 ALU->R1          DEF ASO=ALU,XB=ASO,XB->R1.                             00014810
 ALU->R2          DEF ASO=ALU,XB=ASO,XB->R2.                             00014820
 ALU->R3          DEF ASO=ALU,XB=ASO,XB->R3.                             00014830
 ALU->DO          DEF ASO=ALU.                                           00014840
                                                                         00014850
```

```
ST32->0         DEF ASQ=ST32.                                           00014860
                                                                        00014870
LD32->R1        DEF ASQ=LD32,XB=ASQ,XB->R1.                             00014880
                                                                        00014890
XB->IC          DEF XB->WR,WBA=IC.                                      00014900
XB->R1          DEF XB->WR,WRA=R1.                                      00014910
XB->R2          DEF XB->WR,WRA=R2.                                      00014920
XB->R3          DEF XB->WR,WRA=R3.                                      00014930
                                                                        00014940
*               SWITCHES                                                00014950
*                                                                       00014960
A=IC            DEF A=WRR,WRR=IC.                                       00014970
A=R1            DEF A=WRR,WRR=R1.                                       00014980
A=R2            DEF A=WRR,WRR=R2.                                       00014990
A=R3            DEF A=WRR,WRR=R3.                                       00015000
                                                                        00015010
                                                                        00015020
B=R1            DEF B=WRR,RRR=R1.                                       00015030
B=R2            DEF B=WRR,RRR=R2.                                       00015040
B=R3            DEF B=WRR,RRR=R3.                                       00015050
B=IC            DEF B=WRR,WRR=IC.                                       00015060
B=0             DEF B=K,K=0.                                            00015070
B=1             DEF B=K,K=1.                                            00015080
B=2             DEF B=K,K=2.                                            00015090
B=4             DEF B=K,K=4.                                            00015100
B=12            DEF B=K,K=12.                                           00015110
B=16            DEF B=K,K=16.                                           00015120
B=24            DEF B=K,K=24.                                           00015130
B=28            DEF B=K,K=28.                                           00015140
B=36            DEF B=K,K=36.                                           00015150
B=127           DEF B=K,K=127.                                          00015160
B=240           DEF B=K,K=240.                                          00015170
B=508           DEF B=K,K=508.                                          00015180
B=511           DEF B=K,K=511.                                          00015190
*                                                                       00015200
*               SET/RESET COMMANDS                                      00015210
RESET=HALT      DEF SET/RESET,BIT-AD=0.                                 00015220
HALT            DEF SET/RESET,BIT-AD=1.                                 00015230
ENABLE-INT      DEF SET/RESET,BIT-AD=2.                                 00015240
INHIBIT-INT     DEF SET/RESET,BIT-AD=3.                                 00015250
RESET=XCPTST    DEF SET/RESET,BIT-AD=4.                                 00015260
INV=DO-PAR      DEF SET/RESET,BIT-AD=8.                                 00015270
INH#1-INV#0     DEF SET/RESET,BIT-AD=10.                                00015280
INH#0-INV#1     DEF SET/RESET,BIT-AD=11.                                00015290
INHIBIT-IF#1    DEF SET/RESET,BIT-AD=12.                                00015300
INHIBIT-IF#0    DEF SET/RESET,BIT-AD=13.                                00015310
SET-MEASURE     DEF SET/RESET,BIT-AD=14.                                00015320
EJECT.                                                                  00015330
                                                                        00015340
*               IOPP FIRMWARE CROSSREFERENCE TABLE                      00015350
*                                                                       00015360
*               LABEL    ROUTINES USING IT                              00015370
                                                                        00015380
                ADR      ADR ADLI ASI                                   00015390
                ANR      ANR ANLI ANUI                                  00015400
                ASR      ASR ARR                                        00015410
                BRBS     BRBS BRBR SPSI                                 00015420
                BRBS1    BRBS BRBR BRAC                                 00015430
                BRBS2    BRBS BRBR BRAC FSIC                            00015440
                BRBS3    BRBS BRBR BRAC BSICSS INIT EXCEPT ZLINT        00015450
                         NLINT I-MISS MME RMM DISP REL                  00015460
                CAR      CAR CALI CAUI                                  00015470
                CDSB     CDSR CDRB IBFL                                 00015480
                CDSB1    CDSR CDRB IBFL CPSG ABAG                       00015490
                CDSB2    CDSR CDRB IBFL CPSG ABAG CRR LDLI LSI          00015500
                DSL      DSL DRL                                        00015510
                DSR      DSR DRR                                        00015520
                DSR1     DSR DRR LSR LRR                                00015530
                OVR1     OVR                                            00015540
                OVR2     OVR RDRR L2MG L2AG                             00015550
                ECLZ1    ECLZ ECRZ ECRS                                 00015560
                ECLZ2    ECLZ ECRZ ECRS CMR CMLI                        00015570
                ECLZ3    ECLZ ECRZ ECRS CMR CMLI CMGM                   00015580
                EXCEPT   HARDWARE                                       00015590
                GETPTW   0-MISS I-MISS                                  00015600
                GETSAP   MME RMM EXCEPT                                 00015610
                GETSP1   GETSAP (RETRY FOR OP NOT COMPLETE)             00015620
                GRGB1    GRGR NGRSS GRSPEC                              00015630
                GRXM1    GRXMIS EXTEN                                   00015640
                GNPZ1    GNPZ GNPP                                      00015650
                GNPZ2    GNPZ GNPP ANGM ORGM XOGM AMSI NOP              00015660
                I-MISS   HARDWARE                                       00015670
                IBFR1    IBFR EBFS EBFZ                                 00015680
                IBFR2    IBFR EBFS EBFZ CPC                             00015690
                ICMP     GRX-RD GRX-RW                                  00015700
                ICMP1    GRX-RD GRX-RW CMBM                             00015710
                ICMPW    CMBISS CMGMSS                                  00015720
                ICMPW1   CMBISS CMGMSS LDBG CGRS CGPS                   00015730
                ICMPX    GRGR NGRSS GRSPEC GRMIS                        00015740
                INIT     HARDWARE INIT (INITIALIZATION LOOP)            00015750
                LCMG1    LCMG LAMG LCAG RDEX                            00015760
                LCMG2    LCMG LAMG LCAG RDEX LDMG                       00015770
                LSL      LSL LRL DSL DRL                                00015780
                MME1     MME EXCEPT                                     00015790
                MME2     MME EXCEPT                                     00015800
                MPR1     MPR                                            00015810
                MPR2     MPR                                            00015820
                EJECT.                                                  00015830
                                                                        00015840
*               LABEL    ROUTINES USING IT                              00015850
                                                                        00015860
                NLINT    HARDWARE ZLINT                                 00015870
                NLINT1   NLINT ZLINT REL                                00015880
                NLINT2   NLINT ZLINT REL (RETRY FOR ONC)                00015890
                NLINT3   NLINT ZLINT REL                                00015900
                NLINT4   NLINT ZLINT REL DISP                           00015910
```

```
*   NLINT5    NLINT ZLINT REL DISP MMF            00015920
*   NLINT6    NLINT ZLINT REL DISP MMF INIT RMK   00015930
*   O-MISS    HARDWARE                            00015940
*   OPC1      OPC APC                             00015950
*   ORR       ORR ORLI MUI                        00015960
*   RDRR1     RDRR LZMG LZAG                      00015970
*   RESET     PULS HARDWARE                       00015980
*   RMM1      RMM                                 00015990
*   RSR       RSR RRR                             00016000
*   SECK      GRE-RD GRF-RW GRXMIS BRACSS RSICSS SMSISS   00016010
*   XOR       XOR XOLI ROUI                       00016020
*   ZLINT     HARDWARE                            00016030
    EJECT.                                        00016040
                                                  00016050
*      INITIALIZE ICPP                            00016060
                                                  00016070
*         HARDWARE INITIALIZATION                 00016080
                                                  00016090
*            -PSR                                 00016100
*               STEERING = 0                      00016110
*               MASTER MODE                       00016120
*               EXTERNAL REGISTER ALTERING ALLOWED 00016130
*               ABSOLUTE ADDRESSING MODE          00016140
*               CONDITION CODE = 0                00016150
*               CARRY = 0                         00016160
*               PROCESS TIMER = MAXIMUM           00016170
                                                  00016180
*            -PCR                                 00016190
*               NO EXCEPTIONS                     00016200
*               NO ERRORS                         00016210
*               TRD MODE                          00016220
*               ROM MODE                          00016230
*               INTERRUPTS INHIBITED              00016240
*               LEVEL 7 INTERRUPT REQUEST         00016250
                                                  00016260
*            -WORKING REGISTERS = 0               00016270
*            -SCRATCHPAD BUFFER = 0               00016280
                                                  00016290
*         FIRMWARE INITIALIZATION                 00016300
                                                  00016310
*            -GR SCRATCHPAD = 0                   00016320
*            -PTW SCRATCHPAD = 0                  00016330
*            -PRIMARY CBB = 512 WORD              00016340
                                                  00016350
*         SOFTWARE EXECUTION BEGINS AT LOCATION   00016360
*         ZERO IN THE ROM.                        00016370
                                                  00016380
                                                  00016390
*            ZERO SCRATCHPADS                     00016400
*            BUILD CBB IN R3 (1)                  00016410
                                                  00016420
INIT  R1->SP,SPA=WRR,R2-12T->CC, (WRR=R2)         00016430
      1 R1->PTW,PTWARR2,IF-CC=0,SKIP=1,           00016440
      0 R2+1->R2,                                 00016450
      0 R1+1->R3,BRANCH,TO=INIT,                  00016460
                                                  00016470
*            INITIALIZE CBB                       00016480
*            BEGIN EXECUTION AT ADDRESS IN IC (0) 00016490
                                                  00016500
      R3->SP,SPA=R10->R7,BRANCH,TO=NLINT5,        00016510
    EJECT.                                        00016520
                                                  00016530
*            STANDARD SEQUENCES                   00016540
                                                  00016550
*      EVERY INSTRUCTION BEGINS WITH A STANDARD   00016560
*      SEQUENCE.                                  00016570
                                                  00016580
*      ON THE FIRST STEP OF THE STANDARD          00016590
*      SEQUENCE, THE SPB MAY BE USED AS IF        00016600
*      IT CONAINS XR1.                            00016610
                                                  00016620
*      IF THE LAST STEP OF ANY INSTRUCTION        00016630
*      WRITES INTO R1, THIS VALUE WILL BE         00016640
*      TRANSFERRED TO THE SCRATCHPAD AT THE       00016650
*      ADDRESS IN WA.                             00016660
                                                  00016670
*      INSTRUCTIONS MARKED WITH AN ASTERISK       00016680
*      RETURN TO THE STANDARD SEQUENCE UPON       00016690
*      COMPLETION OF THEIR EXECUTE ACTIVITY.      00016700
    EJECT.                                        00016710
                                                  00016720
*            GRGR STANDARD SEQUENCE               00016730
                                                  00016740
*               C-R      AN*      *LSL            00016750
*               ADR      OR*      *LRR            00016760
*               C-R      XO*      *ARR            00016770
*               SRR      CA*      *RRR            00016780
*               MPR      TP*      *DRL            00016790
*               DVR      AC*      DRR             00016800
                                                  00016810
GRGR  STANDARD-SEQ,SPB->R2,CALL,TO=ICMPX,         00016820
      R1->R1,COND-T-FETCH,DONE,                   00016830
    EJECT.                                        00016840
                                                  00016850
*            NOP STANDARD SEQUENCE                00016860
                                                  00016870
*               *NGR                              00016880
                                                  00016890
NGRSS STANDARD-SEQ,NOT-SPB->R2,CALL,TO=ICMPX,     00016900
      R1->R1,COND-T-FETCH,DONE,                   00016910
```

```
                              EJECT.
                            *
                            *     GR - SPECIAL REGISTER STANDARD SEQUENCE
                            *
                            *              CPC
                            *              APC
                            *              OPC
                            *              CPS
                            *
0011  154 000 342 440 137 007   GRSPEC STANDARD=SEQ,PCR->R2,BRANCH,TO=ICMPX.
                              EJECT.
                            *
                            *     GRI STANDARD SEQUENCE
                            *
                            *          *LSI     LSI
                            *          *LSE     ASI
                            *          *ASR     ALI
                            *          *ASR     PMP
                            *          *DSE     RMP
                            *           DSI     REL
                            *           NOP
                            *
0012  040 000 342 412 000 247   GRI    STANDARD=SEQ,IS->R2,
0013  000 000 360 255 100 464          SP->SPR,SPA=XR1,IC+WL->IC,GR2->WA.
0014  440 000 360 255 401 451          IC->SP,IC+8->R3,EXECUTE.
                            *
                            *         R2 = SHORT IMMEDIATE
                            *         R3 = MEMORY POINTER (UPDATED IC + 8)
                            *         SPR = GR (I.E. GR2)
                            *
0015  210 046 473 610 031 024          R1->R1,COND=I-FETCH,DONE.
                              EJECT.
                            *
                            *     GR MISC. INSTRUCTIONS STANDARD SEQUENCE
                            *
                            *          *HLT    *C*0
                            *          *INH    *C*1
                            *          *ENI    *IP0
                            *                  *IP1
                            *
0016  340 000 342 410 137 007   GRMIS  STANDARD=SEQ,SPB->R2,CALL,TO=ICMPX.
0017  210 046 431 600 031 024          COND=I-FETCH,DONE.
                              EJECT.
                            *
                            *     GRGI STANDARD SEQUENCE
                            *
                            *          LULI    ORLI
                            *                  ORUI
                            *          ADLI    XOLI
                            *                  XOUI
                            *          CMLI    CALI
                            *                  CAUI
                            *          ANLI
                            *          ANUI    PUTS
                            *
0020  240 000 342 413 261 247   GRGI   STANDARD=SEQ,IL->R2,IF,OPC7=0,SKIP=1.
0021  000 000 360 255 000 464          SP->SPR,SPA=XR1,IC+WL->IC,GR1->WA.
                            *
                            *         ROTATE IMMEDIATE IF UPPER
                            *
0022  040 000 344 200 222 140          ROTATE,SHCNT=18,A=R2,SHFTR->R2.
0023  470 000 360 255 401 451          IC->SP,IC+8->R3,ALT,EXECUTE.
                            *
                            *         SPB = GR2
                            *         R2 = LONG IMMEDIATE
                            *         R3 = MEMORY POINTER (UPDATED IC + 8)
                              EJECT.
                            *
                            *     CMRI STANDARD SEQUENCE
                            *
                            *          CMRI
                            *
0024  440 000 362 416 777 207   CMBISS STANDARD=SEQ,SPB6S11->R2,EXECUTE.
                              EJECT.
                            *
                            *     GRX READ TYPE STANDARD SEQUENCE
                            *
                            *          LDRG    XORG
                            *          ADRG    CARG
                            *          SBRG    ALRG
                            *          ANRG    SLRG
                            *          ORRG    LDS2
                            *
0025  040 000 342 450 000 447   GRX-RD STANDARD=SEQ,SPB=DI->R2.
                            *
                            *         SECOND LEVEL INDEXING
                            *
0026  500 000 300 000 132 023          SP->SPR,SPA=XR2,CALL,TO=SECX.
0027  510 003 401 000 133 025          SP->SPR,SPA=GR1,READ,PAGED=AUXR2,CALL,TO=ICMP.
0030  410 046 421 600 000 000          COND=I-FETCH,EXECUTE.
                            *
                            *         SPB = GR (I.E. GR1)
                            *         R3 = MEMORY POINTER (UPDATED IC + 8)
                            *         DI = MEMORY OPERAND
                              EJECT.
                            *
                            *     GRX READ & WRITE STANDARD SEQUENCE
                            *
                            *          ANGM
                            *          ORGM
                            *          XOGM
                            *          ALST
```

```
0031  045 000 342 450 000 447        GRX-RR STANDARD=SFO,SPB,DL->R2.
                                   *
                                   *        SECOND LEVEL INDEXING
                                   *
0032  500 000 300 000 132 023        SP->SPB,SPA=XR2,CALL,TO=SECX.
                                   *
0033  530 003 441 012 133 243        SP->SPB,SPA=R1,RETD,PAGED-AD=R2,IS->R1,CALL,TO=ICMP,
0034  410 103 421 000 000 000        WAIT,WRITE,PAGED-AD=R2,EXECUTE.
                                   *
                                   *        R1 = SHORT IMMEDIATE (FOR AMSI)
                                   *        R2 = OPERAND ADDRESS
                                   *        R3 = MEMORY POINTER (UPDATED IC + R)
                                   *        SPB = GR (I.E. GR1)
                                   *        DL = MEMORY OPERAND
                                   EJECT.
                                   *
                                   *        GRGI EXTERNAL TYPE STANDARD SEQUENCE
                                   *
                                   *             HDEX
                                   *             JPEX
                                   *             GRPP
0035  140 000 342 463 040 447        EXTER STANDARD=SEQ,SPU,IL->R2,BRANCH,TO=GRXM1.
                                   *
                                   *        R2 = PI COMMAND
                                   EJECT.
                                   *
                                   *        GRX MISCELLANEOUS STANDARD SEQUENCE
                                   *
                                   *             LDHR   STGH   CMGH
                                   *             LCMG   STBB   CMBM
                                   *             L2MG   STZM   CRSG
                                   *             LAMG   STAGM  CPSG
                                   *             LCAG   ST32   CGAS
                                   *             LZAG   ST7AH  CGPS
                                   *             RDMR   MWMH   ABAG
                                   *             DISP   GMPZ
0036  040 000 342 450 000 447        GRXMIS STANDARD=SFO,SPB,DL->R2.
                                   *
                                   *        SECOND LEVEL INDEXING
                                   *
0037  500 000 300 000 132 023        SP->SPB,SPA=XR2,CALL,TO=SECX.
0040  400 000 360 253 000 465        GRXM1 SP->SPH,SPA=GR1,IC=WL->IC,GR1->WA,EXECUTE.
                                   *
                                   *        SPB = GR (I.E. GR1)
                                   *        R2 = OPERAND ADDRESS (FOR GRXMIS)
                                   *           = PI COMMAND     (FOR EXTER)
                                   *
                                   *        SOME STORE OPERATIONS RETURN
                                   *
0041  000 000 300 010 001 011        SPB->DO,IC->SP.
0042  210 046 451 400 031 024        COND-1=FETCH,DONE.
                                   EJECT.
                                   *
                                   *        CMGM STANDARD SEQUENCE
                                   *
                                   *             CMGM
0043  040 000 342 450 000 447        CMGMSS STANDARD=SEQ,SPB,DL->R2.
                                   *
                                   *        SECOND LEVEL INDEXING
                                   *
0044  500 000 300 000 132 023        SP->SPI,SPA=XR2,CALL,TO=SECX,
0045  515 003 401 060 135 000        READ,PAGED-AD=R2,CALL,TO=ICMPN.
0046  001 000 300 017 000 640        SPBXOR DI->CC.
0047  601 000 320 057 151 300        IF-CC=1,SKIP-1,SPB-DI->CC,EXECUTE.
                                   EJECT.
                                   *
                                   *        BRANCH ON BIT STANDARD SEQUENCE
                                   *
                                   *             BFBS
                                   *             BFRB
                                   BRB       STANDARD=SEQ.
                                   *         TSTEP1.
0050  003 330 302 400 003 007        (IC=DL->R2)SP->SPB,SPA=XR1.
0051  000 000 340 012 000 240        
0052  040 000 340 250 000 447        LSHIFT,LSHCNT=R3,A=SPB,SHFTR->R1,WAIT.
0053  030 000 341 400 000 000        I-FETCH-DONE,PAGED-AD=R2,IF-OPC7==FRU,SKIP-2,WPR=R1,EXECUTE.
0054  615 047 423 000 062 000
                                   *
                                   *        R2 = BRANCH DESTINATION
                                   *
                                   *        SPECIAL NOTE:
                                   *             AFTER APPROPRIATE HARDWARE FIX, THE FIRST TWO STEPS
                                   *             OF THIS STANDARD SEQUENCE MAY BE COMBINED. THIS
                                   *             NOTE SHOULD BE REMOVED WHEN THEY ARE.
                                   EJECT.
                                   *
                                   *        BRANCH ON CONDITION CODE STANDARD SEQUENCE
                                   *
                                   *             BRAC
0055  330 000 342 450 000 447        BRACSS STANDARD=SEQ,SPB,DL->R2,WAIT.
                                   *
                                   *        SECOND LEVEL INDEXING
                                   *
0056  500 000 300 000 132 023        SP->SPH,SPA=XR2,CALL,TO=SECX.
0057  615 047 441 235 141 440        I-FETCH-DONE,PAGED-AC=R2,IF-GO,SKIP-1,IC=WL->PIC,EXECUTE.
                                   *
                                   *        R2 = BRANCH DESTINATION
```

```
                                         EJECT.                                          00019030
                                                                                         00019040
                                   *     BRANCH & SAVE IC STANDARD SEQUENCE              00019050
                                   *                                                     00019060
                                   *          BSIC                                       00019070
                                                                                         00019080
 0M60  093 000 342 450 000 447     BSICSS STANDARD=SEQ,SPB+D!=>R2,WAIT.                  00019090
                                                                                         00019100
                                   *          SECOND LEVEL INDEXING                      00019110
                                   *                                                     00019120
 0M61  500 000 300 000 132 023           SP=>SPB,SPA=XR2,CALL,TO=SECX.                   00019130
                                                                                         00019140
 0M62  010 047 441 255 000 440           I-FETCH,=GODR,PAGED-AD=R2,IC=WL=PIC,GR1=>WA.    00019150
 0M63  400 000 320 000 000 017           WRP=>SP,WRP=IC,SPA=WA,EXECUTE.                  00019160
                                                                                         00019170
                                   *     R2 = BRANCH DESTINATION                         00019180
                                         EJECT.                                          00019190
                                                                                         00019200
                                   *          CONDITIONAL SET/RESET BIT STANDARD SEQUENCE 00019210
                                   *                                                     00019220
                                   *          CSB                                        00019230
                                   *          CRR                                        00019240
                                                                                         00019250
 0M64  640 000 342 410 043 007     CDSR   STANDARD=SEG,IF=NCRO,SKIP=3,SPB=>R2,EXECUTE.   00019260
                                                                                         00019270
                                   *     R2 = GR (I.E. GR2)                              00019280
                                         EJECT.                                          00019290
                                                                                         00019300
                                   *          GRF INSERT STANDARD SEQUENCE               00019310
                                   *                                                     00019320
                                   *          INFI                                       00019330
                                   *          INFR                                       00019340
                                                                                         00019350
 0M65  440 000 342 410 000 007     GRFIT  STANDARD=SEQ,SPB=>R2,EXECUTE.                  00019360
                                                                                         00019370
                                   *     R2 = GR (I.E. GR2)                              00019380
                                                                                         00019390
                                         EJECT.                                          00019400
                                                                                         00019410
                                   *          GRF EXTRACT & ZERO FILL STANDARD SEQUENCE  00019420
                                   *                                                     00019430
                                   *          ENFZ                                       00019440
                                   *          FCRZ                                       00019450
                                   *          FCLZ                                       00019460
                                                                                         00019470
 0M66  040 000 342 400 300 547     GRFEXZ STANDARD=SEQ,RSHIFT,SHCNT=F1,A=SPB,SHFTR=>R2.  00019480
 0M67  040 000 344 200 400 025            LSHIFT,SHCNT=F2,A=R2,SHFTR=>R2,SP=>SPR,SPA=GR1.00019490
 0M70  441 000 344 200 500 540            RSHIFT,SHCNT=F3,A=R2,SHFTR=>R2,LOGIC=>CC,EXECUTE. 00019500
                                                                                         00019510
                                   *     SPB = GR1 (FOR COMPARES)                        00019520
                                   *     R2  = EXTRACTED FIELD                           00019530
                                         EJECT.                                          00019540
                                                                                         00019550
                                   *          GRF EXTRACT & SIGN EXTEND STANDARD SEQUENCE 00019560
                                   *                                                     00019570
                                   *          ENFS                                       00019580
                                   *          FCRS                                       00019590
                                                                                         00019600
 0M71  040 000 342 400 300 547     GRFEXS STANDARD=SEQ,RSHIFT,SHCNT=F1,A=SPB,SHFTR=>R2.  00019610
 0M72  040 000 344 200 400 025            LSHIFT,SHCNT=F2,A=R2,SHFTR=>R2,SP=>SPR,SPA=GR1.00019620
 0M73  441 000 344 200 500 340            ASHIFT,SHCNT=F3,A=R2,SHFTR=>R2,LOGIC=>CC,EXECUTE. 00019630
                                                                                         00019640
                                   *     SPB = GR1 (FOR COMPARES)                        00019650
                                   *     R2  = EXTRACTED FIELD                           00019660
                                                                                         00019670
                                         EJECT.                                          00019680
                                                                                         00019690
                                   *          SMSI STANDARD SEQUENCE                     00019700
                                   *                                                     00019710
                                   *          SMSI                                       00019720
                                                                                         00019730
 0M74  040 000 342 450 000 447     SMSISS STANDARD=SEQ,SPB+D!=>R2.                       00019740
                                                                                         00019750
                                   *          SECOND LEVEL INDEXING                      00019760
                                                                                         00019770
 0M75  500 000 300 000 132 023           SP=>SPB,SPA=XR2,CALL,TO=SECX.                   00019780
                                                                                         00019790
 0M76  010 103 401 000 000 000           WRITE,PAGED-AD=R2,WAIT.                         00019800
 0M77  400 000 320 012 000 240           TS=>DO,EXECUTE.                                 00019810
                                         EJECT.                                          00019820
                                                                                         00019830
                                   *          GET SAVING AREA POINTER SUBROUTINE         00019840
                                   *                                                     00019850
                                   *          SPB <= R2                                  00019860
                                   *          R1  <= PCR ROTATED 12 RIGHT (BIT 35 = PROC#) 00019870
                                   *          R2  <= ADDRESS OF SAP                      00019880
                                   *          R3  <= SAP + 4                             00019890
                                   *          IC  <= IC & 0360                           00019900
                                                                                         00019910
                                   *          CBB FORMAT:                                00019920
                                   *             BIT  0      L/R FOR CRB2                00019930
                                   *                 1- 3    STEERING FOR CRB2           00019940
                                   *                 4-10    CBB2                        00019950
                                   *                    11   L/R FOR CRB1                00019960
                                   *                 12-14   STEERING FOR CRB1           00019970
                                   *                 15-19   ZERO                        00019980
                                   *                 20-35   CBB1                        00019990
                                                                                         00020000
                                   *     ALIGN PROC # IN BIT 0 OF R1                     00020010
                                                                                         00020020
 0100  024 000 340 040 000 020     GETSAP SP=>SPR,SPA=CBB-ADD,PCR=>R1.                   00020030
 0101  040 000 342 200 214 140            ROTATE,SHCNT=12,A=R1,SHFTR=>R1.                00020040
                                                                                         00020050
                                   *     TEST PROC #                                     00020060
```

```
0102  200 000 302 000 201 000      GETSP1 IF=WRR3=0,SKIP=1,WRR=R1.
                                          ALIGN CBB
0103  040 000 341 000 231 030             LSHIFT,LSHCNT=11,A=SPB,SHFTR=>R2,R2=>SPB.
                                   *      PROC #1 - SAP IS 16 BYTES FARTHER BACK FROM CBB
0104  040 000 344 256 020 300             R2-16=>R2.
                                   *      SAP IS NORMALLY 8 BYTES BACK FROM CBB
0105  040 010 344 255 404 300             R2-8=>R2,RESET=XCPTST.
                                   *      READ SAP & ISOLATE MBE R
0106  010 003 141 216 360 200             READ,ABSAD=R2,IC6240=>IC.
0107  074 000 340 040 000 000             WAIT,PCR=>R3.
                                   *      TEST FOR OP NOT COMPLETE        TEST OHC
0110  200 000 306 000 101 000             IF=WRR0=1,SKIP=1,WRR=R3.        FOR BAD
                                   *      PUT SAP + 4 INTO R3 & RETURN
0111  060 000 340 017 000 240             Q1=>R3.                         GOOD
0112  060 000 356 256 004 440             R3+4=>R3,RETURN.
                                   *      (OP NOT COMPLETE - USE CBB#2
                                   *      RETURN THE ADDRESS TO R3)        BAD
0113  040 000 340 010 000 000             SP=>SPB,SPA=CBR-ADD,SPB=>R2.
0114  060 000 340 000 240 140             ROTATE,LSHCNT=4,A=SPB,SHFTR=>R3.
0115  060 000 347 600 226 030             LSHIFT,LSHCNT=14,A=R3,SHFTR=>R3,R3=>SPB.
0116  060 000 341 410 000 030             R3=>SPR,SPB=>R2.
0117  060 000 346 004 235 100             RSHIFT,LSHCNT=7,A=SPB,B=R3,SHFTR=>R3.
0120  100 000 301 400 102 030             R3=>SPB,BRANCH,TO=GETSP1.
                                          FJECT.
                                   *
                                   *      GET PAGE TABLE WORD ROUTINE
                                   *
                                   *        R3 = EFFECTIVE ADDRESS
                                   *
                                   *        EFFECTIVE ADDRESS FORMAT:
                                   *          BIT 18-24   PAGE NUMBER
                                   *              25-35   PAGE RELATIVE ADDRESS
                                   *
                                   *        PTBR FORMAT:
                                   *          BIT   0      L/R
                                   *                1- 3   STEERING
                                   *                4- 8   PROGRAM NUMBER
                                   *                9-29   PAGE TABLE BASE
                                   *                30-35  KEY
                                   *
                                   *        IC    <- IC FROM SCRATCHPAD
                                   *        PTW SP <- PTW FROM MEMORY
                                   *
                                   *      ISOLATE PAGE NUMBER
0121  020 000 346 200 211 540      GETPTW RSHIFT,SHCNT=9,A=R3,SHFTR=>R1.
0122  020 000 342 216 774 200             R1&50B=>R1.
                                   *      ISOLATE PAGE TABLE BASE ADDRESS
0123  000 000 300 000 017 021             SP=>SPB,SPA=PTBR-ADD.
0124  020 000 340 400 206 570             RSHIFT,SHCNT=6,A=SPB,SHFTR=>R1,R1=>SPR.
0125  020 000 342 200 236 000             LSHIFT,LSHCNT=6,A=R1,SHFTR=>R1.
                                   *      FORM PTW ADDRESS
0126  040 000 342 054 001 461             SPB+R1=>R1,SP=>SPB,SPA=IC-ADD.
                                   *      READ PTW FROM PAGE TABLE
0127  010 003 140 410 000 000             READ,ABSAD=R1,SPB=>IC.
0130  010 000 300 000 000 000             WAIT.
                                   *      UPDATE PTW SCRATCHPAD
0131  000 200 411 407 000 000             Q1=>PTW,PAGED-AD=R3,RETURN.
                                          FJECT.
                                   ************************************************
                                   *
                                   *      SECOND LEVEL INDEXING ROUTINE
                                   *
0132  040 000 356 054 000 440      SECX   SPB+R2=>R2,RETURN.
                                   ************************************************
                                   *
                                   *      UPDATE IC & MEMORY POINTER ROUTINES
                                   *
0133  000 000 340 255 000 440      ICMP   IC+WL=>IC,GR1=>WA.
0134  060 000 350 255 401 451      ICMP1  IC+8=>R3,IC=>SP,RETURN.
0135  000 000 340 255 000 440      ICMPW  IC+WL=>IC,GR1=>WA.
0136  070 000 350 255 401 451      ICMPW1 IC+8=>R3,IC=>SP,WAIT,RETURN.
0137  000 000 340 255 000 465      ICMPX  SP=>SPR,SPA=GR1,IC+WL=>IC,GR1=>WA.
0140  060 000 360 255 401 451             IC+8=>R3,IC=>SP,CS=KA.
                                          FJECT.
                                   ************************************************
                                   *
                                   *      DVR (CONTINUED)
```

```
                                        •               R1 = 0
                                        •               R2 = GR2
                                        •               SPB = GR1
                                        •
0141  020 000 340 410 C00 030    DVR1   R1->SPR,SPB->R1.
0142  460 000 340 016 044 240           36->R3,BEGIN-LOOP.

0143  040 000 342 404 243 130           DSHIFT,LSHCNT=1,A=SPB,B=R1,SHFTR->R1,R1->SPB.
0144  040 000 340 460 243 030           LSHIFT,LSHCNT=1,A=SPB,SHFTR->R1,R1->SPB.
0145  001 000 334 054 000 300           SPB-R2->CC.
0146  251 000 346 250 C12 740           IF=C=0,SKIP=2,R3-1->R3,LOGIC->CC.
0147  241 000 342 250 653 000           IF=CC=0,SKIP=3,R1+1->R1,LOGIC->CC.
0150  040 000 345 054 000 330           R2->SPB,SPB-R2->R2.
0151  040 000 351 010 L00 030           R2->SPB,SPB-R2+END-LOOP.
0152  021 000 342 250 C60 740           R1-1->R1,LOGIC->CC.
0153  000 000 310 000 060 000           END-LOOP.
```
```
                                        •       WRITE R2 AND R1 INTO WA EVEN AND ODD
                                        •
0154  060 000 340 655 400 456    DVR2   IC+8->R3,R1->SP,SPA=WA-ODD.
0155  240 046 475 610 031 024           R2->R1,COND-I-FETCH,DONE.
```
```
                                        •       WRITE SPB AND R1 INTO WA EVEN AND ODD
                                        •
0156  060 000 340 655 400 456           IC+8->R3,R1->SP,SPA=WA-ODD.
0157  240 046 471 410 031 024           SPB->R1,COND-I-FETCH,DONE.
```
```
                                        •       MPR (CONTINUED)
                                        •
                                        •               R1 = 0
                                        •               R2 = GR2
                                        •               SPB = GR1
                                        •
0160  460 000 340 016 044 240    MPR1   36->R3,BEGIN-LOOP.

0161  001 000 305 600 100 000           LSHIFT,SHCNT=R3,A=R2,SHFTR->CC.
0162  200 000 300 000 056 000           IF=CC=0,SKIP=A.
0163  200 000 304 000 201 000           IF=WRR35=0,SKIP=1,WRR=R2.
0164  001 000 306 254 000 467           0=C,SP->SPB,SPA=WA.
0165  021 000 342 054 000 440           SPB+R1->R1,LOGIC->CC.
0166  200 000 346 630 111 770           IF=C=1,SKIP=1,B1->SPB,R2-1->R3.
0167  040 000 344 004 201 100           DSHIFT,SHCNT=1,A=SPB,B=R2,SHFTR->R2.
0170  040 000 350 000 201 540           RSHIFT,SHCNT=1,A=SPB,SHFTR->R1,END-LOOP.
0171  020 000 350 000 201 740           LEFT=ONES,RIGHT=A,SHCNT=1,A=SPB,SHFTR->R1,END-LOOP.
```
```
                                        •
0172  100 000 300 400 173 030           R1->SPR,BRANCH,TO-MPR2.
0173  001 000 301 400 100 540    MPR2   RSHIFT,SHCNT=R3,A=SPB,SHFTR->CC.
0174  040 000 345 404 100 100           DSHIFT,SHCNT=R3,A=SPB,B=R2,SHFTR->R2.
0175  060 000 340 255 400 440           IC+8->R3.
0176  240 046 475 610 051 024           R2->R1,COND-I-FETCH,DONE.
```
```
                                        EJECT.

•       EXCEPTION PROCESSING
                                        •
                                        •       GET SAVING AREA POINTER (GETSAP)
                                        •       WRITE SAVING AREA
                                        •       READ ECB (=0 FOR EXCEPTIONS)
                                        •       UPDATE SAP TO WORD 7 OF SAVING AREA
                                        •       DISPATCH TO ECB
                                        •
                                        •       ECB FORMAT:
                                        •
                                        •               WORD 0 PSR
                                        •                    1 IC
                                        •                    2 SAP (ECB= N FOR PROC # N)
                                        •                    3 PTBR
                                        •
                                        •       SAVING AREA FORMAT:
                                        •
                                        •               WORD 0 ADDRESS
                                        •                    1 PCR
                                        •                    2 GR2
                                        •                    3 GR3
                                        •                    4 GR4
                                        •                    5 PTBR
                                        •                    6 PSR
                                        •                    7 IC
                                        •
                                        •       PUT ECB# IN IC
0177  000 000 300 000 000 000           LOC     200.
0200  100 000 340 010 435 600    EXCEPT C->IC,BRANCH,TO-MMP1.

EJECT.

•       AME & EXCEPTION PROCESSING ROUTINE (CONTINUED)
                                        •
                                        •               R2 = ADDRESS OF SAP
                                        •               R3 = SAP + 2C
                                        •               IC = 16+(ECB=PROC#)
                                        •
                                        •       FIRST FOUR STACK WORDS ALREADY WRITTEN
                                        •       WRITE GR4 & PTBR
                                        •
0701  060 143 147 655 404 461    AME2   WRITE,DOUBLE,ABSAD=R3,SP->SPF,SPA=GR4-ADD,R3+8->R3.
0202  040 000 300 010 017 021           SPB->DO,SP->SPB,SPA=PTBR-ADD.
0203  000 000 300 010 000 000           SPB->DO.

•       WRITE PSR & IC
                                        •
0204  024 143 151 400 000 000           WRITE,DOUBLE,ABSAD=R3,PSR->R1.
0205  040 000 302 210 001 021           R1->DO,SP->SPB,SPA=IC-ADD.
0206  000 000 300 010 000 000           SPB->DO.
```

```
                                    *       UPDATE SAP AND REWRITE
                                    *       PUT SAP ADDRESS IN GR2 & SPB
                                    *       ADJUST ECB OFFSET (IN IC) RELATIVE TO SAP
0207  0U0 103 141 255 402 451               WRITE,ABSAD=R2,WRP->SP,SPA=GR2-ADD,IC+8->IC,
0210  0UC 000 307 256 004 470               R3+4->DO,R2->SPB.
                                    *       FORM ECB ADDRESS
0211  080 000 340 054 000 300               SPB-IC->R3.
                                    *       READ PSR, IC & PTBR
0212  070 043 147 656 014 440               READ,DOUBLE,ABSAD=R3,R3+12->R3.
0213  010 000 300 000 000 000               WAIT.
0214  080 003 141 417 000 240               DI->R1,READ,ABSAD=R3.
0215  010 000 342 117 000 240               WAIT,DI->IC,R1->PSR.
0216  140 000 340 017 245 240               DI->R1,BRANCH,TO-NLINT5.
                                            EJECT.
                                    *
                                    *       NMI (CONTINUED)
                                    *
                                    *       GR2 & GR3 ARE COMING IN NOW
                                    *       R2 = ADDRESS OF SAP
                                    *       R3 = ADDRESS OF GR4 & PTBR
                                    *
                                    *       MAKE REQUEST FOR GR4 & PTBR
0217  030 043 141 417 000 240       RNM1    DI->R1,READ,DOUBLE,ABSAD=R3.
0220  020 000 340 417 002 251               DI->R1,R1->SP,SPA=R2-ADD.
0221  0/C 0C0 346 655 403 451               WAIT,R1->SP,SPA=GR3-ADD,R3+8->R3.
                                    *
                                    *       GR4 & PTBR COMING IN NOW
                                    *       MAKE REQUEST FOR PSR & IC
                                    *
0222  030 043 141 417 000 240               DI->R1,READ,DOUBLE,ABSAD=R3.
0223  010 000 340 417 004 251               WAIT,DI->IC,R1->SP,SPA=GR4-ADD.
                                    *
                                    *       PSR & IC COMING IN NOW
                                    *
0224  020 000 340 017 017 251               DI->R1,WRP->SP,WRP=IC,SPA=PTBR-ADD.
0225  000 000 342 117 000 240               DI->IC,R1->PSR.
                                    *
                                    *       ADJUST SAP TO END OF PREVIOUS FRAME AND REWRITE
                                    *       BEGIN EXECUTION AT ADDRESS IN IC
                                    *
0226  000 103 147 256 034 300               WRITE,ABSAD=R2,R3-28->R3.
0227  1U0 000 306 210 246 000               R3->DO,BRANCH,TO-NLINT6.
                                            EJECT.
                                    *
                                    *       NORMAL LEVEL INTERRUPT (CONTINUED)
                                    *
                                    *       R1 = INTERRUPT WORD
                                    *       R2 = ICB ADDRESS + 8
                                    *       R3 = PCR (TO CHECK FOR OP NOT COMPLETE)
                                    *
                                    *       CHECK FOR OP NOT COMPLETE          TEST ONC
                                    *       PULL CBR IN CASE CBB=2 IS NEEDED           FOR
                                    *       PSR & IC COMING IN NOW                    GOOD
0230  200 000 346 017 005 240       NLINT3  DI->R3,IF=WRBQ=0,SKIP-1,RNM3.
0231  000 000 340 017 000 260               DI->IC,SP->SPB,SPA=CBB-ADD.
                                    *
                                    *       OP NOT COMPLETE - ALIGN CBB=2
                                    *
0232  050 000 340 000 240 140               ROTATE,LSHCNT=4,A=SPB,SHFTR->R2.
0233  060 000 346 200 204 000               LSHIFT,LSHCNT=32,A=R2,SHFTR->R3.
0234  040 000 346 200 235 540               RSHIFT,SHCNT=20,A=R2,SHFTR->R2.
0235  040 000 346 200 231 000               LSHIFT,LSHCNT=11,A=R2,SHFTR->R2.
0236  140 000 346 054 331 440               SPB+R2->R2,BRANCH,TO-NLINT2.
                                    *
                                    *       READ GR14 & PTBR
0237  010 043 101 000 000 000               READ,DOUBLE,ABSAD=R2.
                                    *
                                    *       PUT INTERRUPT WORD STEERING IN PSR
                                    *
0240  000 000 346 600 234 030               LSHIFT,LSHCNT=8,A=R3,SHFTR->R3,R1->SPR.
0241  020 000 346 004 210 100               DSHIFT,SHCNT=8,A=SPB,B=R3,SHFTR->R1.
                                    *
                                    *       WAIT FOR GR14 & PTBR
0242  010 000 302 100 000 000       NLINT4  WAIT,R1->PSR.
0243  020 000 340 017 000 240               DI->R1.
0244  040 000 340 417 014 251               DI->R1,R1->SP,SPA=GR14-ADD.
0245  000 000 300 400 017 011       NLINT5  R1->SP,SPA=PTBR-ADD.
                                    *
                                    *       EXECUTION ADDRESS IN IC
                                    *       FETCH 4 WORD INSTRUCTION BLOCK
0246  010 043 400 000 001 011       NLINT6  I=FETCH,PAGED=AD=IC,WRP->SP,SPA=IC-ADD, (WRP=IC)
0247  150 000 340 210 576 000       NLINT7  IC->R3,BRANCH,TO-BRBS3.
                                            EJECT.
                                    *
                                    *       ZERO LEVEL INTERRUPT PROCESSING
                                    *
                                    *       PERFORM PROCESSOR SELF CHECK
                                    *       GO INTO INFINITE LOOP ON FAILURE
                                    *       CONTINUE TO NLINT IF SUCCESSFUL
                                    *
                                    *       TEST R/W ON SP
0277  000 000 300 000 000 000               LOC     300.
0300  000 000 340 014 044 240       ZLINT   36->R3.
0301  020 000 346 210 000 000               R3->R1.
```

```
0302  900 000 306 000 310 022              SP->SPB,SPA=R3,CALL,TO=ZLINT2.                  00023230
0303  001 000 302 014 000 440              SPAXORR1->CC.                                   00023240
0304  280 000 347 010 053 152              IF=CC=0,SKIP=3,ONES->R3,R2->SP,SPA=R3.          00023250
0305  440 000 340 010 000 600              0->R2,BEGIN=LOOP.                               00023260
0306  000 000 310 000 000 000              END=LOOP.                                       00023270
0307  000 000 310 000 044 020       ZLINT1 SP->SPB,SPA=TOTAL,-D=TOTAL-AD=36,RETURN.        00023280
0310  140 000 343 410 307 012       ZLINT2 R3->SP,SPA=R1,SPB->R2,BRANCH,TO=ZLINT1.         00023290
                                    *                                                     00023300
                                    *        TEST ADDER/SHIFTER                            00023310
                                    *                                                     00023320
0311  020 000 343 200 700 740              LEFT=ONES,RIGHT=A,SHCNT=BS,BYTE-LOC=R3,ADR2,SHFTR->R1.  00023330
0312  000 000 346 600 211 570              RSHIFT,SHCNT=9,A=R3,SHFTR->IC,R1->SPB.          00023360
0313  020 000 341 454 000 470              SPB+IC->R1,R3->SPB.                             00023340
0314  001 000 302 014 000 440              SPBXORR1->CC.                                   00023350
0315  200 000 300 000 051 000              IF=CC=0,SKIP=1.                                 00023370
0316  400 010 300 000 004 000              BEGIN=LOOP,RESET=XCPTST.                        00023380
0317  000 000 310 000 000 000              END=LOOP.                                       00023390
                                           EJECT.                                          00023400
                                    *                                                     00023410
                                    *       NORMAL LEVEL INTERRUPT PROCESSING              00023420
                                    *                                                     00023430
                                    *       SAVE PSR IN GR0                                00023440
                                    *       REQUEST INTERRUPT DATA                         00023450
                                    *                                                     00023460
                                    *       IF OLD INTERRUPT                               00023470
                                    *         PULL PSR & IC FROM SCRATCHPAD                00023480
                                    *         BEGIN EXECUTION AT ADDRESS IN IC             00023490
                                    *                                                     00023500
                                    *       IF NEW INTERRUPT                               00023510
                                    *         USE CBN & INTERRUPT NUMBER TO FETCH ICB      00023520
                                    *         BEGIN EXECUTION AT ADDRESS IN ICB IC         00023530
                                    *                                                     00023540
                                    *       ICB FORMAT:                                    00023550
                                    *         WORD 0 PSR                                   00023560
                                    *              1 IC                                    00023570
                                    *              2 GR14                                  00023580
                                    *              3 PTBR                                  00023590
                                    *                                                     00023600
                                    *       INTERRUPT WORD FORMAT:                         00023610
                                    *         BIT   0    NEW/OLD BIT (1=NEW)               00023620
                                    *              1-18  ZERO                              00023630
                                    *              19-26 ICB NUMBER                        00023640
                                    *              27    ZERO                              00023650
                                    *              28-35 STEERING                          00023660
                                    *                                                     00023670
                                    *       SAVE PSR & REQUEST INTERRUPT DATA              00023680
                                    *                                                     00023690
                                           LOC     320.                                    00023700
0320  034 011 340 000 000 000       NLINT  PSR->R1,RESET=HALT,REQ=INT-DATA.                00023710
0321  010 000 300 400 000 011              WAIT,R1->SP,SPA=PSR=ADD.                        00023720
                                    *                                                     00023730
                                    *       PULL CBB                                       00023740
                                    *       INTERRUPT DATA COMING IN NOW                   00023750
                                    *       PCB LEVEL CHANGES ON NEXT CLOCK                00023760
                                    *                                                     00023770
0322  020 000 340 017 000 260       NLINT1 DI->R1,SP->SPB,SPA=CBB=ADD.                     00023780
                                    *                                                     00023790
                                    *       TEST FOR NEW/OLD INTERRUPT                     00023800
                                    *                                                     00023810
0323  240 000 302 000 104 000              IF=WRRO=1,SKIP=4,WPR=R1.                        00023820
                                    *                                                     00023830
                                    *       ALIGN CBB#1 BY SHIFTING LEFT 11 BITS           00023840
                                    *       NECESSARY ONLY FOR NEW INTERRUPTS              00023850
                                    *                                                     00023860
0324  040 000 340 000 231 000              LSHIFT,LSHCNT=11,A=SPB,SHFTR->R2.               00023870
                                    *                                                     00023880
                                    *       OLD INTERRUPT                                  00023890
                                    *       PULL PSR & IC FROM SP                          00023900
                                    *                                                     00023910
0325  000 000 300 000 000 021              SP->SPB,SPA=PSR=ADD.                            00023920
0326  040 000 340 010 001 021              SP->SPB,SPA=IC-ADD,SPB->R1.                     00023930
0327  000 010 342 110 004 000              R1->PSR,SPB->IC,RESET=XCPTST.                   00023940
0330  110 045 400 000 247 000              I-FETCH,PAGE1-AD=IC,BRANCH,TO=NLINT7.           00023950
                                    *                                                     00023960
                                    *       NEW INTERRUPT                                  00023970
                                    *       FORM ICB ADDRESS                               00023980
                                    *                                                     00023990
0331  040 000 343 200 211 570       NLINT2 RSHIFT,SHCNT=9,A=R1,SHFTR->R2,R2->SPB.          00024000
0332  040 000 344 200 240 000              LSHIFT,LSHCNT=4,A=R2,SHFTR->R2.                 00024010
0333  040 000 344 054 000 440              SPB+R2->R2.                                     00024020
                                    *                                                     00024030
                                    *       READ PSR & IC                                  00024040
                                    *                                                     00024050
0334  090 003 145 255 404 440              READ,DOUBLE,APSAD=R2,RESET=XCPTST,R2+8->R2.     00024060
0335  174 000 340 040 230 000              WAIT,PCR->P3,BRANCH,TO=NLINT3.                  00024070
                                           EJECT.                                          00024080
                                    *                                                     00024090
                                    ******************************************            00024100
                                    *                                                     00024110
                                    *       OPERAND MISS ROUTINE                           00024120
                                    *                                                     00024130
                                    *       R2 = ADDRESS WHICH COULD NOT BE PAGED          00024140
                                    *                                                     00024150
                                    *       GET PTW FROM PAGE TABLE                        00024160
                                    *       PULL IC FROM SCRATCHPAD                        00024170
                                    *       RETRY INSTRUCTION                              00024180
                                    *                                                     00024190
0337  000 000 300 000 000 000              LOC     340.                                    00024200
0340  360 060 344 210 121 000       O-MISS R2->R3,CALL,TO=GETPTW.                          00024210
0341  200 000 330 000 031 024              DONE.                                           00024220
                                    ******************************************            00024230
                                    *                                                     00024240
                                    *       INSTRUCTION MISS ROUTINE                       00024250
                                    *                                                     00024250
                                    *       R3 = ADDRESS WHICH COULD NOT BE PAGED          00024260
```

```
                                              GET PTW FROM PAGE TABLE
                                              FETCH FIRST DOUBLEWORD
                                              CONDITIONALLY FETCH SECOND DOUBLEWORD
0397  000 000 000 000 000 000
0360  300 300 302 400 121 007          LOC        360.
0361  130 045 447 610 376 000     I-MISS  STANDARD-SEQ,CALL,TO-GETPTW.
                                          I-FETCH,PAGED-AD=R1,R3->R2,BRANCH,TO-AR853.
                                          ***********************************************
                                          EJECT.
                                          *
                                          *    GEGR TYPE INSTRUCTIONS
                                          *
                                          *        R2 = GR2
                                          *        R3 = MEMORY POINTER (UPDATED IC + 8)
                                          *        SP8 = GR1
0377  000 000 000 000 000 000          LOC        400.
                                          ***********************************************
                                          *    CRR   COPY - REGISTER TO REGISTER
                                          *          GR1 = GR2
                                          *
                                      CRR    EQU        CDBR2.
                                          ***********************************************
                                          *    ADR   ADD - REGISTER TO REGISTER
                                          *          GR1 = GR1 + GR2
                                          *
0400  240 046 475 454 031 464         ADR    SP8+R2->R1,ARITH->CC,COND=I-FETCH,DONE.
                                          ***********************************************
                                          *    CMR   COMPARE - REGISTER TO REGISTER
                                          *          GR1 :: GR2
                                          *
                                      CMR    EQU        ECL72.
                                          ***********************************************
                                          *    ANR   AND - REGISTER TO REGISTER
                                          *          GR1 = GR1 & GR2
                                          *
0401  241 046 475 414 031 224         ANR    SP8&R2->R1,LOGIC->CC,COND=I-FETCH,DONE.
                                          ***********************************************
                                          *    ORR   INCLUSIVE OR - REGISTER TO REGISTER
                                          *          GR1 = GR1 \/ GR2
                                          *
0402  231 046 475 414 031 064         ORR    SP8\/R2->R1,LOGIC->CC,COND=I-FETCH,DONE.
                                          ***********************************************
                                          *    XOR   EXCLUSIVE OR - REGISTER TO REGISTER
                                          *          GR1 = GR1 XOR GR2
                                          *
0403  231 046 475 414 031 464         XOR    SP8XORR2->R1,LOGIC->CC,COND=I-FETCH,DONE.
                                          ***********************************************
                                          *    CAR   COMPARATIVE AND - REGISTER TO REGISTER
                                          *          GR1 & GR2
                                          *
0404  211 066 439 414 031 224         CAR    SP8&R2->CC,COND=I-FETCH,DONE.
                                          ***********************************************
                                          *    TPR   TEST PARITY OF REGISTER
                                          *          ODD PARITY FOR GR1[27:1]
                                          *
0405  221 046 431 400 031 024         TPR    PARITY->CC,COND=I-FETCH,DONE.
                                          ***********************************************
                                          *    ACR   ADD CARRY BIT TO REGISTER
                                          *          GR1 = GR2 + PSR[13:1]
                                          *
0406  241 046 475 655 231 464         ACR    R2+C->R1,LOGIC->CC,COND=I-FETCH,DONE.
                                          ***********************************************
                                          *    MPR   MULTIPLY - REGISTER TO REGISTER
                                          *          P = GR1 * GR2
                                          *          GR1 = P[34:36]
                                          *
0407  140 000 340 010 160 600         MPR    0->R1,BRANCH,TO-MP*1.
                                          ***********************************************
                                          *    DVR   DIVIDE - REGISTER TO REGISTER
                                          *          GR1-EVEN = REMAINDER OF GR1/GR2
                                          *          GR1-ODD  = QUOTIENT  OF GR1/GR2
                                          *
0410  120 000 340 010 141 600         DVR    0->R1,BRANCH,TO-DV*1.
                                          ***********************************************
                                          *    SBR   SUBTRACT - REGISTER TO REGISTER
                                          *          GR1 = GR1 - GR2
                                          *
0411  240 046 475 454 031 324         SBR    SP8-R2->R1,ARITH->CC,COND=I-FETCH,DONE.
                                          ***********************************************
                                          *    LRL   LOGICAL SHIFT LEFT - REGISTER COUNT
                                          *          SHIFT GR1 LEFT BY GR2 COUNT
                                          *
                                      LRL    EQU        LSL.
                                          ***********************************************
                                          *    LRR   LOGICAL SHIFT RIGHT - REGISTER COUNT
                                          *          SHIFT GR1 RIGHT BY GR2 COUNT
                                          *
                                      LRR    EQU        DSR1.
                                          ***********************************************
                                          *    ARR   ARITHMETIC SHIFT RIGHT
                                          *          SHIFT GR1 RIGHT BY GR2 COUNT AND SIGN EXTEND
                                          *
                                      ARR    EQU        ASR.
                                          ***********************************************
                                          *    RRR   ROTATIONAL SHIFT RIGHT - REGISTER COUNT
                                          *          ROTATE GR1 RIGHT BY GR2 COUNT
                                          *
                                      RRR    EQU        RSR.
                                          ***********************************************
                                          *    DRL   DOUBLE SHIFT LEFT - REGISTER COUNT
                                          *          SHIFT GR1-EVEN-ODD LEFT BY GR2 COUNT
                                          *
                                      DRL    EQU        DSL.
                                          ***********************************************
```

```
*                   DRH   DOUBLE SHIFT RIGHT - REGISTER COUNT
*                         SHIFT GR1-EVEN-ODD RIGHT BY GR2 COUNT
*
                    DRR   EQU         DSR.
***********************************************************
                    EJECT.
*
*                   NEGATE INSTRUCTION
*
*                         R2 = NOT-GR2
*                         R3 = MEMORY POINTER (UPDATED IC + 8)
*                         SPB = GR1
*
***********************************************************
*                   NGR   NEGATE REGISTER
*                         GR1 = -GR2
*
0412  020 400 354 25. 001 440   NGR   R2+ONE->R1,ARITH->CC,RETURN.
***********************************************************
                    EJECT.
*
*                   GR - SPECIAL REGISTER TYPE INSTRUCTIONS
*
*                         R2 = PCR
*                         R3 = MEMORY POINTER (UPDATED IC + 8)
*                         SPB = GR (I.E. GR1)
*
***********************************************************
*                   CPC   COPY PCR TO GR
*                         GR = PCR
*
                    CPC   EQU         16F*2.
***********************************************************
*                   APC   AND GR TO PCR
*                         PCR[18:5] = PCR[18:5] & GR[18:5]
*                         PCR[28:7] = PCR[28:7] & GR[28:7]
*
0413  130 046 445 414 415 200   APC   SPB&R2->R1,COND-1-FETCH,BRANCH,TO-OPC1.
***********************************************************
*                   OPC   INCLUSIVE OR GR TO PCR
*                         PCR[18:5] = PCR[18:5] \/ GR[18:5]
*                         PCR[28:7] = PCR[28:7] \/ GR[28:7]
*
0414  040 046 445 414 000 040   OPC   SPB\/R2->R1,COND-1-FETCH.
0415  200 000 332 140 031 024   OPC1  R1->PCR,DONE.
***********************************************************
*                   CPS   COPY PSR TO GR
*                         GR = PSR
*
0416  244 046 471 400 031 024   CPS   PSR->R1,COND-1-FETCH,DONE.
***********************************************************
                    EJECT.
*
*                   GRI TYPE INSTRUCTIONS
*
*                         R2 = SHORT IMMEDIATE (FOR GRI TYPE)
*                            = GR2 (FOR GRGR TYPE)
*                         R3 = MEMORY POINTER (UPDATED IC + 8)
*                         SPB = GR (I.E. GR2) (FOR GRI TYPE)
*                            = GR1 (FOR GRGR TYPE)
*
***********************************************************
*                   LSL   LOGICAL SHIFT LEFT - IMMEDIATE COUNT
*
0417  021 000 351 000 000 000   LSL   LSHIFT,LSHCNT=R2,A=SPB,SHFTR->R1,LOGIC->CC,RETURN.
***********************************************************
*                   LSR   LOGICAL SHIFT RIGHT - IMMEDIATE COUNT
*
                    LSR   EQU         DSR1.
***********************************************************
*                   ASR   ARITHMETIC SHIFT RIGHT - IMMEDIATE COUNT
*
0420  021 000 351 000 100 340   ASR   ASHIFT,SHCNT=R2,A=SPB,SHFTR->R1,LOGIC->CC,RETURN.
***********************************************************
*                   RSR   ROTATIONAL SHIFT RIGHT - IMMEDIATE COUNT
*
0421  021 000 351 000 100 140   RSR   ROTATE,SHCNT=R2,A=SPB,SHFTR->R1,LOGIC->CC,RETURN.
***********************************************************
*                   DSR   DOUBLE SHIFT RIGHT - IMMEDIATE COUNT
*
0422  000 000 300 000 000 026   DSR   SP->SPB,SPA=WA-ODD.
0423  040 000 340 010 000 027         SP->SPB,SPA=A,SPB->R1.
0424  020 000 343 004 100 100         DSHIFT,SHCNT=R2,A=SPB,B=R1,SHFTR->R1.
0425  000 000 300 400 000 016         R1->SP,SPA=WA-ODD.
0426  021 000 351 000 100 340   DSR1  RSHIFT,SHCNT=R2,A=SPB,SHFTR->R1,LOGIC->CC,RETURN.
***********************************************************
*                   DSL   DOUBLE SHIFT LEFT - IMMEDIATE COUNT
*
0427  300 000 300 000 417 026   DSL   SP->SPB,SPA=WA-ODD,CALL,TO-LSL.
0430  000 000 300 400 000 016         R1->SP,SPA=WA-ODD.
0431  030 046 441 410 000 027         SP->SPB,SPA=WA,SPB->R1,COND-1-FETCH.
0432  261 000 373 004 031 124         DSHIFT,LSHCNT=R2,A=SPB,B=R1,SHFTR->R1,LOGIC->CC,DONE.
***********************************************************
*                   NOP   NO OPERATION
*
                    NOP   EQU         GMP72.
***********************************************************
*                   LSI   LOAD SHORT IMMEDIATE INTO GR
*                         GR = I
*
                    LSI   EQU         CDSR2.
***********************************************************
```

```
                              AST  ADD SHORT IMMEDIATE TO GR
                           *       GR = GR + I
                           *
                           AS1  EQU    ADP.
                           ************************************************
                           *    ALI  ADD LOGICAL IMMEDIATE TO GR
                           *         GR = GR + I
                           *
0433  241 044 475 454 631 404    ALI  SPB=R2=>+1,LOGIC=>PC,COND=1=FETCH,DONE.
                           ************************************************
                           *    MME  MASTER MODE ENTRY
                           *
                           *    MULTIPLY MMEP BY 16 & PUT IT IN IC
                           *
0434  000 000 344 200 240 000    MME  LSHIFT,LSHCNT=4,A=R2,SHFTR=>IC.
                           *
                           *    IC = 16*(ECB*)                        TO PAGE 37
                           *
0435  500 000 303 000 100 000    MME1 CALL,TO=GETSAP.
                           *
                           *    SPB = R2 (EXCEPTION ADDRESS)
                           *    R1  = PCR ROTATED 12 RIGHT (BIT 35 = PROC#)
                           *    R2  = ADDRESS OF SAP
                           *    R3  = SAP + 4
                           *
                           *    WRITE ADDRESS & PCR
                           *
0436  060 143 147 655 400 440    WRITE,DOUBLE,ABSAD=R3,R3,8=>R3.
                           *
                           *    TEST PROCESSOR #
                           *
0437  200 000 302 010 201 000    SPB=>DO,IF=WRR35=0,SKIP=1,WRR=R1.
0440  000 000 302 200 230 140    ROTATE,A=R1,LSHCNT=12,SHFTR=>DO.
                           *
                           *    EFFECTIVE ECB# IS ONE LESS IN PROCESSOR # 1
                           *
0441  000 000 340 256 020 300    IC-16=>IC.
                           *
                           *    WRITE GR2 & GR3
                           *
0442  060 143 147 655 402 461    WRITE,DOUBLE,ABSAD=R3,SP=>SPB,SPA=GR2-ADD,R3+8=>R3.
0443  000 060 600 010 003 021    SPB=>DO,SP=>SPB,SPA=GR3-ADD.
0444  100 000 300 010 201 000    SPB=>DO,BRANCH,TO=MME2.
                           ************************************************
                           *    RMM  RETURN FROM MASTER MODE
                           *
0445  500 000 360 000 100 000    RMM  CALL,TO=GETSAP.
                           *
                           *    R2 = ADDRESS OF SAP
                           *    R3 = SAP+4
                           *
                           *    STEP SAP BACK TO WORD 2 OF STACK FRAME
                           *
0446  000 000 340 256 030 500    R3-24=>R3.
                           *
                           *    MAKE REQUEST FOR GR2 & GR3
                           *
0447  070 043 147 655 400 440    READ,DOUBLE,ABSAD=R3,R3+8=>R3.
0450  110 000 300 000 217 000    WAIT,BRANCH,TO=RMM1.
                           ************************************************
                           *    REL  RELEASE
                           *
0451  010 012 300 000 002 000    REL  RELEASE,ENABLE=INT.
0452  110 000 300 000 322 000    WAIT,BRANCH,TO=NLIMT1.
                           ************************************************
                           EJECT.
                           *
                           *    GR MISCELLANEOUS TYPE INSTRUCTIONS
                           *
                           *    R2 = GR2
                           *    R3 = MEMORY POINTER (UPDATED IC + 8)
                           *    SPA = GR1
                           *
                           ************************************************
                           *    HLT  HALT
                           *
0453  000 012 333 000 001 000    HLT  HALT.
0454  000 000 353 256 002 300    IC-2=>IC,RETURN.
                           ************************************************
                           *    INH  INHIBIT INTERRUPTS
                           *
0455  000 010 310 000 003 000    INH  INHIBIT=INT,RETURN.
                           ************************************************
                           *    ENI  ENABLE INTERRUPTS
                           *
0456  000 010 310 000 002 000    ENI  ENABLE=INT,RETURN.
                           ************************************************
                           *    CR0  COPY REGISTER - PROCESSOR 0
                           *         GR1 = GR2 IF PROCESSOR # = 0
                           *
0457  000 010 311 000 014 017    CR0  R2=>SP,SPA=A,INHIBIT=IF=1,RETURN.
                           ************************************************
                           *    CR1  COPY REGISTER - PROCESSOR 1
                           *         GR1 = GR2 IF PROCESSOR # = 1
                           *
0460  000 010 311 000 015 017    CR1  R2=>SP,SPA=A,INHIBIT=IF=0,RETURN.
                           ************************************************
                           *    IP0  INVERT PARITY - PROCESSOR 0
                           *         GR1 = GR2 IF PROCESSOR # = 0
                           *         PARITY IS INVERTED DURING THE COPY
                           *
0461  000 010 311 000 012 017    IP0  R2=>SP,SPA=A,INVRT=INV=0,RETURN.
                           ************************************************
                           *    IP1  INVERT PARITY - PROCESSOR 1
                           *         GR1 = GR2 IF PROCESSOR # = 1
```

```
                                    PARITY IS INVERTED DURING THE COPY 0462  000 010 311 000 013 017    IP1    R2->SP,SPA=WA,INH=0-INV+1,RETURN.
                                 ****************************************
                                        EJECT.
                                 *
                                 *      GRGI TYPE INSTRUCTIONS
                                 *
                                 *         R2 = LONG IMMEDIATE
                                 *         SPB = GR2
                                 *         R3 = MEMORY POINTER (UPDATED IC + 8)
                                 *
                                 ****************************************
                                 *      LDLI LOAD LOWER IMMEDIATE TO GR
                                 *         GR1 = I
                                 *
                                 LDLI   EQU     CDSR2.
                                 ****************************************
                                 *      ADLI ADD LOWER IMMEDIATE TO GR
                                 *         GR1 = GR2 + I
                                 *
                                 ADLI   EQU     ADR.
                                 ****************************************
                                 *      CMLI COMPARE GR WITH LOWER IMMEDIATE
                                 *         GR2 :: I
                                 *
                                 CMLI   EQU     ECL72.
                                 ****************************************
                                 *      ANLI AND GR WITH LOWER IMMEDIATE
                                 *         GR1 = GR2 & I
                                 *
                                 ANLI   EQU     ANR.
                                 ****************************************
                                 *      ANUI AND GR WITH UPPER IMMEDIATE
                                 *
                                 ANUI   EQU     ANR.
                                 ****************************************
                                 *      ORLI OR GR WITH LOWER IMMEDIATE
                                 *         GR1 = GR2 \/ I
                                 *
                                 ORLI   EQU     ORR.
                                 ****************************************
                                 *      ORUI OR GR WITH UPPER IMMEDIATE
                                 *
                                 ORUI   EQU     ORR.
                                 ****************************************
                                 *      XOLI EXCLUSIVE OR GR WITH LOWER IMMEDIATE
                                 *         GR1 = GR2 XOR I
                                 *
                                 XOLI   EQU     XOR.
                                 ****************************************
                                 *      XOUI EXCLUSIVE OR GR WITH UPPER IMMEDIATE
                                 *
                                 XOUI   EQU     XOR.
                                 ****************************************
                                 *      CALI COMPARATIVE AND GR WITH LOWER IMMEDIATE
                                 *         GR2 & I
                                 *
                                 CALI   EQU     CAR.
                                 ****************************************
                                 *      CAUI COMPARATIVE AND GR WITH UPPER IMMEDIATE
                                 *
                                 CAUI   EQU     CAR.
                                 ****************************************
                                 *      CMBI COMPARE GR WITH BYTE IMMEDIATE
                                 *         GR2(27:9) :: I
                                 *
0463  540 000 341 013 135 270    CMBI   R2->SP,IL->R2,CALL,TU=ICMPR.
0464  211 046 435 454 031 324           SPB=R2->CC,COND=1,FETCH,DONE.
                                 ****************************************
                                 *      PULS PULSE
                                 *
                                 *PULS  SEE LOCATION 776.
                                 ****************************************
                                        EJECT.
                                 *
                                 *      GRX READ TYPE INSTRUCTIONS
                                 *
                                 *         SPB = GR (I.E. GR1)
                                 *         R3 = MEMORY POINTER (UPDATED IC + 8)
                                 *         DI = MEMORY OPERAND
                                 *
                                 ****************************************
                                 *      LDMG LOAD MEMORY TO GR
                                 *         GR = X
                                 *
                                 LDMG   EQU     LCMR2.
                                 ****************************************
                                 *      ADMG ADD MEMORY TO GR
                                 *         GR = GR + X
                                 *
0465  240 400 370 057 031 464    ADMG   SPB+DI->R1,ARITH->CC,DONE.
                                 ****************************************
                                 *      SBMG SUBTRACT MEMORY FROM GR
                                 *         GR = GR - X
                                 *
0466  240 400 370 057 031 324    SBMG   SPB-DI->R1,ARITH->CC,DONE.
                                 ****************************************
                                 *      ANMG AND MEMORY TO GR
                                 *         GR = GR & X
                                 *
0467  221 000 370 017 031 224    ANMG   SPB&DI->R1,LOGIC->CC,DONE.
                                 ****************************************
                                 *      ORMG OR MEMORY TO GR
                                 *         GR = GR \/ X
                                 *
```

```
0470  241 000 370 017 031 064    ORMG    SPBV/DI->RI,LOGIC->CC,DONE.
                                 *********************************************
                                 *        XOMG EXCLUSIVE OR MEMORY TO GR
                                 *              GR = GR XOR X
                                 *
0471  221 000 370 017 031 464    XOMG    SPBXORDI->RI,LOGIC->CC,DONE.
                                 *********************************************
                                 *        CAGM COMPARATIVE AND GR WITH MEMORY
                                 *              GR & X
                                 *
0472  201 000 330 017 031 224    CAGM    SPB&DI->CC,DONE.
                                 *********************************************
                                 *        ALMG ADD LOGICAL MEMORY TO GR
                                 *              GR = GR + X
                                 *
0473  241 000 370 057 031 464    ALMG    SPB+DI->RI,LOGIC->CC,DONE.
                                 *********************************************
                                 *        SLMG SUBTRACT LOGICAL MEMORY FROM GR
                                 *              GR = GR - X
                                 *
0474  241 000 370 057 031 324    SLMG    SPB-DI->RI,LOGIC->CC,DONE.
                                 *
                                 *        LD32 LOAD FROM 32-BIT FORMAT
                                 *              GR(0:4) = X(1:1)
                                 *              GR(4:8) = X(1:8)
                                 *              GR(12:8) = X(10:8)
                                 *              GR(20:8) = X(19:8)
                                 *              GR(28:8) = X(26:8)
                                 *
0475  221 000 370 037 031 264    LD32    BBDI,ALUF,LD32->RI,LOGIC->CC,DONE.
                                 EJECT.
                                 *
                                 *        GRX READ & WRITE TYPE INSTRUCTIONS
                                 *
                                 *              R1 = SHORT IMMEDIATE (FOR ALSI)
                                 *              R2 = OPERAND ADDRESS
                                 *              R3 = MEMORY POINTER (UPDATED IC + A)
                                 *              S1 = GR (I.E. GR1)
                                 *              D1 = MEMORY OPERAND
                                 *
                                 *********************************************
                                 *        ANGM AND GR TO MEMORY
                                 *              X = GR & Y
                                 *
0476  161 000 300 017 552 200    ANGM    SPB&DI->DD,LOGIC->CC,BRANCH,TO-GWPZ2.
                                 *********************************************
                                 *        ORGM OR GR TO MEMORY
                                 *              X = GR V/X
                                 *
0477  161 000 300 017 552 040    ORGM    SPBV/DI->DD,LOGIC->CC,BRANCH,TO-GWPZ2.
                                 *********************************************
                                 *        XOGM EXCLUSIVE OR GR TO MEMORY
                                 *              X = GR XOR X
                                 *
0500  161 000 300 017 552 440    XOGM    SPBXORDI->DD,LOGIC->CC,BRANCH,TO-GWPZ2.
                                 *
                                 *        AMSI ADD TO MEMORY FROM SHORT IMMEDIATE
                                 *              X = X + I
                                 *
0501  140 400 302 257 552 440    AMSI    RI+DI->DD,ARITH->CC,BRANCH,TO-GWPZ2.
                                 EJECT.
                                 *
                                 *        GRX EXTERNAL TYPE INSTRUCTIONS
                                 *
                                 *              SFB = GR (I.E. GR1)
                                 *              R2  = PI COMMAND
                                 *
                                 *********************************************
                                 *        RDEX READ EXTERNAL REGISTER INTO GR
                                 *              GR = EXTERNAL REGISTER
                                 *
0502  140 003 201 000 512 000    RDEX    READ,PI=C4D&R2,BRANCH,TO-LCMG1.
                                 *        WREX WRITE EXTERNAL REGISTER FROM GR
                                 *              EXTERNAL REGISTER = GR
                                 *
0503  070 103 251 255 400 440    WREX    WRITE,PI=C'D&R2,IC+8->R3,WAIT,RETURN.
                                 *        GWPP GENERATE WRONG PARITY - PROGRAMMABLE INTERFACE
                                 *              EXTERNAL REGISTER = GR
                                 *                      PARITY IS INVERTED DURING THE COPY
                                 *
0504  110 103 201 000 550 000    GWPP    WRITE,PI=C4D&R2,WAIT,BRANCH,TO-GWPZ1.
                                 EJECT.
                                 *
                                 *        GRX MISCELLANEOUS TYPE INSTRUCTIONS
                                 *
                                 *              SFB = GR (I.E. GR1)
                                 *              R2  = OPERAND ADDRESS
                                 *
                                 *********************************************
                                 *        LDBG LOAD BYTE TO GR
                                 *              GR(0:27) = 0
                                 *              GR(27:9) = X(0:9)
                                 *
0505  510 064 001 000 136 000    LDBG    READ-BYTE,PAGED-AD&R2,CALL,TO-ICMPG1.
0506  020 000 341 007 660 900            RSHIFT-PI,SHCNT&DL,BYTE-LOC&R2,SHFTR->RI.
0507  001 044 443 015 777 200            R16SII->RI,LOGIC->CC,COND-I-FETCH.
0510  220 000 372 215 031 024            RI->RI,DOPF.
                                 *
                                 *        LCMG LOAD AND CLEAR MEMORY TO GR
                                 *              GR = X
```

```
                                                     *      X + 0                                  0n029500
0911  010 073 401 000 000 000   LCMG  READ,CLEAR,PAGED=AD*R2.                                      0n029510
0912  040 000 340 255 401 451   LCMG1 IC->SP,IC+8->R3.                                             0n029520
0913  010 046 401 400 000 000         COND=1=FETCH.                                                0n029540
0914  241 000 370 017 031 264   LCMG2 DI->R1,LOGIC->CC,DONE.                                       0n029550
                                ****************************************************              0n029560
                                *         L2MG LOAD 2 WORDS MEMORY TO GR'S                         0n029570
                                *              GR EVEN + X EVEN                                    0n029580
                                *              GR ODD  + X ODD                                     0n029590
                                                                                                   0n029600
0915  110 043 401 000 522 000   L2MG  READ,DOUBLE,PAGED=AD*R2,BRANCH,TO=RDRR1.                     0n029610
                                ****************************************************              0n029620
                                *         LAMG LOAD ABSOLUTE MEMORY TO GR                          0n029630
                                *              GR + A                                              0n029640
                                                                                                   0n029650
0916  110 003 101 000 512 000   LAMG  READ,ABSAD*R2,BRANCH,TO=LCMG1.                               0n029660
                                ****************************************************              0n029670
                                *         LCAG LOAD AND CLEAR ABSOLUTE TO GR                       0n029680
                                *              GR + X                                              0n029690
                                *              X + 0                                               0n029700
                                                                                                   0n029710
0917  110 023 101 000 512 000   LCAG  READ,CLEAR,ABSAD*R2,BRANCH,TO=LCMG1.                         0n029720
                                ****************************************************              0n029730
                                *         L2AG LOAD 2 WORDS ABSOLUTE TO GR                         0n029740
                                *              GR EVEN + X EVEN                                    0n029750
                                *              GR ODD  + X ODD                                     0n029760
                                                                                                   0n029770
0920  110 043 101 000 522 000   L2AG  READ,DOUBLE,ABSAD*R2,BRANCH,TO=RDRR1.                        0n029780
                                ****************************************************              0n029790
                                *         RDRR READ REMOTE REGISTERS INTO GR                       0n029800
                                *              GR PAIR + REMOTE REGISTER[0:72]                     0n029810
                                                                                                   0n029820
0921  010 003 1 1 0  00 00      RDRR  READ,RMOTE,ABSAD*R2.                                         0n029830
0922  017 000 303 000 001 011   RDRR1 WAIT,IC->SP.                                                 0n029840
0923  041 000 340 017 000 240         DI->R2,LOGIC->CC.                                            0n029850
0924  140 000 340 017 154 240         DI->R1,DI,FETCH->INT2.                                       0n029860
                                ****************************************************              0n029870
                                *         PTSP DISPATCH PER PROCESS                                0n029880
                                *              USR + 7                                             0n029890
                                *              IC  + 7+1                                           0n029900
                                *              ST14 + 7+2                                          0n029910
                                *              PTGR + 7+3                                          0n029920
                                                                                                   0n029930
0925  010 043 401 000 000 000   PTSP  READ,P,DBLE,PAGED=AD*R2.                                     0n029940
0926  000 000 340 000 000 000         NOP.                                                         0n029950
0927  050 010 344 255 402 440         WAIT,ENABLE=INT,R2+8->R2.                                    0n029960
0930  040 043 441 017 000 240         DI->R1,READ,DOUBLE,PAGED=AD*R2.                              0n029970
0931  140 000 340 017 242 240         DI->IC,READ,FETCH=FI INT4.                                   0n029980
                                ****************************************************              0n029990
                                *         STGM STORE GR TO MEMORY                                  0n030000
                                *              X + GR                                              0n030010
                                                                                                   0n030020
0932  070 103 451 255 400 440   STGM  WRITE,PAGED=AD*R2,IC+8->R3,WAIT,RETURN.                      0n030030
                                ****************************************************              0n030040
                                *         STGE STORE GR TO BYTE                                    0n030050
                                *              X[0:9] + GR[27:9]                                   0n030060
                                                                                                   0n030070
0933  070 104 441 255 400 440   STGB  WRITE=BYTE,PAGED=AD*R2,IC+8->R3,WAIT.                        0n030080
0934  000 000 311 000 700 140         ROTATE,SHCNT=65,BYTE=LOC=R2,A=SPR,SHFTR->GO,RETURN.          0n030090
                                ****************************************************              0n030100
                                *         S2GM STORE 2 GR'S TO MEMORY                              0n030110
                                *              X EVEN + GR EVEN                                    0n030120
                                *              X ODD  + GR ODD                                     0n030130
                                                                                                   0n030140
0935  070 143 441 255 400 440   S2GM  WRITE,DOUBLE,PAGED=AD*R2,IC+8->R3,WAIT.                      0n030150
0936  000 000 310 010 000 020         SPA->DO,SP->SPA,SPA*A->DDD,RETURN.                           0n030160
                                ****************************************************              0n030170
                                *         SAGM STORE ABSOLUTE GR TO MEMORY                         0n030180
                                *              X + GR                                              0n030190
                                                                                                   0n030200
0937  070 103 151 255 400 440   SAGM  WRITE,ABSAD*R2,IC+8->R3,WAIT,RETURN.                         0n030210
                                ****************************************************              0n030220
                                *         ST32 STORE IN 32-BIT FORMAT                              0n030230
                                *              X[0:1]  + 0                                         0n030240
                                *              X[1:8]  + GR[4:8]                                   0n030250
                                *              X[9:1]  + 0                                         0n030260
                                *              X[10:8] + GR[12:8]                                  0n030270
                                *              X[18:1] + 0                                         0n030280
                                *              X[19:8] + GR[20:8]                                  0n030290
                                *              X[27:1] + 0                                         0n030300
                                *              X[28:8] + GR[28:8]                                  0n030310
                                                                                                   0n030320
0940  070 103 441 255 400 440   ST32  WRITE,PAGED=AD*R2,IC+8->R3,WAIT.                             0n030330
0941  000 000 300 020 001 051         SP->A,ST32->PC,IC->SP.                                       0n030340
0942  210 000 431 000 031 024         COND=1=FETCH,DONE.                                           0n030350
                                ****************************************************              0n030360
                                *         S2AM STORE 2 GR'S ABSOLUTE TO MEMORY                     0n030370
                                *              X EVEN + GR EVEN                                    0n030380
                                *              X ODD  + GR ODD                                     0n030390
                                                                                                   0n030400
0943  070 143 141 255 400 440   S2AM  WRITE,DOUBLE,ABSAD*R2,IC+8->R3,WAIT.                         0n030410
0944  000 000 310 010 000 020         SPA->D0,SP->SPA,SPA*A->DDD,RETURN.                           0n030420
                                ****************************************************              0n030430
                                *         WRRR WRITE REMOTE REGISTERS FROM GR                      0n030440
                                *              REMOTE REGISTER[0:72] + GR PAIR                     0n030450
                                                                                                   0n030460
0945  070 103 141 255 400 440   WRRR  WRITE,RMOTE,ABSAD*R2,IC+8->R3,WAIT.                          0n030470
0946  000 000 310 010 000 020         SPA->D0,SP->SPA,SPA*A->DDD,RETURN.                           0n030480
                                ****************************************************              0n030490
                                *         GNPZ GENERATE WRONG PARITY - ZAC                         0n030500
                                *              X + GR WITH PARITY INVERTED                         0n030510
                                                                                                   0n030520
0947  010 143 401 000 000 000   GNPZ  WRITE,PAGED=AD*R2,WAIT.                                      0n030530
0950  000 000 340 010 001 011   GNPZ1 SPA->DI,IC->SP.                                              0n030540
```

```
0551  060 010 340 255 41C 440            I V=LO=PAR,IC+8->R3.
0552  210 046 431 400 031 024     GWP22  COND=I-FETCH,DONE.
                                  **********************************************
                                  *           CMGM COMPARE GR WITH MEMORY
                                  *                  GR !! X
                                  *
                                  CMGM   EQU           ECL73.
                                  **********************************************
                                  *           CMBM COMPARE BYTE WITH MEMORY
                                  *                  GR[27:9] !! X[0:9]
                                  *
0553  010 064 441 000 134 000     CMBM   READ=BYTE,PAGED=ADPR2,CALL,TO=ICMPL.
0554  030 0CC 340 016 747 200            SPB6511->R1,WAIT.
0555  040 0CC 341 007 600 500            =SHIFT=C1,SHCNT=BL,BYTE-LOC=R2,SHFTR->R2.
0556  040 0C0 344 016 777 230            V26511->R2,R1->SPB.
0557  211 046 425 454 031 324            SPB-R2->CC,COND=I-FETCH,DONE.
                                  **********************************************
                                  *           CRSG COPY REGISTER SCRATCHPAD TO GR
                                  *                  GR + REGISTER SCRATCHPAD
                                  *
0560  900 000 304 000 136 022     CRSG   SP->SPB,SPA=R2,CALL,TO=ICMPR1.
0561  201 046 471 410 031 024            SPB->R1,LOGIC->CC,COND=I-FETCH,DONE.
                                  **********************************************
                                  *           CPSG COPY PTR SCRATCHPAD TO GR
                                  *                  GR + PTR SCRATCHPAD REGISTER
                                  *
0562  142 000 341 000 607 000     CPSG   PTW->R2,PTWA=R2,BRANCH,TO=COSB1.
                                  **********************************************
                                  *           CGRS COPY GR TO REGISTER SCRATCHPAD
                                  *                  REGISTER SCRATCHPAD + GR
                                  *
0563  020 000 340 010 600 000     CGRS   SPP->R1.
0564  900 000 304 400 136 012            R1->SP,SPA=R2,CALL,TO=ICMP1.
0565  210 046 431 400 031 024            COND=I-FETCH,DONE.
                                  **********************************************
                                  *           CGPS COPY GR TO PTR SCRATCHPAD REGISTER
                                  *                  PTR SCRATCHPAD + GR
                                  *
0566  020 000 340 010 600 000     CGPS   SPP->R1.
0567  900 200 304 000 136 000            R1->PT,PT ASR2,CALL,TO=ICMPR1.
0570  210 046 431 400 031 024            COND=I-FETCH,DONE.
                                  **********************************************
                                  *           ABAG A ABSOLUTE ADDRESS TO GR
                                  *                  GR + ABSOLUTE ADDRESS
                                  *
0571  142 000 441 000 607 000     ABAG   PAGED=ADRR2,BRANCH=IXE->R2,BRANCH,TO=COSB1.
                                  **********************************************
                                  EJECT.
                                  **********************************************
                                  *
                                  *           BRANCH TYPE INSTRUCTIONS
                                  *
                                  *           R2 = BRANCH DESTINATION.
                                  *
                                  *           SKIP TO GO CONDITION WILL BE MADE
                                  *           AFTER FIRST STEP IF BRANCH IS SUCCESSFUL.
                                  *
                                  *           BPBS BRANCH IF BIT SET
                                  *                  IF GR[C[1]]=1, IC + Y
                                  *
0572  000 000 340 255 000 440     BPBS   IC+WL->IC.
                                  *
                                  *           HOOD FOR BRBS / BRBR
                                  *           FIRST EXECUTION STEP FOR BRAC
                                  *
0573  060 0C0 340 255 401 451     BRBS1  IC->SP,IC+6->R3.
                                  *
                                  *           HOLD FOR BRAC
                                  *
0574  210 046 431 400 031 024            COND=I-FETCH,DONE.
                                  *
                                  *           GO FOR ALL BRANCHES
                                  *
0575  000 000 345 210 001 011     BRBS2  R2->SP,SPA=IC=ACC,R2->IC.
                                  *
                                  *           IC UPDATED & IN SCRATCHPAD
                                  *           TRANSFER CONTROL TO ADDRESS IN IC
                                  *
0576  270 000 340 255 421 440     BRBS3  IC+8->R3,WAIT,IF-APR33=0,SKIP=1.
0577  010 046 431 400 000 000            COND=I-FETCH.
                                  *
                                  *           BRANCH DESTINATION ODD WORD
                                  *           WAIT FOR NEXT TWO WORDS
                                  *
0600  010 000 500 000 000 000            WAIT.
                                  *
0601  200 000 330 000 031 024            DONE.
                                  **********************************************
                                  *           BRBR BRANCH IF BIT RESET
                                  *                  IF GR[6[1]]=0, IC + Y
                                  *
                                  BRBR   EQU           BRBS.
                                  **********************************************
                                  *           BRAC BRANCH ON CONDITION
                                  *                  IF CF[CC[1]]=1, IC + Y
                                  *
                                  BRAC   EQU           BRBS1.
                                  **********************************************
                                  *           BSIC BRANCH AND SAVE IC
                                  *                  GR + IC + 4
                                  *                  IC + Y
                                  *
                                  BSIC   EQU           BRBS2.
                                  **********************************************
```

```
                                EJECT.
                       *
                       *       GRF TYPE INSTRUCTIONS
                       *
                       *            IC = GR2 (FOR CLSR AND GRFIX TYPE)
                       *               = EXTRACTED FIELD (FOR GRFEX TYPE)
                       *            SPB = GR1 (FOR GRFEX TYPE)
                       *
                       ***********************************************
                       *       CDSB CONDITIONAL SET BIT
                       *            IF CF(CC(1)=1, GR(F3)) = 1
                       *
0A02  020 000 340 012 000 240   CDSB    IS->R1.
                       *
                       *       CONDITIONS MET
                       *
0A03  040 000 344 000 300 170           ROTATE,SHCNT=F1,A=P2,SHFTR->R2,R1->SPB.
0A04  040 000 344 004 400 1C0           DSHIFT,SHCNT=F2,A=SPB,B=R2,SHFTR->R2.
0A05  040 000 344 200 500 140           ROTATE,SHCNT=F3,A=P2,SHFTR->R2.
                       *
                       *       CONDITIONS NOT MET
                       *
0A06  000 000 340 255 100 440           IC+WL->IC,GR2->RA.
0A07  070 000 340 255 401 451   CDSB1   IC+8->R3,IC->SP,WAIT.
0A10  241 044 475 610 031 024   CDSB2   R2->R1,LOGIC->CC,COND-1-FETCH,DONE.
                       ***********************************************
                       *       CDRB CONDITIONAL RESET BIT
                       *            IF CF(CC(1)=1, GR(F3)) = 0
                       *
                               CDRB    EQU     CDSB.
                       ***********************************************
                       *       IBFR INSERT INTO BIT FIELD FROM REGISTER
                       *            GR1(F3:F2) = GR2(36-F2:F2)
                       *
0A11  000 000 300 000 000 025   IBFR    SP->SPR,SPA=GR1.
0A12  040 000 341 000 300 170           ROTATE,SHCNT=F1,A=PB,SHFTR->R2,R2->SPB.
0A13  040 000 344 004 400 1C0           DSHIFT,SHCNT=F2,A=SPB,B=R2,SHFTR->R2.
0A14  041 000 344 200 500 140           ROTATE,SHCNT=F3,A=P2,SHFTR->R2,LOGIC->CC.
0A15  000 000 340 255 000 440   IBFR1   IC+WL->IC,GR1->RA.
0A16  070 000 340 255 401 451           IC+8->R3,IC->SP,WAIT.
0A17  240 044 475 610 031 024   IBFR2   R2->R1,COND-1-FETCH,DONE.
                       ***********************************************
                       *       IBFL INSERT INTO BIT FIELD FROM LITERAL
                       *            GR(F3:F2) = L(6-F2:F2)
                       *
                               IBFL    EQU     CDSB.
                       ***********************************************
                       *       EBFZ EXTRACT BIT FIELD, ZERO FILL
                       *            GR1(0:F3)              = 0
                       *            GR1(F2+F3:36-(F2+F3))  = 0
                       *            GR1(F3:F2)             = GR2(36-(F1+F2):F2)
                       *
                               EBFZ    EQU     IBFR1.
                       ***********************************************
                       *       EBFS EXTRACT BIT FIELD, ZERO FILL
                       *            GR1(0:F3)              = GR2(36-(F1+F2):1)
                       *            GR1(F2+F3:36-(F2+F3))  = 0
                       *            GR1(F3:F2)             = GR2(36-(F1+F2):F2)
                       *
                               EBFS    EQU     IBFR1.
                       ***********************************************
                       *       ECRZ EXTRACT AND COMPARE WITH REGISTER, ZERO FILL
                       *            EF(0:F3)               = 0
                       *            EF(F3:36-F3)           = GR2(36-(F1+F2):F2)
                       *            GR1 :: EF
                       *
                               ECRZ    EQU     ECLZ1.
                       ***********************************************
                       *       ECRS EXTRACT AND COMPARE WITH REGISTER, SIGN EXTEND
                       *            EF(0:F3)               = GR2(36-(F1+F2):1)
                       *            EF(F3:36-F3)           = GR2(36-(F1+F2):F2)
                       *            GR1 :: EF
                       *
                               ECRS    EQU     ECLZ1.
                       ***********************************************
                       *       ECLZ EXTRACT AND COMPARE WITH LITERAL, ZERO FILL
                       *            LX(0:31)               = 0
                       *            LX(31:5)               = L
                       *            EF(0:36-F2)            = 0
                       *            EF(36-F2:F2)           = GR(36-(F1+F2):F2)
                       *            LX :: EF
                       *
0A20  020 000 340 012 000 240   ECLZ    IS->R1.
0A21  000 000 300 400 000 030           R1->SPR.
0A22  000 000 340 255 000 440   ECLZ1   IC+WL->IC.
0A23  060 000 340 255 401 451           IC->SP,IC+N->R3.
                       *
                       *       COMPARE SPB :: R2
                       *       TEST FOR LIKE OR UNLIKE SIGNS
                       *
0A24  001 000 304 014 000 440   ECLZ2   SPBXORR2->CC.
0A25  201 000 304 054 191 300           IF-CC=1,SKIP-1,SPB-R2->CC.
0A26  010 046 401 400 000 000   ECLZ3   COND-1-FETCH.
                       *
                       *       LIKE SIGNS
                       *
0A27  200 000 330 000 031 024           DONE.
                       *
                       *       UNLIKE SIGNS - SET CC WITH SIGN OF SPB
                       *
0A30  201 000 330 015 431 064           SPBV/B->CC,DONE.
                       ***********************************************
                               EJECT.
                       *
                       *       MISCELLANEOUS
```

```
*********************************************
*         SMSI STORE TO MEMORY FROM SHORT IMMEDIATE
*              X + 1
SMSI    FOJ         656.
*********************************************
*              PULS PULSE
*
0775  000 000 000 000 000 000        LOC         776.
0776  010 096 409 010 016 000   PULS COND=1=FETCH,SET=MEASURE,R2->DO.
*
*              COPY LAST STEP
*              USED WITH RESET & BRANCH FUNCTION
*
                                    LOC         777.
0777  200 000 130 000 031 024  RESET DONE.
*********************************************
                                 FUNCT.
000 001 000 410 000 011          CPS      OPCODE(001),UM,GRSPEC.
000 002 000 412 000 007          SGS      OPCODE(002),UM,GMSS.
000 003 000 517 000 011          CPC      OPCODE(003),UM,GRSPEC.
000 004 000 413 000 011          IPC      OPCODE(004),MM,GRSPEC.
000 005 000 414 000 011          DPC      OPCODE(005),MM,GRSPEC.
000 006 000 407 000 005          SPR      OPCODE(006),UM,GRGR.
000 007 000 410 000 005          SUB      OPCODE(007),UM,GRGR.
000 100 000 415 000 005          SAR      OPCODE(010),UM,GRGR.
000 101 000 470 000 005          ADR      OPCODE(011),UM,GRGR.
000 102 000 411 000 005          SBR      OPCODE(012),UM,GRGR.
000 103 000 471 000 005          INC      OPCODE(013),UM,GRGR.
000 104 000 461 000 005          DER      OPCODE(014),UM,GRGR.
000 105 000 463 000 005          XOR      OPCODE(015),UM,GRGR.
000 106 000 464 000 005          CAR      OPCODE(016),UM,GRGR.
000 107 000 624 000 005          CMR      OPCODE(017),UM,GRGR.
000 200 000 464 000 005          ACR      OPCODE(020),UM,GRGR.
000 201 000 409 000 005          TPR      OPCODE(021),UM,GRGR.
000 202 001 457 000 016          CKO      OPCODE(022),MM,GRMIS.
000 203 001 460 000 016          CRI      OPCODE(023),MM,GRMIS.
000 204 001 461 000 016          IPO      OPCODE(024),MM,GRMIS.
000 205 001 462 000 016          IP1      OPCODE(025),MM,GRMIS.
000 406 001 453 000 016          MLT      OPCODE(046),MM,GRMIS.
000 407 000 455 000 016          TIM      OPCODE(047),UM,GRMIS.
000 500 000 496 000 016          ENI      OPCODE(050),UM,GRMIS.
000 501 000 451 000 012          REL      OPCODE(051),UM,GR1.
000 502 001 445 000 012          RMM      OPCODE(052),MM,GR1.
000 503 000 552 000 012          NOP      OPCODE(053),UM,GR1.
000 504 000 410 000 012          LSI      OPCODE(054),UM,GR1.
000 505 000 405 000 012          ASI      OPCODE(055),UM,GR1.
000 506 000 433 000 012          ALI      OPCODE(056),UM,GR1.
000 507 000 434 000 012          MME      OPCODE(057),UM,GR1.
000 600 000 417 000 012          LSL      OPCODE(060),UM,GR1.
000 601 000 426 000 012          LSR      OPCODE(061),UM,GR1.
000 602 000 420 000 012          ASR      OPCODE(062),UM,GR1.
000 603 000 421 000 012          ASR      OPCODE(063),UM,GR1.
000 604 000 427 000 012          DSL      OPCODE(064),UM,GR1.
000 605 000 422 000 012          DSR      OPCODE(065),UM,GR1.
010 000 000 417 000 005          LRL      OPCODE(100),UM,GRGR.
010 001 000 426 000 005          LRR      OPCODE(101),UM,GRGR.
010 002 000 420 000 005          ARR      OPCODE(102),UM,GRGR.
010 003 000 421 000 005          RRR      OPCODE(103),UM,GRGR.
010 004 000 427 000 005          DRL      OPCODE(104),UM,GRGR.
010 005 000 422 000 005          DRR      OPCODE(105),UM,GRGR.

020 000 000 476 001 031          ANGM     OPCODE(200),UM,GRX-RW.
040 001 000 477 001 031          ORGM     OPCODE(201),UM,GRX-RW.
040 002 000 500 001 031          XOGM     OPCODE(202),UM,GRX-RW.
040 003 000 465 001 025          ADMG     OPCODE(203),UM,GRX-RD.
020 004 000 466 001 025          SBMG     OPCODE(204),UM,GRX-RD.
040 005 000 426 000 043          CMGM     OPCODE(205),UM,CMGMSS.
040 006 000 475 001 025          LD32     OPCODE(206),UM,GRX-RD.
040 007 000 467 001 025          STMG     OPCODE(207),UM,GRX-RD.
040 100 000 470 001 025          DMNG     OPCODE(210),UM,GRX-RD.
040 101 000 471 001 025          XGMG     OPCODE(211),UM,GRX-RD.
040 102 000 472 001 025          CAGM     OPCODE(212),UM,GRX-RL.
040 103 000 473 001 025          ALMG     OPCODE(213),UM,GRX-RL.
040 104 000 474 001 025          SLMG     OPCODE(214),UM,GRX-RD.
040 105 000 514 001 025          LDMG     OPCODE(215),UM,GRX-RL.
040 206 000 572 000 074          SMSI     OPCODE(220),UM,SMSISS.
040 201 000 501 001 031          MMSI     OPCODE(221),UM,GRX-RW.
040 300 000 502 001 036          STGM     OPCODE(230),UM,GRXMIS.
040 301 001 547 001 036          SMPZ     OPCODE(231),MM,GRXMIS.
040 304 000 503 000 035          ZREX     OPCODE(234),UM,EXTER.
040 305 001 504 000 035          GMPP     OPCODE(235),MM,EXTER.
020 306 000 502 000 035          RDEX     OPCODE(236),UM,EXTER.
040 400 000 403 000 020          POLI     OPCODE(240),UM,GRGI.
040 401 000 403 000 020          ROUI     OPCODE(241),UM,GRGI.
040 402 000 404 000 020          CALI     OPCODE(242),UM,GRGI.
020 403 000 404 000 020          CAJI     OPCODE(243),UM,GRGI.
040 404 000 401 000 020          ANLI     OPCODE(244),UM,GRGI.
040 405 000 401 000 020          ANJI     OPCODE(245),UM,GRGI.
040 406 000 402 000 020          ORLI     OPCODE(246),UM,GRGI.
040 407 000 402 000 020          ORJI     OPCODE(247),UM,GRGI.
040 500 000 463 000 024          CMBI     OPCODE(250),UM,CMBISS.
040 501 000 624 000 020          CMLI     OPCODE(252),UM,GMGI.
040 502 000 400 000 020          LDLI     OPCODE(260),UM,GRGI.
040 503 000 776 000 020          ADLI     OPCODE(262),UM,GRGI.
040 601 001 521 001 036          PULS     OPCODE(264),UM,GRGI.
040 602 001 525 001 036          RDRR     OPCODE(301),MM,GRXMIS.
040 603 000 511 001 036          DISP     OPCODE(302),MM,GRXMIS.
040 604 001 515 001 036          LCNG     OPCODE(303),UM,GRXMIS.
040 605 001 516 001 036          L24G     OPCODE(304),UM,GRXMIS.
040 606 001 520 001 036          LANG     OPCODE(305),MM,GRXMIS.
040 607 001 517 001 036          L2AG     OPCODE(306),MM,GRXMIS.
040 100 000 571 001 036          LCAG     OPCODE(307),MM,GRXMIS.
                                 ABAG     OPCODE(311),UM,GRXMIS.
```

```
030 102 001 545 001 036
040 103 000 533 001 036
030 104 000 535 001 036
030 105 001 537 001 036
030 106 001 540 001 036
040 107 001 543 001 036
030 200 001 560 001 036
040 201 001 562 001 036
030 202 001 563 001 036
030 203 001 566 001 036
030 204 000 553 001 036
040 205 000 505 001 036
030 300 000 573 000 055
040 304 000 573 000 060
030 400 000 615 000 066
040 401 000 615 000 071
030 402 000 622 000 066
040 403 000 622 000 071
030 404 000 620 000 066
030 502 000 611 000 065
040 501 000 612 000 065
030 600 000 572 000 050
030 601 000 572 000 050
040 700 000 602 000 044
040 701 000 602 000 044
```

```
*RRR    OPCODE(312),MM,GRXMIS.
STGB    OPCODE(313),UM,GRXMIS.
S2GM    OPCODE(314),UM,GRXMIS.
SAGM    OPCODE(315),MM,GRXMIS.
ST32    OPCODE(316),MM,GRXMIS.
S2AM    OPCODE(317),MM,GRXMIS.
CRSG    OPCODE(320),MM,GRXMIS.
CPSG    OPCODE(321),MM,GRXMIS.
CGRS    OPCODE(322),MM,GRXMIS.
CGPS    OPCODE(323),MM,GRXMIS.
CMBM    OPCODE(324),UM,GRXMIS.
LDBG    OPCODE(325),UM,GRXMIS.
BRAC    OPCODE(330),UM,BRACSS.
BSIC    OPCODE(334),UM,BSICSS.
EBFZ    OPCODE(340),UM,GRFEXZ.
EBFS    OPCODE(341),UM,GBFEXS.
FCRZ    OPCODE(342),UI,GRFEXZ.
FCRS    OPCODE(343),UI,GRFEAS.
ECLZ    OPCODE(344),UI,GRFEXZ.
IEFR    OPCODE(350),UM,GRFIN.
INFL    OPCODE(351),UM,GRFIN.
-LR     OPCODE(360),UI,BRF.
-RS     OPCODE(361),UM,BRB.
CESE    OPCODE(370),UM,CDSW.
C1-E    OPCODE(371),UI,CDSN.

* ALL OTHER OP CODES HAVE A STANDARD SEQUENCE
* OF REGS, NO ADDRESS SYLLABLE, MASTER MODE,
* AND AN EXECUTION ADDRESS OF 777.

EJECT.

THE PATHFINDER

* THE PATHFINDER IS AN 16 BIT BY 256 READ ONLY MEMORY.
* IT IS ADDRESSED BY THE OPCODE AND SPECIFIES FOUR THINGS
* ABOUT EACH INSTRUCTION. THESE ARE:

*   BIT    0    SET IF INSTRUCTION CONTAINS
*                AN ADDRESS SYLLABLE
*          1-8  STANDARD SEQUENCE ADDRESS (ADDRESSES
*                LOCATIONS 0 TO 255 IN CONTROL STORE)
*          9    PRIVILEGE REQUIRED (1=MASTER, 0=SLAVE)
*          10-17 EXECUTION ADDRESS (ADDRESSES
*                LOCATIONS 256 TO 511 IN CONTROL STORE)

* THE LISTINGS BELOW DISPLAY THESE CONTENTS IN OCTAL. FOR
* THE EXECUTION ADDRESS LISTING, THE FIRST DIGIT SPECIFIES
* THE PRIVILEGE REQUIRED BIT. THE NEXT THREE DIGITS SHOW
* THE ACTUAL EXECUTION ADDRESS (BIT 0 OF THE ADDRESS,
* WHICH IS NOT CONTAINED IN THE PATHFINDER, IS SHOWN AS A ONE).
* FOR THE STANDARD SEQUENCE ADDRESS LISTING, THE FIRST DIGIT
* SPECIFIES THE ADDRESS SYLLABLE BIT. THE NEXT THREE DIGITS
* SHOW THE ACTUAL STANDARD SEQUENCE ADDRESS (BIT 0 OF THE
* ADDRESS, WHICH IS NOT CONTAINED IN THE PATHFINDER, IS SHOWN
* AS A ZERO).
```

EXECUTION ADDRESS - PATH FINDER CONTENTS

| OP CODE | ADD | | CONTENT |
|---|---|---|---|
|  | 000 | INVOP | 1777 |
| 002 | 001 | CES | 0416 |
| 004 | 002 | LGR | 0412 |
| 006 | 003 | CPC | 0417 |
| 010 | 004 | FPC | 1413 |
| 012 | 005 | CPC | 1414 |
| 014 | 006 | FPR | 1407 |
| 016 | 007 | DVF | 0410 |
| 020 | 010 | CRR | 0410 |
| 022 | 011 | ACR | 0401 |
| 024 | 012 | SFR | 0411 |
| 026 | 013 | ANR | 0401 |
| 030 | 014 | ORR | 0402 |
| 032 | 015 | XCR | 0403 |
| 034 | 016 | CAR | 0404 |
| 036 | 017 | CFR | 0424 |
| 040 | 040 | ACR | 0406 |
| 042 | 021 | TRR | 0405 |
| 044 | 042 | CRU | 1457 |
| 046 | 023 | CRI | 1460 |
| 050 | 044 | IPU | 1461 |
| 052 | 025 | IPI | 1462 |
|  | 046 | INVOP | 1777 |
|  | 047 | INVOP | 1777 |
|  | 050 | INVOP | 1777 |
|  | 051 | INVOP | 1777 |
|  | 052 | INVOP | 1777 |
|  | 053 | INVOP | 1777 |
|  | 054 | INVOP | 1777 |
|  | 055 | INVOP | 1777 |
|  | 056 | INVOP | 1777 |
|  | 057 | INVOP | 1777 |
|  | 040 | INVOP | 1777 |
|  | 041 | INVOP | 1777 |
|  | 042 | INVOP | 1777 |
|  | 043 | INVOP | 1777 |
|  | 044 | INVOP | 1777 |
|  | 045 | INVOP | 1777 |
| 114 | 046 | FLI | 1453 |
| 116 | 047 | INH | 0455 |
| 120 | 050 | ENI | 0456 |
| 122 | 051 | REL | 0451 |
| 124 | 052 | RNM | 1445 |

| 126 | 053 | NOP | 0552 |
| 130 | 054 | LSI | 0410 |
| 132 | 055 | ASI | 0400 |
| 134 | 056 | ALI | 0433 |
| 136 | 057 | MME | 0434 |
| 140 | 060 | LSL | 0417 |
| 142 | 061 | LSR | 0426 |
| 144 | 062 | ASR | 0420 |
| 146 | 063 | LSR | 0421 |
| 150 | 064 | LSL | 0427 |
| 152 | 065 | JSR | 0422 |
|  | 066 | INVOP | 1777 |
|  | 067 | INVOP | 1777 |
|  | 070 | INVOP | 1777 |
|  | 071 | INVOP | 1777 |
|  | 072 | INVOP | 1777 |
|  | 073 | INVOP | 1777 |
|  | 074 | INVOP | 1777 |
|  | 075 | INVOP | 1777 |
|  | 076 | INVOP | 1777 |
|  | 077 | INVOP | 1777 |
| 200 | 100 | LRL | 0417 |
| 202 | 101 | LRR | 0426 |
| 204 | 102 | ARR | 0420 |
| 206 | 103 | RRR | 0421 |
| 210 | 104 | LRL | 0427 |
| 212 | 105 | ORR | 0422 |
|  | 106 | INVOP | 1777 |
|  | 107 | INVOP | 1777 |
|  | 110 | INVOP | 1777 |
|  | 111 | INVOP | 1777 |
|  | 112 | INVOP | 1777 |
|  | 113 | INVOP | 1777 |
|  | 114 | INVOP | 1777 |
|  | 115 | INVOP | 1777 |
|  | 116 | INVOP | 1777 |
|  | 117 | INVOP | 1777 |
|  | 140 | INVOP | 1777 |
|  | 141 | INVOP | 1777 |
|  | 142 | INVOP | 1777 |
|  | 143 | INVOP | 1777 |
|  | 144 | INVOP | 1777 |
|  | 125 | INVOP | 1777 |
|  | 126 | INVOP | 1777 |

EXECUTION ADDRESS - PATH FINDER CONTENTS

| | | | | | | | | |
|---|---|---|---|---|---|---|---|---|
| | 147 | INVOP | 1777 | | | 253 | INVOP | 1777 |
| | 150 | INVOP | 1777 | | | 254 | INVOP | 1777 |
| | 151 | INVOP | 1777 | | | 255 | INVOP | 1777 |
| | 152 | INVOP | 1777 | | | 256 | INVOP | 1777 |
| | 153 | INVOP | 1777 | | | 257 | INVOP | 1777 |
| | 154 | INVOP | 1777 | | 540 | 260 | LDLI | 0610 |
| | 155 | INVOP | 1777 | | | 261 | INVOP | 1777 |
| | 156 | INVOP | 1777 | | 544 | 262 | ADLI | 0400 |
| | 157 | INVOP | 1777 | | | 263 | INVOP | 1777 |
| | 160 | INVOP | 1777 | | 550 | 264 | PULS | 0776 |
| | 161 | INVOP | 1777 | | | 265 | INVOP | 1777 |
| | 162 | INVOP | 1777 | | | 266 | INVOP | 1777 |
| | 163 | INVOP | 1777 | | | 267 | INVOP | 1777 |
| | 164 | INVOP | 1777 | | | 270 | INVOP | 1777 |
| | 165 | INVOP | 1777 | | | 271 | INVOP | 1777 |
| | 166 | INVOP | 1777 | | | 272 | INVOP | 1777 |
| | 167 | INVOP | 1777 | | | 273 | INVOP | 1777 |
| | 170 | INVOP | 1777 | | | 274 | INVOP | 1777 |
| | 171 | INVOP | 1777 | | | 275 | INVOP | 1777 |
| | 172 | INVOP | 1777 | | | 276 | INVOP | 1777 |
| | 173 | INVOP | 1777 | | | 277 | INVOP | 1777 |
| | 174 | INVOP | 1777 | | | 300 | INVOP | 1777 |
| | 175 | INVOP | 1777 | | 602 | 301 | ADMG | 1521 |
| | 176 | INVOP | 1777 | | 604 | 302 | DISP | 1525 |
| | 177 | INVOP | 1777 | | 606 | 303 | LCMG | 0511 |
| 400 | 200 | ANGM | 0476 | | 610 | 304 | L2MG | 0515 |
| 402 | 201 | ORGM | 0477 | | 612 | 305 | LAMG | 1516 |
| 404 | 202 | XOGM | 0500 | | 614 | 306 | L2AG | 1520 |
| 406 | 203 | ADMG | 0465 | | 616 | 307 | LCAG | 1517 |
| 410 | 204 | SBMG | 0466 | | | 310 | INVOP | 1777 |
| 412 | 205 | CMGM | 0626 | | 622 | 311 | ADAG | 0571 |
| 414 | 206 | LD32 | 0475 | | 624 | 312 | MRMK | 1545 |
| 416 | 207 | ANMG | 0467 | | 626 | 313 | STGG | 0533 |
| 420 | 210 | ORMG | 0470 | | 630 | 314 | S2G | 0535 |
| 422 | 211 | XOMG | 0471 | | 632 | 315 | SAG | 1537 |
| 424 | 212 | CAGM | 0472 | | 634 | 316 | ST32 | 0540 |
| 426 | 213 | ALMG | 0473 | | 636 | 317 | S2AM | 1543 |
| 430 | 214 | SLMG | 0474 | | 640 | 320 | CMSG | 1560 |
| 432 | 215 | LDMG | 0514 | | 642 | 321 | CPSG | 1562 |
| | 216 | INVOP | 1777 | | 644 | 322 | CGMS | 1563 |
| | 217 | INVOP | 1777 | | 646 | 323 | CGPS | 1566 |
| 440 | 220 | SMSI | 0572 | | 650 | 324 | CMGM | 0553 |
| 442 | 221 | AMSI | 0501 | | 652 | 325 | LDMG | 0565 |
| | 222 | INVOP | 1777 | | | 326 | INVOP | 1777 |
| | 223 | INVOP | 1777 | | | 327 | INVOP | 1777 |
| | 224 | INVOP | 1777 | | 660 | 330 | BRAC | 0573 |
| | 225 | INVOP | 1777 | | | 331 | INVOP | 1777 |
| | 226 | INVOP | 1777 | | | 332 | INVOP | 1777 |
| | 227 | INVOP | 1777 | | | 333 | INVOP | 1777 |
| 460 | 230 | STUG | 1532 | | 670 | 334 | BSIC | 0575 |
| 462 | 231 | GMPZ | 1547 | | | 335 | INVOP | 1777 |
| | 232 | INVOP | 1777 | | | 336 | INVOP | 1777 |
| | 233 | INVOP | 1777 | | | 337 | INVOP | 1777 |
| 470 | 234 | MMEA | 1503 | | 700 | 340 | EBPZ | 0615 |
| 472 | 235 | GMPP | 1504 | | 702 | 341 | EBPS | 0615 |
| 474 | 236 | MGEA | 1502 | | 704 | 342 | ECKZ | 0622 |
| | 237 | INVOP | 1777 | | 706 | 343 | ECKS | 0622 |
| 500 | 240 | ADLI | 0403 | | 710 | 344 | ECLZ | 0620 |
| 502 | 241 | ADUI | 0403 | | | 345 | INVOP | 1777 |
| 504 | 242 | CALI | 0404 | | | 346 | INVOP | 1777 |
| 506 | 243 | CAUI | 0404 | | | 347 | INVOP | 1777 |
| 510 | 244 | ANLI | 0401 | | 720 | 350 | IBFR | 0611 |
| 512 | 245 | ANUI | 0401 | | 722 | 351 | IBFL | 0602 |
| 514 | 246 | ORLI | 0402 | | | 352 | INVOP | 1777 |
| 516 | 247 | ORUI | 0402 | | | 353 | INVOP | 1777 |
| 520 | 250 | CMBI | 0463 | | | 354 | INVOP | 1777 |
| | 251 | INVOP | 1777 | | | 355 | INVOP | 1777 |
| 524 | 252 | CMLI | 0424 | | | 356 | INVOP | 1777 |
| | | | | | | 357 | INVOP | 1777 |
| | | | | | 740 | 360 | BRBR | 0572 |
| | | | | | 742 | 361 | BRBS | 0572 |
| | | | | | | 362 | INVOP | 1777 |
| | | | | | | 363 | INVOP | 1777 |
| | | | | | | 364 | INVOP | 1777 |
| | | | | | | 365 | INVOP | 1777 |
| | | | | | | 366 | INVOP | 1777 |
| | | | | | | 367 | INVOP | 1777 |
| | | | | | 760 | 370 | CDSB | 0602 |
| | | | | | 762 | 371 | CDRB | 0602 |
| | | | | | | 372 | INVOP | 1777 |
| | | | | | | 373 | INVOP | 1777 |
| | | | | | | 374 | INVOP | 1777 |
| | | | | | | 375 | INVOP | 1777 |
| | | | | | | 376 | INVOP | 1777 |
| | | | | | | 377 | INVOP | 1777 |

STANDARD SEQUENCE - PATH FINDER CONTENTS

| OP CODE | ADR | | CONTENT | | | | | |
|---|---|---|---|---|---|---|---|---|
| | 000 | INVOP | 0005 | | 032 | 015 | XOR | 0005 |
| 002 | 001 | CPS | 0011 | | 034 | 016 | CAR | 0005 |
| 004 | 002 | NGN | 0007 | | 036 | 017 | CMR | 0005 |
| 006 | 003 | CPL | 0011 | | 040 | 020 | ACR | 0005 |
| 010 | 004 | APL | 0011 | | 042 | 021 | TPM | 0005 |
| 012 | 005 | OPL | 0011 | | 044 | 022 | CRU | 0014 |
| 014 | 006 | MPR | 0005 | | 046 | 023 | CRI | 0014 |
| 016 | 007 | OVR | 0005 | | 050 | 024 | IPO | 0014 |
| 020 | 010 | CRR | 0005 | | 052 | 025 | IP1 | 0014 |
| 022 | 011 | AVR | 0005 | | | 026 | INVOP | 0005 |
| 024 | 012 | SBR | 0005 | | | 027 | INVOP | 0005 |
| 026 | 013 | ANR | 0005 | | | 030 | INVOP | 0005 |
| 030 | 014 | ORR | 0005 | | | 031 | INVOP | 0005 |
| | | | | | | 032 | INVOP | 0005 |
| | | | | | | 033 | INVOP | 0005 |

STANDARD SEQUENCE - PATH FINDER CONTENTS

| Addr | Oct | Mnem | Val |
|---|---|---|---|
| | 044 | INVOP | 0005 |
| | 045 | INVOP | 0005 |
| | 046 | INVOP | 0005 |
| | 047 | INVOP | 0005 |
| | 040 | INVOP | 0005 |
| | 041 | INVOP | 0005 |
| | 042 | INVOP | 0005 |
| | 043 | INVOP | 0005 |
| | 044 | INVOP | 0005 |
| | 045 | INVOP | 0005 |
| 114 | 046 | HLT | 0016 |
| 116 | 047 | INM | 0016 |
| 120 | 050 | ENI | 0016 |
| 122 | 051 | REC | 0012 |
| 124 | 052 | RMM | 0012 |
| 126 | 053 | NOP | 0012 |
| 130 | 054 | LSI | 0012 |
| 132 | 055 | ASI | 0012 |
| 134 | 056 | ALI | 0012 |
| 136 | 057 | MHE | 0012 |
| 140 | 060 | LSL | 0012 |
| 142 | 061 | LSR | 0012 |
| 144 | 062 | ASR | 0012 |
| 146 | 063 | RSM | 0012 |
| 150 | 064 | DSL | 0012 |
| 152 | 065 | DSR | 0012 |
| | 066 | INVOP | 0005 |
| | 067 | INVOP | 0005 |
| | 070 | INVOP | 0005 |
| | 071 | INVOP | 0005 |
| | 072 | INVOP | 0005 |
| | 073 | INVOP | 0005 |
| | 074 | INVOP | 0005 |
| | 075 | INVOP | 0005 |
| | 076 | INVOP | 0005 |
| | 077 | INVOP | 0005 |
| 200 | 100 | LRL | 0005 |
| 202 | 101 | LRR | 0005 |
| 204 | 102 | ARR | 0005 |
| 206 | 103 | RRR | 0005 |
| 210 | 104 | DRL | 0005 |
| 212 | 105 | DRR | 0005 |
| | 106 | INVOP | 0005 |
| | 107 | INVOP | 0005 |
| | 110 | INVOP | 0005 |
| | 111 | INVOP | 0005 |
| | 112 | INVOP | 0005 |
| | 113 | INVOP | 0005 |
| | 114 | INVOP | 0005 |
| | 115 | INVOP | 0005 |
| | 116 | INVOP | 0005 |
| | 117 | INVOP | 0005 |
| | 120 | INVOP | 0005 |
| | 121 | INVOP | 0005 |
| | 122 | INVOP | 0005 |
| | 123 | INVOP | 0005 |
| | 124 | INVOP | 0005 |
| | 125 | INVOP | 0005 |
| | 126 | INVOP | 0005 |
| | 127 | INVOP | 0005 |
| | 130 | INVOP | 0005 |
| | 131 | INVOP | 0005 |
| | 132 | INVOP | 0005 |
| | 133 | INVOP | 0005 |
| | 134 | INVOP | 0005 |
| | 135 | INVOP | 0005 |
| | 136 | INVOP | 0005 |
| | 137 | INVOP | 0005 |
| | 140 | INVOP | 0005 |
| | 141 | INVOP | 0005 |
| | 142 | INVOP | 0005 |
| | 143 | INVOP | 0005 |
| | 144 | INVOP | 0005 |
| | 145 | INVOP | 0005 |
| | 146 | INVOP | 0005 |
| | 147 | INVOP | 0005 |
| | 150 | INVOP | 0005 |
| | 151 | INVOP | 0005 |
| | 152 | INVOP | 0005 |
| | 153 | INVOP | 0005 |
| | 154 | INVOP | 0005 |
| | 155 | INVOP | 0005 |
| | 156 | INVOP | 0005 |
| | 157 | INVOP | 0005 |
| | 160 | INVOP | 0005 |
| | 161 | INVOP | 0005 |
| | 162 | INVOP | 0005 |
| | 163 | INVOP | 0005 |
| | 164 | INVOP | 0005 |
| | 165 | INVOP | 0005 |
| | 166 | INVOP | 0005 |
| | 167 | INVOP | 0005 |
| | 170 | INVOP | 0005 |
| | 171 | INVOP | 0005 |
| | 172 | INVOP | 0005 |
| | 173 | INVOP | 0005 |
| | 174 | INVOP | 0005 |
| | 175 | INVOP | 0005 |
| | 176 | INVOP | 0005 |
| | 177 | INVOP | 0005 |
| 400 | 200 | ANGM | 1031 |
| 402 | 201 | ORGM | 1031 |
| 404 | 202 | XOGM | 1031 |
| 406 | 203 | ADMG | 1025 |
| 410 | 204 | SBMG | 1025 |
| 412 | 205 | CHGM | 0043 |
| 414 | 206 | LD32 | 1025 |
| 416 | 207 | ANMG | 1025 |
| 420 | 210 | ORMG | 1025 |
| 422 | 211 | XOMG | 1025 |
| 424 | 212 | CAGM | 1025 |
| 426 | 213 | ALMG | 1025 |
| 430 | 214 | SLMG | 1025 |
| 432 | 215 | LDMG | 1025 |
| | 216 | INVOP | 0005 |
| | 217 | INVOP | 0005 |
| 440 | 220 | SMSI | 0074 |
| 442 | 221 | AMSI | 1031 |
| | 222 | INVOP | 0005 |
| | 223 | INVOP | 0005 |
| | 224 | INVOP | 0005 |
| | 225 | INVOP | 0005 |
| | 226 | INVOP | 0005 |
| | 227 | INVOP | 0005 |
| 460 | 230 | STGM | 1036 |
| 462 | 231 | GAPZ | 1036 |
| | 232 | INVOP | 0005 |
| | 233 | INVOP | 0005 |
| 470 | 234 | ARLX | 0035 |
| 472 | 235 | GWPP | 0035 |
| 474 | 236 | RDEX | 0035 |
| | 237 | INVOP | 0005 |
| 500 | 240 | XOLI | 0020 |
| 502 | 241 | XOUI | 0020 |
| 504 | 242 | CALI | 0020 |
| 506 | 243 | CAUI | 0020 |
| 510 | 244 | ANLI | 0020 |
| 512 | 245 | ANUI | 0020 |
| 514 | 246 | ORLI | 0020 |
| 516 | 247 | ORUI | 0020 |
| 520 | 250 | CMBI | 0024 |
| | 251 | INVOP | 0005 |
| 524 | 252 | CMLI | 0020 |
| | 253 | INVOP | 0005 |
| | 254 | INVOP | 0005 |
| | 255 | INVOP | 0005 |
| | 256 | INVOP | 0005 |
| | 257 | INVOP | 0005 |
| 540 | 260 | LDLI | 0020 |
| | 261 | INVOP | 0005 |
| 544 | 262 | ADLI | 0020 |
| | 263 | INVOP | 0005 |
| 550 | 264 | PULS | 0020 |
| | 265 | INVOP | 0005 |
| | 266 | INVOP | 0005 |
| | 267 | INVOP | 0005 |
| | 270 | INVOP | 0005 |
| | 271 | INVOP | 0005 |
| | 272 | INVOP | 0005 |
| | 273 | INVOP | 0005 |
| | 274 | INVOP | 0005 |
| | 275 | INVOP | 0005 |
| | 276 | INVOP | 0005 |
| | 277 | INVOP | 0005 |
| | 300 | INVOP | 0005 |
| 602 | 301 | RDRR | 1036 |
| 604 | 302 | DISP | 1036 |
| 606 | 303 | LCMG | 1036 |
| 610 | 304 | L2MG | 1036 |
| 612 | 305 | LAMG | 1036 |
| 614 | 306 | L2AG | 1036 |
| 616 | 307 | LCMG | 1036 |
| | 310 | INVOP | 0005 |
| 622 | 311 | ADRS | 1036 |
| 624 | 312 | RERR | 1036 |
| 626 | 313 | STGM | 1036 |
| 630 | 314 | S2GM | 1036 |
| 632 | 315 | SAGM | 1036 |
| 634 | 316 | ST32 | 1036 |
| 636 | 317 | S2AM | 1036 |
| 640 | 320 | CPSS | 1036 |
| 642 | 321 | CPSS | 1036 |
| 644 | 322 | CGMS | 1036 |
| 646 | 323 | CGPS | 1036 |
| 650 | 324 | CMBM | 1036 |
| 652 | 325 | LDBG | 1036 |
| | 326 | INVOP | 0005 |
| | 327 | INVOP | 0005 |
| 660 | 330 | BRAC | 0055 |
| | 331 | INVOP | 0005 |
| | 332 | INVOP | 0005 |
| | 333 | INVOP | 0005 |
| 670 | 334 | BSIC | 0060 |
| | 335 | INVOP | 0005 |
| | 336 | INVOP | 0005 |
| | 337 | INVOP | 0005 |
| 700 | 340 | EBFZ | 0066 |
| 702 | 341 | EBFS | 0071 |
| 704 | 342 | ECHZ | 0066 |
| 706 | 343 | ECHS | 0071 |
| 710 | 344 | ECLZ | 0066 |
| | 345 | INVOP | 0005 |
| | 346 | INVOP | 0005 |
| | 347 | INVOP | 0005 |
| 720 | 350 | IBFR | 0065 |

STANDARD SEQUENCE - PATH FINDER CONTENTS

| | | | |
|---|---|---|---|
| 772 | 351 | INPL | 0065 |
| | 352 | INVOP | 0005 |
| | 353 | INVOP | 0005 |
| | 354 | INVOP | 0005 |
| | 355 | INVOP | 0005 |
| | 356 | INVOP | 0005 |
| | 357 | INVOP | 0005 |
| 740 | 360 | UNDR | 0050 |
| 741 | 361 | BRBS | 0050 |
| | 362 | INVOP | 0005 |
| | 363 | INVOP | 0005 |
| | 364 | INVOP | 0005 |
| | 365 | INVOP | 0005 |
| | 366 | INVOP | 0005 |
| | 367 | INVOP | 0005 |
| 7A0 | 370 | COSB | 0064 |
| 7A2 | 371 | CCM | 0064 |
| | 372 | INVOP | 0005 |
| | 373 | INVOP | 0005 |
| | 374 | INVOP | 0005 |
| | 375 | INVOP | 0005 |
| | 376 | INVOP | 0005 |
| | 377 | INVOP | 0005 |

UNUSED MICRO-CODES

SKIP=1
SKIPTEST/
BRLS
LSAORA
SINGLE
XBRSP

SYMBOL TABLE

| | |
|---|---|
| ABAU | 371 |
| ACK | 466 |
| ADLI | 430 |
| AUMU | 465 |
| ADN | 600 |
| ALI | 433 |
| ALMU | 473 |
| AMSI | 501 |
| ANGM | 476 |
| ANLI | 401 |
| ANPU | 467 |
| ANN | 431 |
| ANUI | 401 |
| APC | 413 |
| ARR | 420 |
| ASI | 400 |
| ASR | 440 |
| BRAC | 373 |
| BRACSS | 055 |
| BRD | 050 |
| BRBM | 372 |
| BRBS1 | 373 |
| BRBS2 | 375 |
| BRBS3 | 376 |
| BRBS | 372 |
| BSIC | 375 |
| BSICSS | 060 |
| CAGM | 474 |
| CALI | 404 |
| CAN | 404 |
| CAUI | 404 |
| CDMB | 602 |
| CDSB1 | 607 |
| CDSB2 | 610 |
| CDSN | 602 |
| CDSM | 064 |
| CGFS | 566 |
| CGND | 565 |
| CPNI | 563 |
| CRMISS | 024 |
| CRMR | 553 |
| CMGM | 620 |
| CMGMSS | 043 |
| CML | 624 |
| CMN | 624 |
| CPC | 417 |
| CPS | 416 |
| CPSM | 562 |
| CRO | 457 |
| CRI | 460 |
| CHN | 616 |
| CRSG | 360 |
| DISP | 525 |
| DAL | 427 |
| DBN | 422 |
| DSL | 427 |
| DSNI | 426 |
| DSN | 424 |
| DVRI | 141 |
| DVNZ | 154 |
| DVR | 410 |
| ECFS | 615 |
| EBFZ | 615 |
| ECL41 | 622 |
| ECL42 | 624 |
| ECL43 | 626 |
| ECL4 | 620 |
| ECMS | 622 |
| ECMZ | 622 |
| EAI | 430 |

SYMBOL TABLE

| | |
|---|---|
| EXCEPT | 200 |
| EXTER | 035 |
| GETPTR | 121 |
| GETSAR | 100 |
| GETSP1 | 102 |
| GRFEXS | 071 |
| GRFEX2 | 066 |
| GRFIN | 063 |
| GRGI | 020 |
| GRGM | 005 |
| GRI | 012 |
| GRMIS | 016 |
| GNSPEC | 011 |
| GRXMI | 040 |
| GRXMIS | 036 |
| GRX-RO | 025 |
| GRX-RM | 031 |
| GMPM | 504 |
| GMPZ1 | 550 |
| GMPZ2 | 552 |
| GMPZ | 547 |
| HLT | 493 |
| IBFC | 502 |
| IBFN1 | 615 |
| IBFN2 | 617 |
| IBFN | 614 |
| ICMPI | 134 |
| ICMP | 133 |
| ICMPHL | 136 |
| ICMPH | 135 |
| ICVRX | 137 |
| INM | 455 |
| IPII | 660 |
| IPU | 461 |
| IPI | 462 |
| I-MISS | 360 |
| L2AU | 520 |
| L2PU | 513 |
| LAPU | 510 |
| LCAU | 517 |
| LCPU1 | 512 |
| LCPU2 | 514 |
| LCPU | 511 |
| LC2I | 475 |
| LCBU | 505 |
| LDLI | 610 |
| LDRU | 514 |
| LRL | 417 |
| LRR | 426 |
| LSI | 410 |
| LSL | 417 |
| LSR | 420 |
| MPCI | 433 |
| MPCZ | 201 |
| MPE | 434 |
| MPNI | 160 |
| MPNZ | 173 |
| MPN | 407 |
| NGN | 412 |
| NGNSS | 007 |
| NLINT1 | 322 |
| NLINT3 | 330 |
| NLINT2 | 331 |
| NLINT4 | 242 |
| NLINT5 | 245 |
| NLINT6 | 260 |
| NLINT7 | 247 |
| NLINT | 320 |
| NOP | 554 |
| OPCI | 415 |
| OPC | 414 |
| ORGM | 477 |
| ORLI | 402 |
| ORMS | 470 |
| ORN | 402 |
| ONUI | 402 |
| U-MISS | 360 |
| PULS | 778 |
| RDER | 502 |
| RDPHI | 524 |
| RCM | 521 |
| REL | 451 |
| RESET | 777 |
| RPPI | 217 |
| RMM | 445 |
| RRM | 421 |
| RSM | 421 |
| S2AM | 344 |
| STGM | 335 |
| SAGM | 337 |
| SBPG | 446 |
| SBN | 411 |
| SECR | 132 |
| SLMG | 474 |
| SMSI | 372 |
| SMSISS | 074 |
| ST32 | 340 |
| STGN | 333 |
| STGM | 332 |
| TPM | 405 |
| WREX | 505 |
| WRNN | 545 |
| ADGM | 500 |
| ADLI | 403 |

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing unit coupled to a memory and including general registers within a scratchpad memory for storing operands, an instruction buffer for storing a number of program instructions fetched from said memory and an instruction fetch and execution apparatus for executing instruction fetch and instruction execusion operations under microprogram control during minor and major clock pulse cycles wherein each program instruction requires execution of a predetermined number of microinstructions during a corresponding number of minor clock pulse cycles which comprise a major clock pulse cycle, said apparatus comprising:

an addressable control memory having a plurality of locations for storing a plurality of microinstructions, a first one of said microinstructions being coded to specify a number of microoperations, one required to terminate the execution of a first one of said program instructions and another microoperation for beginning the processing of next one of said program instructions and a last one of said microinstructions being coded to specify a number of microoperations, one microoperation required for execution of said first one of said program instructions and another microoperation for initiating the processing of a next instruction;

first means coupled to said control memory and operative in response to said last one of said microinstruction read out during a last minor clock pulse cycle of said first instruction to execute said one microoperation for completing the major cycle of operation of said first one of said program instructions;

second means coupled to said control memory and operative in response to said last one of said microinstructions during said last minor clock pulse cycle to execute said another microoperation for initiating the processing of said next instruction in parallel with the execution of microoperations of said first one of said program instructions;

third means coupled to said control memory and operative in response to said first one of said microinstructions during a first minor clock pulse cycle of beginning of a major clock pulse cycle of said next one of said program instructions to execute said another microoperation for completing an operation required in the execution of said second one of said program instructions; and, fourth means coupled to said control memory and operative in response to said first one of said microinstruction during first minor clock pulse cycle to execute said one microoperation for terminating the execution of said first one of said program instructions in parallel with the execution of said next one of said program instructions.

2. The unit of claim 1 wherein said last microinstruction is coded to specify a further microoperation for fetching a subsequent group of instructions to be executed, said apparatus further including fifth means for storing data accessed from memory and sixth means for storing results of operations said first means being operative in response to said microoperation to load the contents of said fifth means into said sixth means in response to a first clock pulse for said fetching of said subsequent group of instructions for loading into said instruction buffer.

3. The apparatus as recited in claim 2 wherein said scratchpad memory includes index registers for storing indexed addresses of operands stored in said memory and also said apparatus further includes seventh means for selecting one of said index registers and eighth means coupled to said scratchpad memory for temporarily storing information read out of said scratchpad memory, and wherein said second means in response to one of said microoperations causes the contents of a selected one of said index registers in said scratchpad memory to be read into said eighth means during said last minor clock pulse cycle in response to a second clock pulse.

4. The apparatus as recited in claim 3 further including ninth means for storing a displacement address of a selected one of said operands, adder means coupled to said eighth and ninth means and tenth means coupled to said adder means for storing the read out and wherein said third means in response to one of said microoperations causes the contents of said eighth means to be added to said ninth means and stored in said tenth means during said first minor clock pulse cycle in response to a third clock pulse.

5. The apparatus as recited in claim 4 wherein said fourth means in response to one of said microoperations causes the contents of said tenth means to be transferred to said scratchpad memory during said first minor clock pulse cycle in response to a fourth clock pulse.

6. A computer including an instruction fetch and execution apparatus for executing a last step of a program instruction within a series of sequential microinstruction steps and an instruction buffer for storing a next program instruction requiring execution of a first step in a series of sequential microinstruction steps, said apparatus comprising:

an addressable control memory having a plurality of locations for storing a plurality of microinstructions for executing said steps of each program instruction one of said microinstructions being coded to include a number of microoperations including one for beginning the processing of a next instruction stored in said buffer and another one of said microinstructions being coded to include a number of microoperations, one for terminating the execution of a program instruction;

first means coupled to said control memory, said first means being operative in response to said one microoperation of said one microinstruction read out during said last step of said program instruction currently under execution to initiate the processing of said next instruction in parallel with the execution of microoperations of said current program instruction; and, second means coupled to said control memory, said second means being operative in response to said one microoperation of said another microinstruction read out during the execution of said first step of said next instruction to terminate the execution of said current program instruction under execution in parallel with the execution of microoperations of said next instruction.

7. The unit of claim 6 being coupled to a memory and further including an instruction buffer for storing a plurality of program instructions fetched from said memory including said program instruction currently under execution and said next instruction, and wherein said one microinstruction is coded to include a microoperation for fetching a subsequent group of instructions, said apparatus further including third means including said control memory for providing major and minor clock pulse cycles and wherein a program instruction is executed during a major clock pulse cycle including a predetermined number of microoperations within said series of microinstruction steps, one or more microoperations being executed during each minor clock pulse cycle and wherein said first means is operative to execute microoperations specified by said one microinstruction during the last minor clock pulse cycle of a major cycle of said current instruction under execution and said second means is operative to execute microoperations specified by said another microinstruction during the first minor clock pulse cycle of a major cycle of said next program instruction.

* * * * *